(12) United States Patent
Pekrul

(10) Patent No.: US 10,876,470 B2
(45) Date of Patent: Dec. 29, 2020

(54) DYNAMIC ROTARY ENGINE VANE FORCE ACTUATION APPARATUS INCLUDING VANE WITH STRESSED SHEET

(71) Applicant: Merton W. Pekrul, Mesa, AZ (US)

(72) Inventor: Merton W. Pekrul, Mesa, AZ (US)

( * ) Notice: Subject to any disclaimer, the term of this patent is extended or adjusted under 35 U.S.C. 154(b) by 1246 days.

(21) Appl. No.: 14/997,306

(22) Filed: Jan. 15, 2016

(65) Prior Publication Data

US 2016/0131025 A1    May 12, 2016

Related U.S. Application Data

(63) Continuation-in-part of application No. 14/821,676, filed on Aug. 7, 2015, now abandoned.

(60) Provisional application No. 62/035,461, filed on Aug. 10, 2014, provisional application No. 62/038,116, filed on Aug. 15, 2014, provisional application No. 62/038,133, filed on Aug. 15, 2014.

(51) Int. Cl.
*F02B 53/10*     (2006.01)
*F01C 21/08*     (2006.01)
*F01C 1/344*     (2006.01)

(52) U.S. Cl.
CPC .......... *F02B 53/10* (2013.01); *F01C 21/0809* (2013.01); *F01C 1/3445* (2013.01); *F01C 21/0845* (2013.01); *Y02T 10/12* (2013.01)

(58) Field of Classification Search
CPC ........ F02B 53/10; Y02T 10/17; F01C 19/005; F01C 19/06; F01C 21/0809; F01C 21/0836; F01C 21/0845; F01C 1/3445; F01C 1/44; F01C 1/3443; F01C 1/04; F05C 2251/08; F04C 18/3447; F04C 2210/1044

USPC ...................... 123/205, 243; 418/259, 1, 138
See application file for complete search history.

(56) References Cited

U.S. PATENT DOCUMENTS

| | | | | |
|---|---|---|---|---|
| 2,071,799 A * | 2/1937 | Mabille | ..................... | F01C 1/04 418/138 |
| 4,353,337 A * | 10/1982 | Rosaen | ................. | F01C 11/004 123/202 |
| 6,120,271 A * | 9/2000 | Mallen | .................. | F01C 1/3442 29/888.025 |
| 6,321,713 B1* | 11/2001 | Mallen | .................. | F01C 1/3443 123/243 |
| 10,202,849 B2* | 2/2019 | Pekrul | .................... | F01C 1/3445 |
| 2005/0051129 A1* | 3/2005 | Watkins | ..................... | F01C 1/36 123/231 |
| 2007/0152097 A1* | 7/2007 | Melkers | .................... | F02K 1/78 244/3.21 |
| 2011/0200473 A1* | 8/2011 | Pekrul | ................... | F01C 1/3445 418/1 |

(Continued)

*Primary Examiner* — Patrick Hamo
*Assistant Examiner* — Paul W Thiede
(74) *Attorney, Agent, or Firm* — Hazen Patent Group, LLC; Kevin H. Hazen

(57) ABSTRACT

The invention comprises a rotary engine apparatus and method of use thereof. The rotary engine comprises a rotor configured to rotate in a housing and a set of vanes separating a volume between the rotor and housing into a set of chambers. Each of the vanes are dynamically controlled, such as through use of a stressed sheet and/or electromechanical means, to: (1) yield a greater radially outward and/or sealing force to the housing at start-up and/or at low engine speeds and (2) dynamically reduce radially outward and/or sealing forces at higher engine speeds.

7 Claims, 39 Drawing Sheets

(56) References Cited

U.S. PATENT DOCUMENTS

2016/0194959 A1* 7/2016 Pekrul .................. F01C 1/3445
418/1

* cited by examiner

DYNAMIC ROTARY ENGINE VANE FORCE ACTUATION APPARATUS INCLUDING VANE WITH STRESSED SHEET

CROSS-REFERENCES TO RELATED APPLICATIONS

This application is a continuation-in-part of U.S. patent application Ser. No. 14/821,676 filed Aug. 7, 2015, which:
- claims benefit of U.S. provisional patent application No. 62/035,461 filed Aug. 10, 2014;
- claims benefit of U.S. provisional patent application No. 62/038,116 filed Aug. 15, 2014; and
- claims benefit of U.S. provisional patent application No. 62/038,133 filed Aug. 15, 2014, all of which are incorporated herein in their entirety by this reference thereto.

TECHNICAL FIELD OF THE INVENTION

The present invention relates to the field of rotary engines. More specifically, the present invention relates to vane actuation in a rotary engine.

BACKGROUND OF THE INVENTION

The controlled expansion of gases forms the basis for the majority of non-electrical rotational engines in use today. These engines include reciprocating, rotary, and turbine engines, which may be driven by heat, such as with heat engines, or other forms of energy. Heat engines optionally use combustion, solar, geothermal, nuclear, and/or forms of thermal energy. Further, combustion-based heat engines optionally utilize either an internal or an external combustion system, which are further described infra.

Internal Combustion Engines

Internal combustion engines derive power from the combustion of a fuel within the engine itself. Typical internal combustion engines include reciprocating engines, rotary engines, and turbine engines.

Internal combustion reciprocating engines convert the expansion of burning gases, such as an air-fuel mixture, into the linear movement of pistons within cylinders. This linear movement is subsequently converted into rotational movement through connecting rods and a crankshaft. Examples of internal combustion reciprocating engines are the common automotive gasoline and diesel engines.

Internal combustion rotary engines use rotors and chambers to more directly convert the expansion of burning gases into rotational movement. An example of an internal combustion rotary engine is a Wankel engine, which utilizes a triangular rotor that revolves in a chamber, instead of pistons within cylinders. The Wankel engine has fewer moving parts and is generally smaller and lighter, for a given power output, than an equivalent internal combustion reciprocating engine.

Internal combustion turbine engines direct the expansion of burning gases against a turbine, which subsequently rotates. An example of an internal combustion turbine engine is a turboprop aircraft engine, in which the turbine is coupled to a propeller to provide motive power for the aircraft.

Internal combustion turbine engines are often used as thrust engines, where the expansion of the burning gases exit the engine in a controlled manner to produce thrust. An example of an internal combustion turbine/thrust engine is the turbofan aircraft engine, in which the rotation of the turbine is typically coupled back to a compressor, which increases the pressure of the air in the air-fuel mixture and increases the resultant thrust.

All internal combustion engines suffer from poor efficiency; only a small percentage of the potential energy is released during combustion as the combustion is invariably incomplete. Of energy released in combustion, only a small percentage is converted into rotational energy while the rest is dissipated as heat.

If the fuel used in an internal combustion engine is a typical hydrocarbon or hydrocarbon-based compound, such as gasoline, diesel oil, and/or jet fuel, then the partial combustion characteristic of internal combustion engines causes the release of a range of combustion by-products pollutants into the atmosphere via an engine exhaust. To reduce the quantity of pollutants, a support system including a catalytic converter and other apparatus is typically necessitated. Even with the support system, a significant quantity of pollutants is released into the atmosphere as a result of incomplete combustion when using an internal combustion engine.

Because internal combustion engines depend upon the rapid and explosive combustion of fuel within the engine itself, the engine must be engineered to withstand a considerable amount of heat and pressure. These are drawbacks that require a more robust and more complex engine over external combustion engines of similar power output.

External Combustion Engines

External combustion engines derive power from the combustion of a fuel in a combustion chamber separate from the engine. A Rankine-cycle engine typifies a modern external combustion engine. In a Rankine-cycle engine, fuel is burned in the combustion chamber and used to heat a liquid at substantially constant pressure. The liquid is vaporized to a gas, which is passed into the engine where it expands. The desired rotational energy and/or power is derived from the expansion energy of the gas. Typical external combustion engines also include reciprocating engines, rotary engines, and turbine engines, described infra.

External combustion reciprocating engines convert the expansion of heated gases into the linear movement of pistons within cylinders and the linear movement is subsequently converted into rotational movement through linkages. A conventional steam locomotive engine is used to illustrate functionality of an external combustion open-loop Rankine-cycle reciprocating engine. Fuel, such as wood, coal, or oil, is burned in a combustion chamber or firebox of the locomotive and is used to heat water at a substantially constant pressure. The water is vaporized to a gas or steam form and is passed into the cylinders. The expansion of the gas in the cylinders drives the pistons. Linkages or drive rods transform the piston movement into rotary power that is coupled to the wheels of the locomotive and is used to propel the locomotive down the track. The expanded gas is released into the atmosphere in the form of steam.

External combustion rotary engines use rotors and chambers instead of pistons, cylinders, and linkages to more directly convert the expansion of heated gases into rotational movement.

External combustion turbine engines direct the expansion of heated gases against a turbine, which then rotates. A modern nuclear power plant is an example of an external-combustion closed-loop Rankine-cycle turbine engine. Nuclear fuel is consumed in a combustion chamber known as a reactor and the resultant energy release is used to heat water. The water is vaporized to a gas, such as steam, which is directed against a turbine forcing rotation. The rotation of the turbine drives a generator to produce electricity. The expanded steam is then condensed back into water and is typically made available for reheating.

With proper design, external combustion engines are more efficient than corresponding internal combustion engines. Through the use of a combustion chamber, the fuel is more thoroughly consumed, releasing a greater percentage of the potential energy. Further, more thorough consumption means fewer combustion by-products and a corresponding reduction in pollutants.

Because external combustion engines do not themselves encompass the combustion of fuel, they are optionally engineered to operate at a lower pressure and a lower temperature than comparable internal combustion engines, which allows the use of less complex support systems, such as cooling and exhaust systems. The result is external combustion engines that are simpler and lighter for a given power output compared with internal combustion engines.

External Combustion Engine Types

Turbine Engines

Typical turbine engines operate at high rotational speeds. The high rotational speeds present several engineering challenges that typically result in specialized designs and materials, which adds to system complexity and cost. Further, to operate at low-to-moderate rotational speeds, turbine engines typically utilize a step-down transmission of some sort, which again adds to system complexity and cost.

Reciprocating Engines

Similarly, reciprocating engines require linkages to convert linear motion to rotary motion resulting in complex designs with many moving parts. In addition, the linear motion of the pistons and the motions of the linkages produce significant vibration, which results in a loss of efficiency and a decrease in engine life. To compensate, components are typically counterbalanced to reduce vibration, which again increases both design complexity and cost.

Heat Engines

Typical heat engines depend upon the adiabatic expansion of the gas. That is, as the gas expands, it loses heat. This adiabatic expansion represents a loss of energy.

Problem

What is needed is a rotary engine that provides an expander fuel throughout an extended power stroke.

SUMMARY OF THE INVENTION

The invention comprises a rotary engine dynamic vane apparatus and method of use thereof.

BRIEF DESCRIPTION OF THE DRAWINGS

A more complete understanding of the present invention is derived by referring to the detailed description and claims when considered in connection with the figures, wherein like reference numbers refer to similar items throughout the figures.

DETAILED DESCRIPTION OF THE PREFERRED EMBODIMENTS

Figure 1:
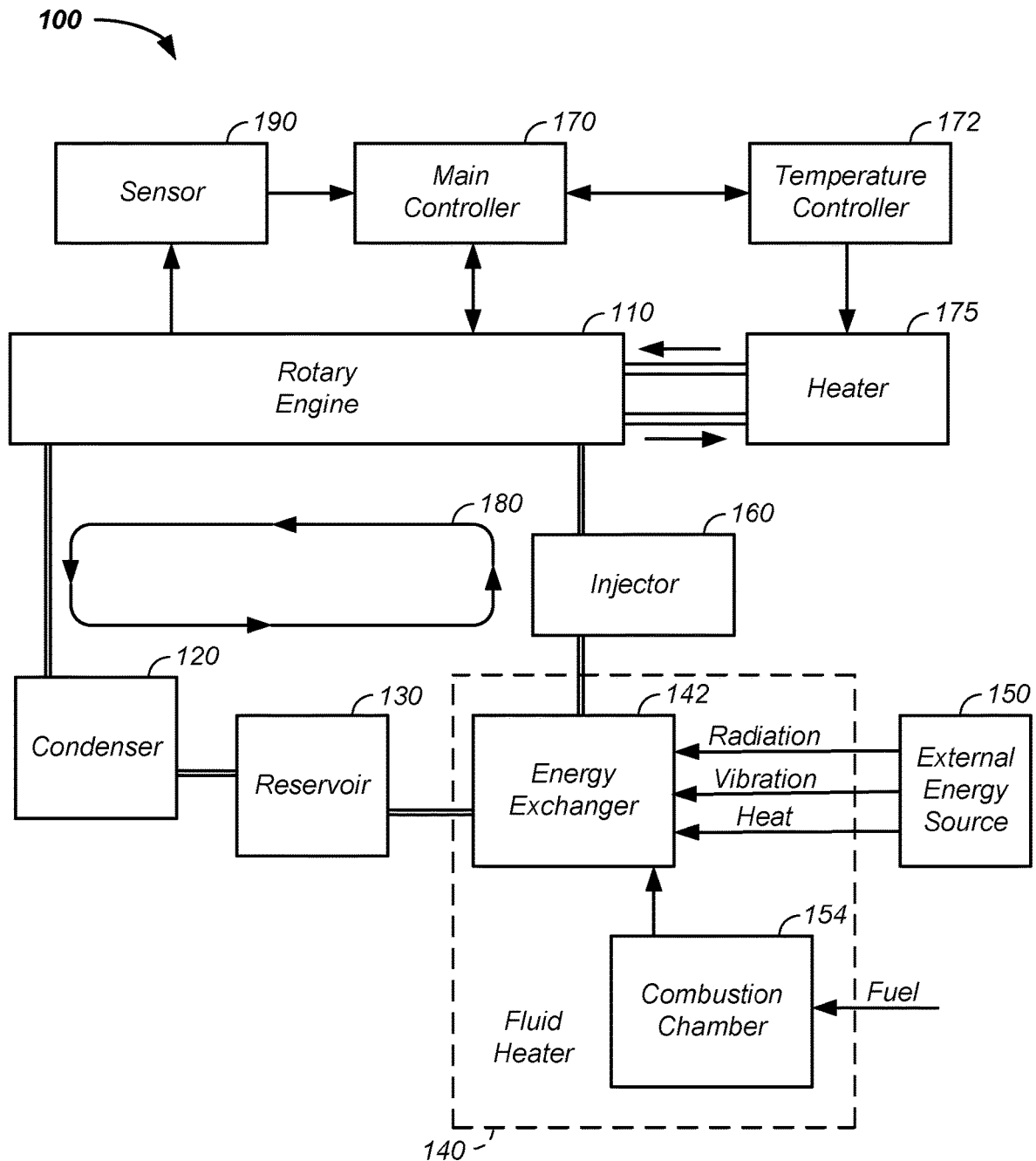
FIG. 1 provides a block diagram of a rotary engine system.

The invention comprises a dynamic vane actuation system that dynamically varies a force applied outward to a vane toward a housing of a rotary engine.

In one embodiment, the rotary engine uses a vane actuation system having a stressed band wound at least partially around two or more rollers, rotating elements, turning elements, and/or irregularly shaped rolling elements, in an enclosure to alternatingly extend or retract a vane toward a housing, thereby aiding in seal formation of the vane to the housing.

In another embodiment, the rotary engine includes one or more optional injection ports, such as a first injection port in an expansion chamber, a second injection port in the expansion chamber after a first rotation of the rotor, a third injection port into the expansion chamber after a second rotation of the rotor, a fourth injection port from a fuel path through a shaft of the rotary engine, and/or a fifth injection port into a rotor-vane slot between the rotor and a vane. Optionally, one or more of the injection ports are controlled through mechanical valving and/or through computer control. Optionally, the first, second, and/or third injection ports are through a first endplate of the rotary engine separating the rotor from the circumferential housing, through a second endplate parallel to the first endplate, and/or through the circumferential housing.

In another embodiment, the rotary engine uses a vane actuation system having a stressed band wound at least partially around two or more rollers in an enclosure to alternatingly extend or retract a vane toward a housing, thereby aiding in seal formation of the vane to the housing.

In still another embodiment, a rotary engine method and apparatus is configured with an exhaust system. The exhaust system includes an exhaust cut or exhaust channel into one or more of a housing or an endplate of the rotary engine, which interrupts the seal surface of the expansion chamber housing. The exhaust cut directs spent fuel from the rotary engine fuel expansion/compression chamber out of the rotary engine either directly or via an optional exhaust port and/or exhaust booster. The exhaust system vents fuel to atmosphere or into a condenser for recirculation of fuel in a closed-loop circulating rotary engine system. Exhausting the engine reduces back pressure on the rotary engine thereby enhancing rotary engine efficiency.

In another embodiment, a rotary engine method and apparatus is configured with at least one lip seal. A lip seal restricts fuel flow from a fuel compartment to a non-fuel compartment and/or fuel flow between fuel compartments, such as between a reference expansion chamber and any of an engine: rotor, vane, housing, a leading expansion chamber, and/or a trailing expansion chamber. Types of lip seals include: vane lip seals, rotor lip seals, and rotor-vane slot lip seals. Generally, lip seals dynamically move or deform as a result of fuel movement or pressure to seal a junction between a sealing surface of the lip seal and a rotary engine component. For example, a vane lip seal sealing to the inner housing dynamically moves along the y-axis until an outer surface of the lip seal seals to the housing.

In another embodiment, a rotary engine is configured with elements having cap seals. A cap seal restricts fuel flow from a fuel compartment to a non-fuel compartment and/or fuel flow between fuel compartments, such as between a reference expansion chamber and any of an engine: rotor, vane, housing, leading expansion chamber, and/or trailing expansion chamber. Types of caps include vane caps, rotor caps, and rotor-vane slot caps. For a given type of cap, optional sub-cap types exist. For example, types of vane caps include: vane-housing caps, vane-rotor-rotor caps, and vane-endplate caps. Generally, caps dynamically move or float to seal a junction between a sealing surface of the cap and a rotary engine component. For example, a vane cap sealing to the inner housing dynamically moves along the y-axis until an outer surface of the cap seals to the housing. Means for providing cap sealing force to seal the cap against a rotary engine housing element comprise one or more of: a spring force, a magnetic force, a deformable seal force, and a fuel force. The dynamic caps ability to trace a noncircular path is particularly beneficial for use in a rotary engine having an offset rotor and a non-circular inner rotary engine compartment having engine wall cut-outs and/or build-ups. Further, the dynamic sealing forces provide cap sealing forces over a range of temperatures and operating rotational engine speeds.

In yet another embodiment, preferably three or more swing vanes are used in the rotary engine to separate expansion chambers of the rotary engine. A swing vane pivots about a pivot point on the rotor. Since, the swing vane pivots with rotation of the rotor in the rotary engine, the reach of the swing vane between the rotor and housing ranges from a narrow thickness or width of the swing vane to the longer length of the swing vane. The dynamic pivoting of the swing vane yields an expansion chamber separator ranging from the short width of the vane to the longer length of the vane, which allows use of an offset rotor in the rotary engine. Optionally, and in addition, the swing vane dynamically extends to reach the inner housing of the rotary engine. For example, an outer sliding swing vane portion of the swing vane slides along the inner pivoting portion of the swing vane to dynamically lengthen or shorten the length of the swing vane. The combination of the pivoting and the sliding of the vane allows for use with a double offset rotary engine having housing wall cut-outs and/or buildups, which allows greater volume of the expansion chamber during the power stroke or power stroke phase of the rotary engine and corresponding increases in power and/or efficiency.

In still yet another embodiment, the vane reduces chatter or vibration of the vane-tips against the inner wall of the housing of the rotary engine during operation of the engine, where chatter leads to unwanted opening and closing of the seal between an expansion chamber and a leading chamber. For example, an actuator force forces the vane against the inner wall of the rotary engine housing, thereby providing a seal between the leading chamber and the expansion chamber of the rotary engine. The reduction of engine chatter increases engine power and/or efficiency. Further, the pressure relief aids in uninterrupted contact of the seals between the vane and inner housing of the rotary engine, which yields enhanced rotary engine efficiency.

In yet still another embodiment, a rotary engine is described having fuel paths that run through a portion of a rotor of the rotary engine and/or through a vane of the rotary engine. The fuel paths are optionally opened and shut as a function of rotation of the rotor to enhance power provided by the engine. The valving that opens and/or shuts a fuel path operates: (1) to equalize pressure between an expansion chamber and a rotor-vane chamber and/or (2) to control a booster, which creates a pressure differential resulting in enhanced flow of fuel. The fuel paths, valves, seals, and boosters are further described, infra.

In still another embodiment, a rotary engine is provided for operation on a re-circulating fuel expanding about adiabatically during a power stroke or during an expansion mode of the rotary engine. To aid the power stroke efficiency, the rotary engine preferably contains one or more of:
- a double offset rotor geometry relative to a housing;
- use of a first cut-out in the engine housing at the initiation of the power stroke;
- use of a build-up in the housing at the end of the power stroke; and/or
- use of a second cut-out in the housing at the completion of rotation of the rotor in the engine.

Further, fuels described maintain about adiabatic expansion even with a high gas-to-liquid ratio when maintained at a relatively constant temperature via use of a temperature controller for the expansion chambers. Expansive forces of the fuel acting on the rotor are aided by hydraulic forces, vortical forces, an about Fibonacci-ratio increase in volume of an expansion chamber as a function of rotor rotation during the power stroke, sliding vanes, and/or swinging vanes between the rotor and housing.

In yet still another embodiment, permutations and/or combinations of any of the rotary engine elements described herein are used to increase rotary engine efficiency.

Rotary Engine

A rotary engine system uses power from an expansive force, such as from an internal or external combustion process, to produce an output energy, such as a rotational or electric force.

Referring now to FIG. 1, a rotary engine 110 is preferably a component of an engine system 100. In the engine system 100, fuel/gas/liquid in various states or phases is circulated in a circulation system 180, illustrated figuratively. In the illustrated example, gas output from the rotary engine 110 is transferred to and/or through a condenser 120 to form a liquid; then through an optional reservoir 130 to a fluid heater 140 where the liquid is heated to a temperature and pressure sufficient to result in state change of the liquid to gas form when passed through an injector 160 and back into the rotary engine 110. In one case, the fluid heater 140 optionally uses an external energy source 150, such as radiation, vibration, and/or heat to heat the circulating fluid in an energy exchanger 142. In a second case, the fluid heater 140 optionally uses fuel in an external combustion chamber 154 to heat the circulating fluid in the energy exchanger 142. Optionally, the rotary engine comprises multiple rotors, where one of the rotors, such as a center rotor, is an element of an internal combustion engine. The rotary engine 110, is further described infra.

Still referring to FIG. 1, the rotary engine 110 is optionally connected to and/or controlled by a main controller 170, where the main controller is optionally any form of computer, software interface, and/or user interface. In one example, the main controller 170 controls sub-elements of the rotary engine 110, such as rotation speed, one or more inlet ports, an injector 160, one or more valves or gates, temperature, input fuel rate, and/or electromagnetic generation. The main controller 170 is additionally optionally linked to any outside system, such as the condenser 120, the reservoir 130, the fluid heater 140, the external source 150, one or more sensors 190, and/or a temperature controller 172.

Still referring to FIG. 1, maintenance of the rotary engine 110 at a set operating temperature enhances precision and/or efficiency of operation of the engine system 100. Hence, the rotary engine 110 is optionally coupled to a temperature controller 172 and/or a block heater 175. Preferably, the temperature controller senses with one or more sensors the temperature of the rotary engine 110 and controls a heat exchange element attached and/or indirectly attached to the rotary engine 110, which maintains the rotary engine 110 at about a set point operational temperature. In a first scenario, the block heater 174 heats expansion chambers, described infra, to a desired operating temperature. The block heater 175 is optionally configured to extract excess heat from the fluid heater 140 to heat one or more elements of the rotary engine 110, such as the rotor 320, vanes, an inner wall of the housing, an inner wall of the first endplate 212, and/or an inner wall of the second endplate 214.

Figure 2:
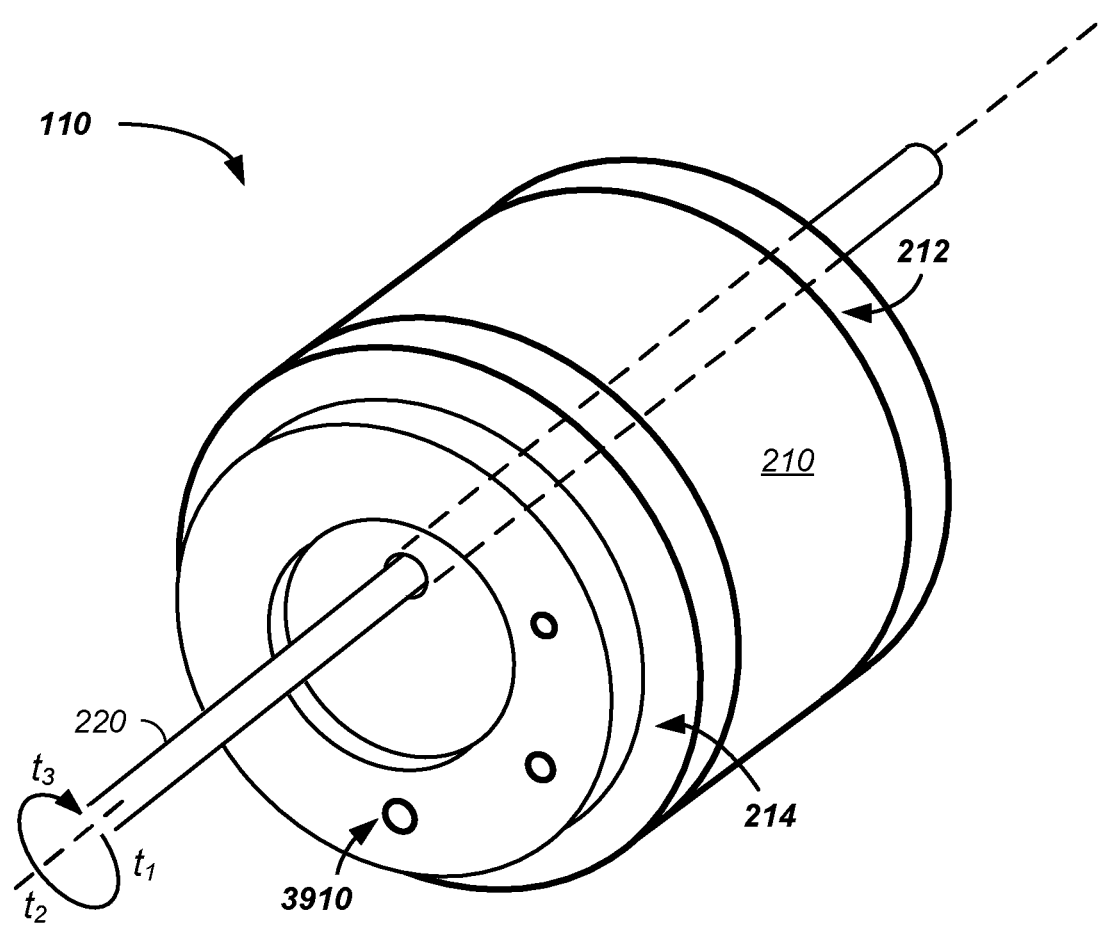
FIG. 2 illustrates a perspective view of a rotary engine housing.

Referring now to FIG. 2, the rotary engine 110 includes a housing 210 on an outer side of a series of expansion chambers, a first endplate 212 affixed to a first side of the housing, and a second endplate 214 affixed to a second side of the housing. Combined, the housing 210, first endplate 212, second endplate 214, and a rotor, described infra, contain a series of expansion chambers in the rotary engine 110. An offset shaft preferably runs into and/or runs through the first endplate 212, inside the housing 210, and into and/or through the second endplate 214. The offset shaft 220 is centered to the rotor 440 and is offset relative to the center of the rotary engine 110. Preferably, the rotary engine operates at greater than about 100, 1,000, 5,000, 10,000, 15,000, or 20,000 revolutions per minute.

Still referring to FIG. 2, the rotary engine 110 is illustrated with an optional set of inlet ports 3910, where fuel is injected into expansion chambers in a power stroke of the rotary engine 110. The set of inlet ports 3910 are further described, infra.

Rotors

For rotor description, an x-, y-, z-axis system is used for description, where the z-axis runs parallel to the rotary engine shaft 220 and the x/y plane is perpendicular to the z-axis. For vane description, the x-, y-, z-axis system is redefined relative to a vane 450, as described infra.

Rotors of various configurations are optionally used in the rotary engine 110. The rotors are optionally offset in the x- and/or y-axes relative to a z-axis running along the length of the shaft 220. The shaft 220 is optionally double walled or multi-walled. The outer edge or face 442 of the rotor forming an inner wall of the expansion chambers is of varying geometry. Examples of rotor configurations in terms of offsets and shapes are further described, infra. The examples are illustrative in nature and each element is optional and may be used in various permutations and/or combinations.

Vanes

A vane or blade separates two chambers of a rotary engine. The vane optionally functions as a seal and/or valve. The vane itself optionally functions as a lever, propeller, an impeller, and/or a turbine blade.

Engines are illustratively represented herein with clock positions, with 12 o'clock being a top of a cross-sectional view of the engine with an axis normal to the view running along the length of the shaft 220 of the engine. The 12 o'clock position is alternatively referred to as a zero degree position. Similarly 12 o'clock to 3 o'clock is alternatively referred to as zero degrees to ninety degrees and a full rotation around the clock covers three hundred sixty degrees. Those skilled in the art will immediately understand that any multi-axes illustration system is alternatively used to describe the engine and that rotating engine elements in this coordination system alters only the description of the elements without altering the function of the elements.

Figure 3:
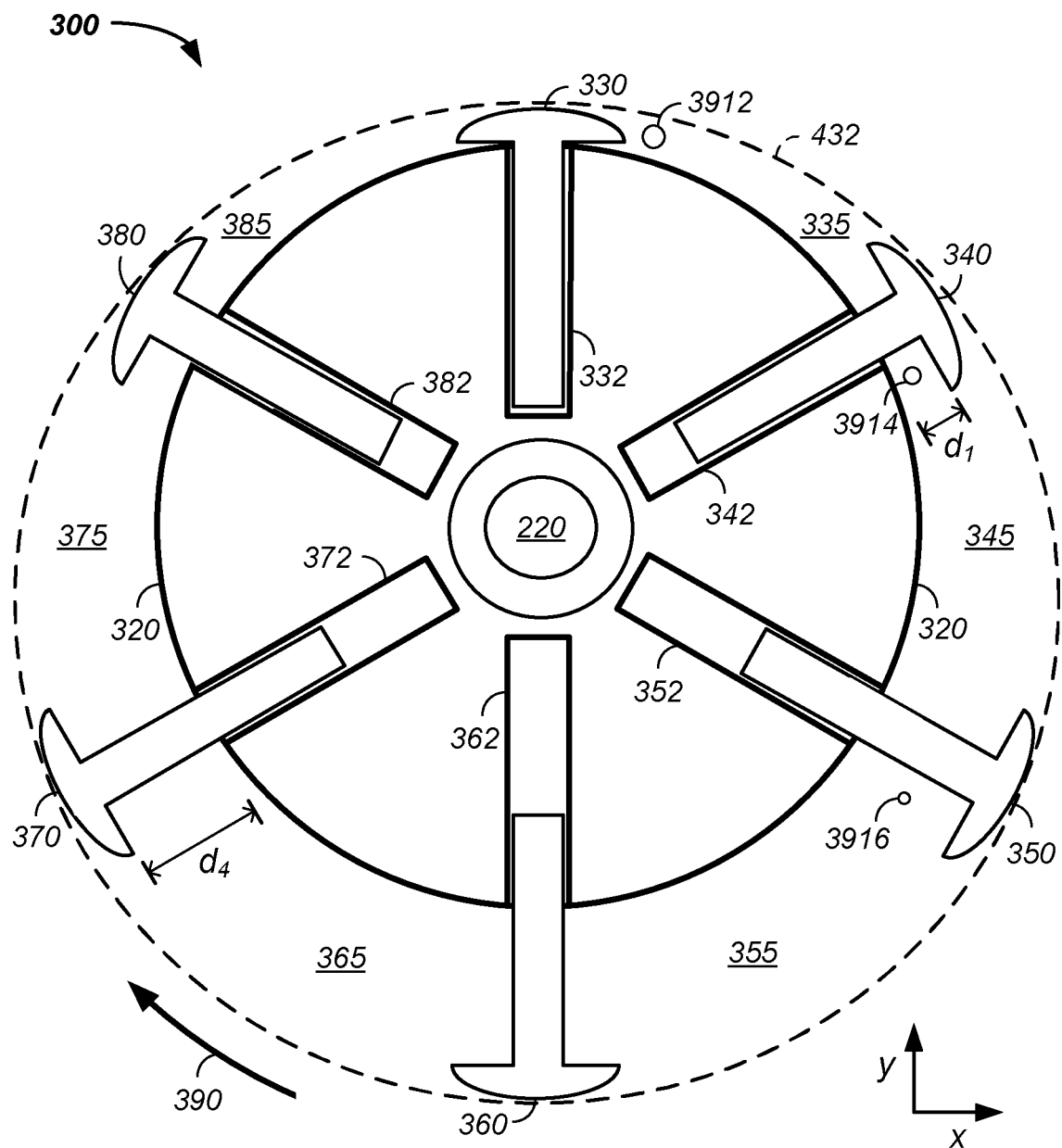
FIG. 3 illustrates a cross-sectional view of a single offset rotary engine.

Referring now to FIG. 3, vanes relative to an inner wall 432 of the housing 210 and relative to a rotor 320 are described. As illustrated, the length of the shaft 220 runs normal to the illustrated cross-sectional view and the rotor 320 rotates around the shaft 220. Vanes extend between the rotor 320 and the inner wall 432 of the housing 210. As illustrated, the single offset rotor system 300 includes six vanes, with: a first vane 330 at a 12 o'clock position, a second vane 340 at a 2 o'clock position, a third vane 350 at a 4 o'clock position, a fourth vane 360 at a 6 o'clock position, a fifth vane 370 at a 8 o'clock position, and a sixth vane 380 at a 10 o'clock position. Any number of vanes are optionally used, such as about 2, 3, 4, 5, 6, 8, or more vanes. Preferably, an even number of vanes are used in the rotor system 300.

Still referring to FIG. 3, the vanes extend outward from the single offset rotor 320 through vane slots. As illustrated, the first vane 330 extends from a first vane slot 332, the second vane 340 extends from a second vane slot 342, the third vane 350 extends from a third vane slot 352, the fourth vane 360 extends from a fourth vane slot 362, the fifth vane 370 extends from a fifth vane slot 372, and the sixth vane 380 extends from a sixth vane slot 382. Each of the vanes is slidingly coupled and/or coupled with a hinge to the single offset rotor 320 and the single offset rotor 320 is fixed and/or coupled to the shaft 220. When the rotary engine is in operation, the single offset rotor 320, vanes, and vane slots rotate about the shaft 220. Hence, the first vane 330 rotates from the 12 o'clock position sequentially through each of the 2, 4, 6, 8, and 10 o'clock positions and ends up back at the 12 o'clock position. When the rotary engine 210 is in operation, pressure upon the vanes causes the single offset rotor 320 to rotate relative to the non-rotating inner wall of the housing 432, which causes rotation of shaft 220. As the rotor 210 rotates, each vane slides outward to maintain contact with the inner wall of the housing 432.

Still referring to FIG. 3, expansion chambers or sealed expansion chambers relative to an inner wall 432 of the housing 210, vanes, and single offset rotor 320 are described. Generally, an expansion chamber 333 rotates about the shaft 220 during use. The expansion chamber 333 has a radial cross-sectional area and volume that changes as a function of rotation of the single offset rotor 320 about the shaft 220. In the illustrated example, the rotary system is configured with six expansion chambers. Each of the expansion chambers reside in the rotary engine 110 along an axis between the first endplate 212 and the second endplate 214. Further, each of the expansion chambers reside between the single offset rotor 320 and inner wall of the housing 432. Still further, the expansion chambers are contained between the vanes. As illustrated, a first expansion chamber 335 is in a first volume between the first vane 330 and the second vane 340, a second expansion chamber 345 is in a second volume between the second vane 340 and the third vane 350, a third expansion chamber 355 is in a third volume between the third vane 350 and the fourth vane 360, a fourth expansion chamber or first reduction chamber 365 is in a fourth volume between the fourth vane 360 and the fifth vane 370, a fifth expansion chamber or second reduction chamber 375 is in a fifth volume between the fifth vane 370 and the sixth vane 380, and a sixth expansion chamber or third reduction chamber 385 is in a sixth volume between the sixth vane 380 and the first vane 330. As illustrated, the volume of the second expansion chamber 345 is greater than the volume of the first expansion chamber and the volume of the third expansion chamber is greater than the volume of the second expansion chamber. The increasing volume of the expansion chambers in the first half of a rotation of the single offset rotor 320 about the shaft 220 results in greater efficiency, power, and/or torque, as described infra.

Single Offset Rotor

Still referring to FIG. 3, a single offset rotor 320 is illustrated. The housing 210 has a center position. In a single offset rotor system, the shaft 220 running along the z-axis is offset along one of the illustrated x- or y-axes. For clarity of presentation, expansion chambers are referred to herein as residing in static positions and having static volumes, though they rotate about the shaft 220 and change in both volume and position with rotation of the single offset rotor 320 about the shaft 220. As illustrated, the shaft 220 is offset along the y-axis, though the offset could be along any x-, y-vector. Without the offset along the y-axis, each of the expansion chambers is uniform in volume. With the offset, the second expansion chamber 345, at the position illustrated, has a volume greater than the first expansion chamber 335 and the third expansion chamber 355 has a volume greater than that of the second expansion chamber 345. The fuel mixture from the fluid heater or vapor generator 140 is injected via the injector 160 into the first expansion chamber 335. As the rotor rotates, the volume of the expansion chambers increases, as illustrated in the static position of the second expansion chamber 345 and third expansion chamber 355. The increasing volume allows an expansion of the fuel, such as a gas, liquid, vapor, and/or plasma, which preferably occurs adiabatically or about adiabatically. The expansion of the fuel releases energy that is forced against the vane and/or vanes, which results in rotation of the rotor.

Double Offset Rotor

Figure 4:
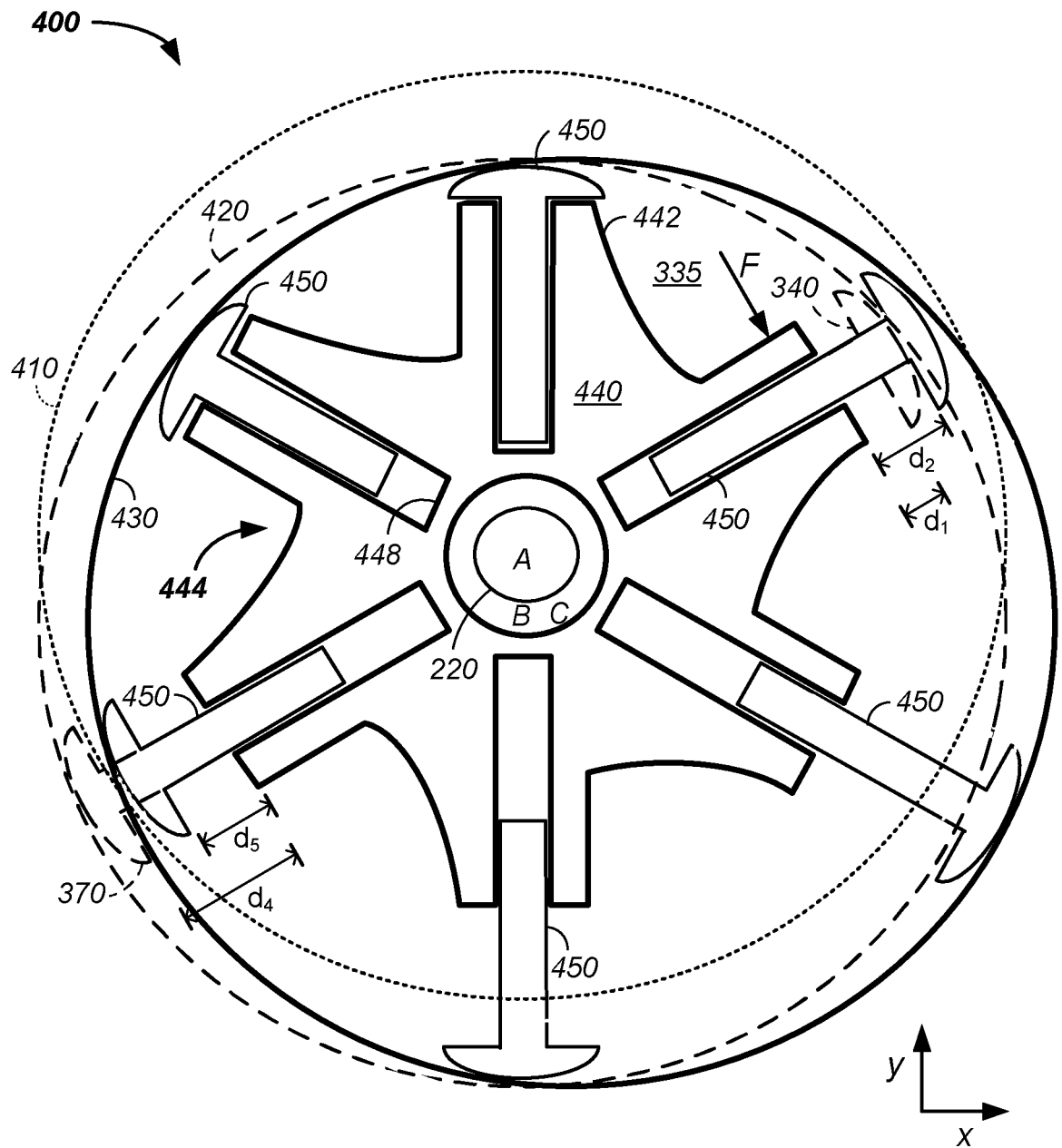
FIG. 4 illustrates a sectional view of a double offset rotary engine.

Referring now to FIG. 4, the increasing volume of a given expansion chamber through the first half of a rotation of the rotor 440, such as in the power stroke described infra, about the shaft 220 combined with the extension of the vane from the rotor shaft to the inner wall of the housing 432 results in a greater surface area for the expanding gas to exert force against resulting in rotation of the rotor 320. The increasing surface area to push against in the first half of the rotation increases efficiency of the rotary engine 110. For reference, relative to double offset rotary engines and rotary engines including build-ups and cutouts, described infra, the single offset rotary engine has a first distance, $d_1$, at the 2 o'clock position and a fourth distance, $d_4$, between the rotor 440 and an inner wall 432 of the housing 420.

Still referring to FIG. 4, a double offset rotary engine 400 is illustrated. To demonstrate the offset of the housing, three housing 210 positions are illustrated. Herein a specific version of a rotor 440 is the single offset rotor 320. Preferably, the rotor 440 is a double offset rotor. The rotor 440 and vanes 450 are illustrated only for the double offset housing position 430. In the first zero offset position, the first housing position 410 is denoted by a dotted line and the housing 210 is equidistant from the rotor 440 in the x-, y-plane. Stated again, in the first housing position, the rotor 440 is centered relative to the first housing position 410 about point 'A'. The centered first housing position 410 is non-functional. The single offset rotor position was described, supra, and illustrated in FIG. 3. The single offset housing position 420 is repeated and still illustrated as a dashed line in FIG. 4. The second housing position is a single offset housing position 420 centered at point 'B', which has an offset in only the y-axis versus the zero offset housing position 410. A third preferred housing position is a double offset rotor position 430 centered at position 'C'. The double offset housing position 430 is offset in both the x- and y-axes versus the zero offset housing position. The offset of the housing 430 in two axes relative to the longitudinal axis of the shaft 220 results in efficiency gains of the double offset rotary engine, as described supra. Generally, the use of a double offset rotor increases the volume capacity of the expansion side of the engine and increases the vane length resulting in greater power output without increase in the housing size of the rotary engine.

Rotors 440 and vanes 450 are illustrated in the rest of this document relative to the double offset housing position 430, where the shaft 220 is offset from center in both the x- and y-axes relative to the housing 210.

Still referring to FIG. 4, the rotor 440 optionally includes a plurality of rotor vane slots with a corresponding set of rotor vane bases 448, one vane base for each vane. In the design of the double offset rotor position 430, the plurality of rotor vane bases 448 are optionally within 10, 5, 2, or 1 percent of equidistant from an axial center position of the shaft 220, which has multiple benefits including a balanced rotor, the ability to combine with housing build ups and cut-outs, described infra, and ease of manufacture. Further, in the design of the double offset rotor position 430, each of the plurality of rotor vane bases 448 optionally vary in distance to the housing along respective central lines running up the rotor vane slots by greater than 10, 20, or 30 percent as a function of rotation of the rotor 440 about the shaft 200.

Still referring to FIG. 4, the extended 2 o'clock vane position 340 for the single offset rotor illustrated in FIG. 3 is re-illustrated in the same position in FIG. 4 as a dashed line with a first distance, $d_1$, between the vane wing tip and the outer edge of the rotor 440. It is observed that the extended 2 o'clock vane position 450 for the double offset rotor has a longer distance, $d_2$, between the vane wing tip and the outer edge of the rotor 440 compared with the first distance, $d_1$, of the extended position of the vane in the single offset rotor. The larger extension, $d_2$, yields a larger cross-sectional area for the expansive forces in the first expansion chamber 335 to act on, thereby resulting in larger turning forces from the expanding gas pushing on the rotor 440 and/or a greater torque against the vane due to the extension of vane 450 from the first distance, $d_1$, to the longer distance, $d_2$. Note that the illustrated rotor 440 in FIG. 4 is illustrated with a curved surface 442 running from near a vane wing tip toward the shaft in the expansion chamber to increases expansion chamber volume and to allow a greater surface area for the expanding gases to operate on with a force vector, F. The curved surface 442 is of any specified geometry to set the volume of the expansion chamber 335. Similar force and/or power gains are observed from the 12 o'clock to 6 o'clock position using the double offset rotary engine 400 compared to the single offset rotary engine 300.

Still referring to FIG. 4, The fully extended 8 o'clock vane 370 of the single offset rotor is re-illustrated in the same position in FIG. 4 as a dashed image with distance, $d_4$, between the vane wing tip and the outer edge of the rotor 440. It is noted that the double offset housing 430 forces full extension of the vane to a smaller distance, $d_5$, at the 8 o'clock position between the vane wing tip and the outer edge of the rotor 440. However, rotational forces are not lost with the decrease in vane extension at the 8 o'clock position as the expansive forces of the gas fuel are expended by the 6 o'clock position and the gases are vented before the 8 o'clock position, as described supra. The detailed 8 o'clock position is exemplary of the 6 o'clock to 12 o'clock positions.

The net effect of using a double offset rotary engine 400 is increased efficiency and power in the power stroke, such as from the 12 o'clock to 6 o'clock position or through about 180 degrees, using the double offset rotary engine 400 compared to the single offset rotary engine 300 without loss of efficiency or power from the 6 o'clock to 12 o'clock positions.

Cutouts, Build-Ups, and Vane Extension

FIG. 3 and FIG. 4 illustrate inner walls of housings 410, 420, and 430 that are circular. However, an added power and/or efficiency advantage results from cutouts and/or buildups in the inner surface of the housing. For example, an x-, y-axes cross-section of the inner wall shape of the housing 210 is optionally non-circular, oval, egg shaped, cutout relative to a circle, and/or built up relative to a circle. For example, the inner wall has a shape correlated a rotating cam.

Figure 5:
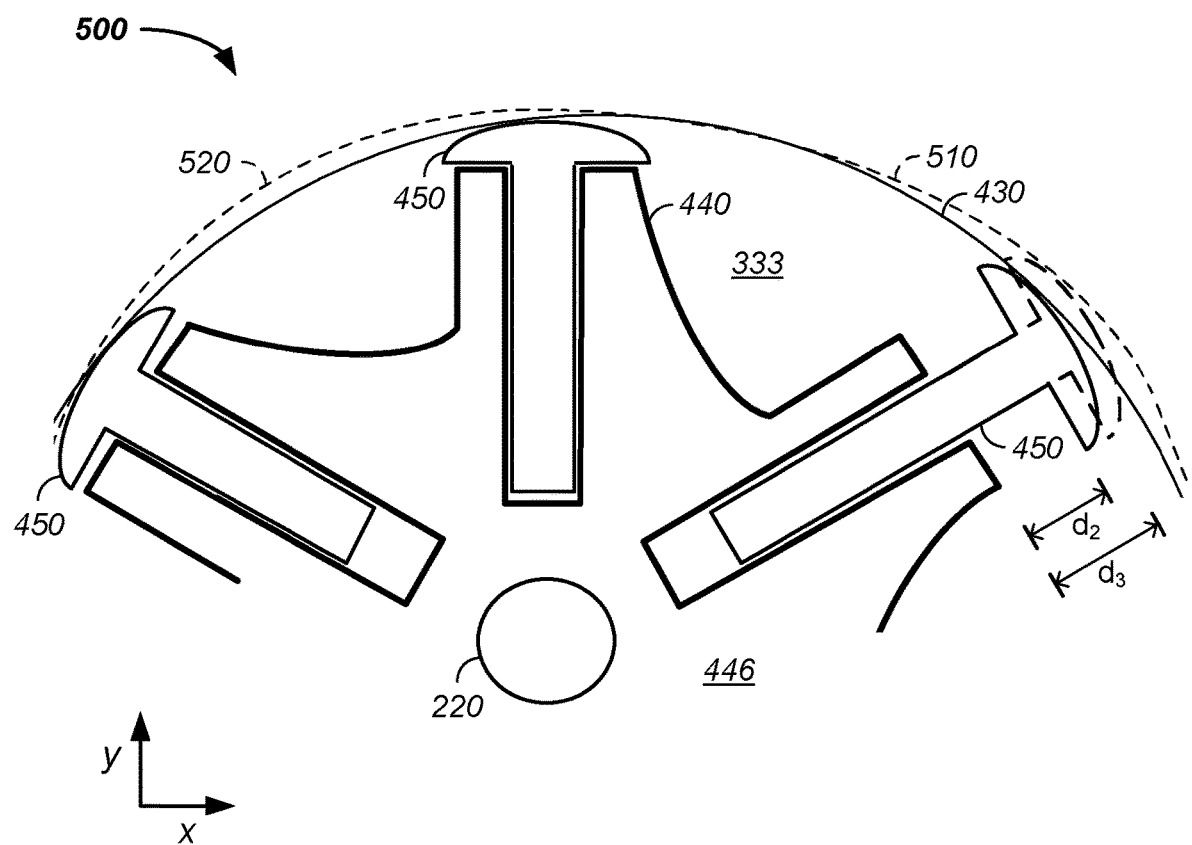
FIG. 5 illustrates housing cut-outs.

Referring now to FIG. 5, optional cutouts in the housing 210 are described. A cutout is readily understood as a removal of material from a circular inner wall of the housing; however, the material is not necessarily removed by machining the inner wall, but rather is optionally cast or formed in final form or is defined by the shape of an insert piece that fits along the inner wall 420 of the housing. For clarity, cutouts are described relative to the inner wall 432 of the double offset rotor housing 430; however, cutouts are optionally used with any housing 210. The optional cutouts and build-ups described herein are optionally used independently or in combination.

Still referring to FIG. 5, a first optional cutout 510 is illustrated at about the 1 o'clock to 3 o'clock position of the housing 430. To further clarify, a cut-out or lobe or vane extension limiter is optionally: (1) a machined away portion of an inner wall of the circular housing 430; (2) an inner wall housing 430 section having a greater radius from the center of the shaft 220 to the inner wall of the housing 430 compared with a non-cutout section of the inner wall housing 430; or is a section molded, cast, and/or machined to have a further distance for the vane 450 to slide to reach compared to a nominal circular housing. For clarity, only the 10 o'clock to 2 o'clock position of the double offset rotary engine 400 is illustrated. The first cutout 510 in the housing 430 is present in about the 12 o'clock to 3 o'clock position and preferably at about the 2 o'clock position. Generally, the first cutout allows a longer vane 450 extension at the cutout position compared to the circular x-, y-cross-section of the housing 430. To illustrate, still referring to FIG. 5, the extended 2 o'clock vane position 340 for the double offset rotor illustrated in FIG. 4 is re-illustrated in the same position in FIG. 5 as a solid line image with distance, $d_2$, between the vane wing tip and the outer edge of the rotor 440. It is observed that the extended 2 o'clock vane position 450 for the double offset rotor having cutout 510 has a longer distance, $d_3$, between the vane wing tip and the outer edge of the rotor 440 compared with the extended position vane in the double offset rotor. The larger extension, $d_3$, yields a larger cross-sectional area for the expansive forces in the first expansion chamber 335 to act on and a longer torque distance from the shaft, thereby resulting in larger turning forces from the expanding gas pushing on the rotor 440. To summarize, the vane extension distance, $d_1$, using a single offset rotary engine 300 is less than the vane extension distance, $d_2$, using a double offset rotary engine 400, which is less than vane extension distance, $d_3$, using a double offset rotary engine with a first cutout as is observed in equation 1.

$$d_1 < d_2 < d_3 \qquad \text{(eq. 1)}$$

Still referring to FIG. 5, a second optional cutout 520 is illustrated at about the 11 o'clock position of the housing 430. The second cutout 520 is present at about the 10 o'clock to 12 o'clock position and preferably at about the 11 o'clock to 12 o'clock position. Generally, the second cutout allows a vane having a wingtip, described supra, to physically fit between the rotor 440 and housing 430 in a double offset rotary engine 500. The second cutout 520 also adds to the magnitude of the offset possible in the single offset engine 300 and in the double offset engine 400, which increases distances $d_2$ and $d_3$, as described supra.

Figure 6:
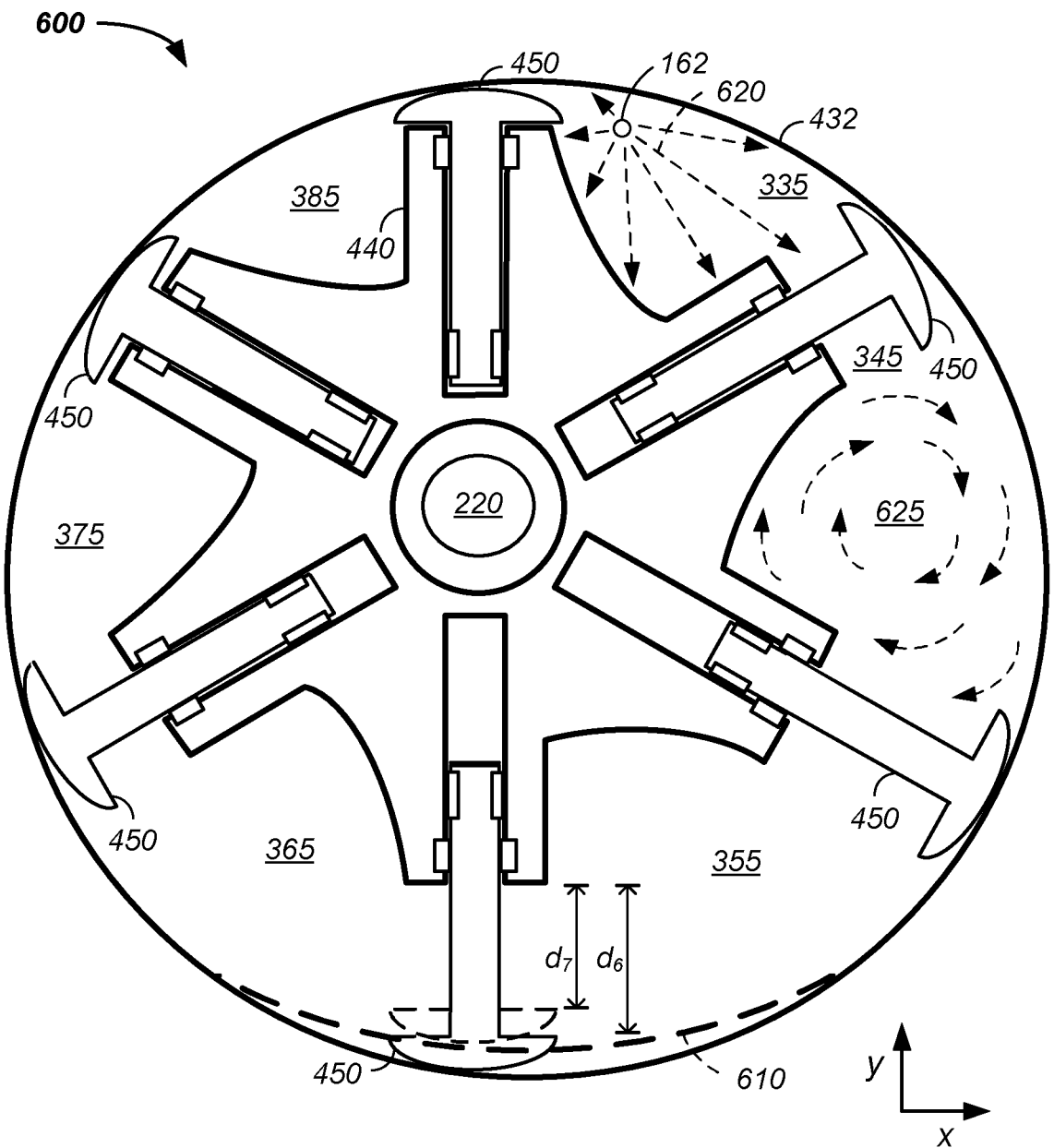
FIG. 6 illustrates a housing build-up.

Referring now to FIG. 6, an optional build-up 610 on the interior wall of the housing 430 is illustrated from an about 5 o'clock to an about 7 o'clock position of the engine rotation. The build-up 610 allows a greater offset of the rotor 440 along the y-axis. Without the build-up, a smaller y-axis offset of the rotor 440 relative to the housing 430 is needed as the vane 450 at the 6 o'clock position would not reach the inner wall of the housing 430 without the build-up 610. As illustrated, the build-up 610 reduces the vane extension distance required for the vane 450 to reach from the rotor 440 to the housing 430 from a sixth distance, $d_6$, to a seventh distance, $d_7$. As described, supra, the greater offset in the x- and y-axes of the rotor 440 relative to an inner wall of the housing 432 yields enhanced rotary engine 110 output power and/or efficiency by increasing the volume of the first expansion chamber 335, second expansion chamber 345, and/or third expansion chamber 345. Herein, the inner wall of the housing 432 refers to the inner wall of housing 210, regardless of rotor offset position, use of housing cut-outs, and/or use of a housing build-up.

Method of Operation

For the purposes of this discussion, any of the single offset-rotary engine 300, double offset rotary engine 400, rotary engine having a cutout 500, rotary engine having a build-up 600, or a rotary engine having one or more elements described herein is applicable to use as the rotary engine 110 used in this example. Further, any housing 210, rotor 440, and vane 450 dividing the rotary engine 110 into expansion chambers is optionally used as in this example. For clarity, a reference expansion chamber 333 is used to describe a current position of the expansion chambers. For example, the reference chamber 333 rotates in a single rotation from the 12 o'clock position and sequentially through the 1 o'clock position, 3 o'clock position, 5 o'clock position, 7 o'clock position, 9 o'clock position, and 11 o'clock position before returning to the 12 o'clock position.

Figure 7:
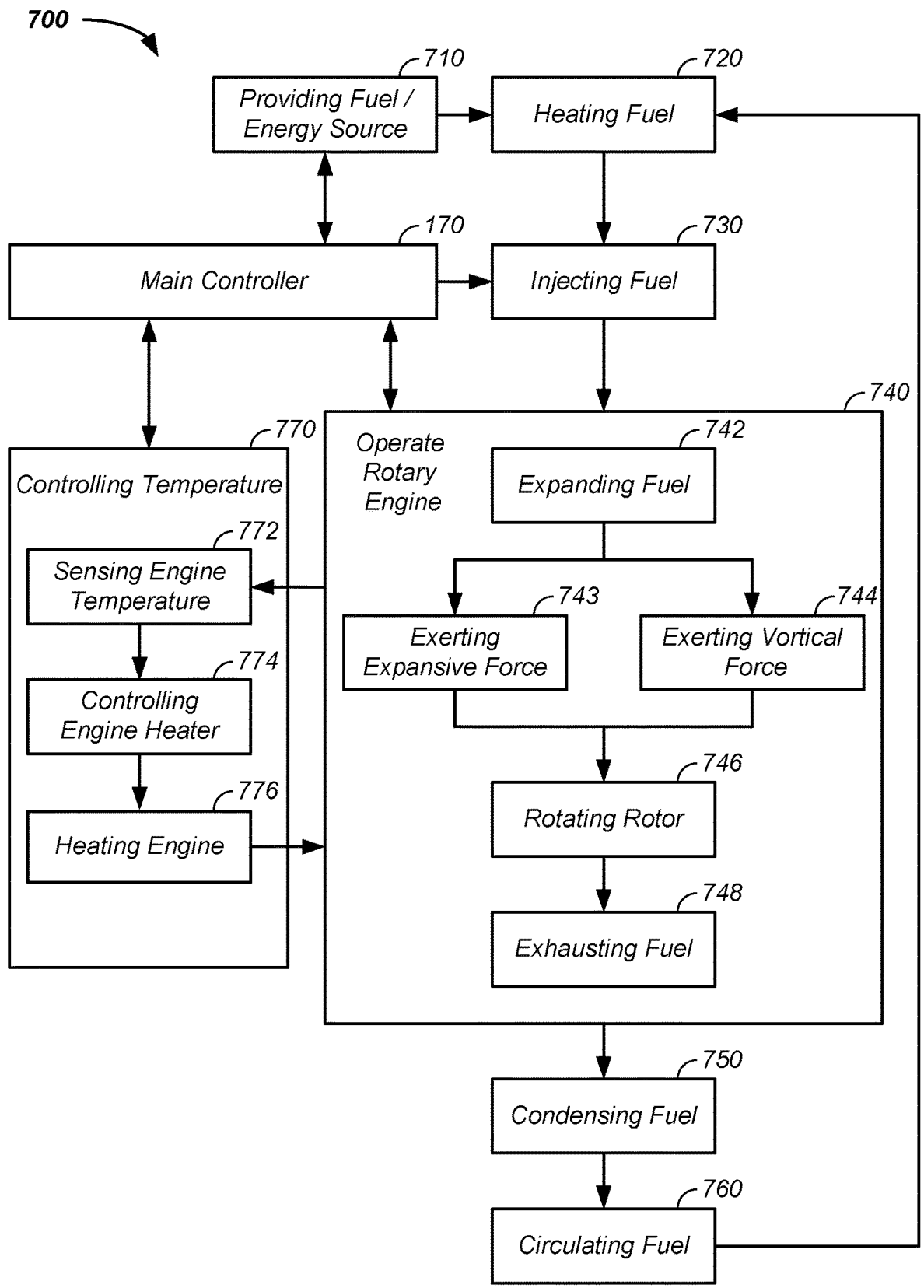
FIG. 7 provides a block diagram of a method of use of the rotary engine system.

Referring now to FIG. 7, a flow chart of an operation process 700 of the rotary engine system 100 in accordance with a preferred embodiment is described. Process 700 describes the operation of rotary engine 110.

Initially, a fuel and/or energy source is provided 710. The fuel is optionally from the external energy source 150. The energy source 150 is a source of: radiation, such as solar; vibration, such as an acoustical energy; and/or heat, such as convection. Optionally the fuel is from an external combustion chamber 154.

Throughout operation process 700, a first parent task circulates the fuel 760 through a closed loop. The closed loop cycles sequentially through: heating the fuel 720; injecting the fuel 730 into the rotary engine 110; expanding the fuel 742 in the reference expansion chamber; one or both of exerting an expansive force 743 on the rotor 440 and exerting a vortical force 744 on the rotor 440; rotating the rotor 746 to drive an external process, described infra; exhausting the fuel 748; condensing the fuel 750; and repeating the process of circulating the fuel 760. Preferably, the external energy source 150 provides the energy necessary in the heating the fuel step 720. Individual steps in the operation process are further described, infra.

Throughout the operation process 700, an optional second parent task maintains temperature 770 of at least one component of the rotary engine 110. For example, a sensor senses engine temperature 772 and provides the temperature input to a controller of engine temperature 774. The controller directs or controls a heater 776 to heat the engine component. Preferably, the temperature controller 770 heats at least the first expansion chamber 335 to an operating temperature in excess of the vapor-point temperature of the fuel. Preferably, at least the first three expansion chambers 335, 345, 355 are maintained at an operating temperature exceeding the vapor-point of the fuel throughout operation of the rotary engine system 100. Preferably, the fluid heater 140 is simultaneously heating the fuel to a temperature about proximate or less than the vapor-point temperature of fluid. Hence, when the fuel is injected through the injector 160 into the first expansion chamber 335, the fuel flash vaporizes exerting expansive force 743, causing the rotor 440 to rotate and/or starts to rotate within the reference chamber due to reference chamber geometry and rotation of the rotor to form the vortical force 744 forces the rotor 440 to rotate.

The fuel is optionally any fuel that expands into a vapor, gas, and/or gas-vapor mix where the expansion of the fuel releases energy used to drive the rotor 440. The fuel is preferably a liquid component and/or a fluid that phase changes to a vapor phase at a very low temperature and has a significant vapor expansion characteristic. Fuels and energy sources are further described, infra.

In task 720, the fluid heater 140 preferably superheats the fuel to a temperature greater than or equal to a vapor-point temperature of the fuel. For example, if a plasmatic fluid is used as the fuel, the fluid heater 140 heats the plasmatic fluid to a temperature greater than or equal to a vapor-point temperature of plasmatic fluid.

In a task 730, the injector 160 injects the heated fuel, via a first inlet port 162, also referred to herein as the first fuel inlet port, into the reference cell 333, which is the first expansion chamber 335 at time of fuel injection into the rotary engine 110. The first inlet port 162 is optionally a port through one or more of: (1) the housing 210, (2) the first endplate 212, and (3) the second endplate 214 into the reference cell 333. Because the fuel is superheated, or in the case of a cryogenic fuel super-cooled, the fuel flash-vaporizes and expands 742, which exerts one of more forces on the rotor 440. A first force is an expansive force 743 resultant from the phase change of the fuel from predominantly a liquid phase to substantially a vapor and/or gas phase. The expansive force acts on the rotor 440 as described, supra, and is represented by force, F, in FIG. 4 and is illustratively represented as expansive force vectors 620 in FIG. 6. A second force is a vortical force 744 exerted on the rotor 440. The vortical force 744 is resultant of geometry of the reference cell, which causes a vortex or rotational movement of the fuel in the chamber based on the geometry of the inlet port and/or injection port, rotor outer wall 442 of the rotor 440, inner wall 432 of the housing 210, first endplate 212, second endplate 214, and the extended vane 450 and is illustratively represented as vortex force vectors 625 in FIG. 6. A third force is a hydraulic force of the fuel pushing against the leading vane as the inlet preferably forces the fuel into the leading vane upon injection of the fuel 730. The hydraulic force exists early in the power stroke before the fluid is flash-vaporized. All of the hydraulic force, the expansive force vectors 620, and vortex force vectors 625 optionally exist simultaneously in the reference cell 333, in the first expansion chamber 335, second expansion chamber 345, and third expansion chamber 355. Hydraulic forces are optionally achieved in the second and/or third expansion chambers 335, 345 through use of second and third fuel inlet ports to the second and third expansion chambers 335, 345, respectively.

When the fuel is introduced into the reference cell 333 of the rotary engine 110, the fuel begins to expand hydraulically and/or about adiabatically in a task 740. The expansion in the reference cell begins the power stroke or power cycle of engine, described infra. In a task 746, the hydraulic and about adiabatic expansion of fuel exerts the expansive force 743 upon a leading vane 450 or upon the surface of the vane 450 bordering the reference cell 333 in the direction of rotation 390 of the rotor 440. Simultaneously, in a task 744, a vortex generator, generates a vortex 625 within the reference cell, which exerts a vortical force 744 upon the leading vane 450, which exceed the vortical force applied to the trailing chamber due to the larger surface area of the leading vane. The vortical force 744 adds to the expansive force 743 and contributes to rotation 390 of rotor 450 and shaft 220. Alternatively, either the expansive force 743 or vortical force 744 causes the leading vane 450 to move in the direction of rotation 390 and results in rotation of the rotor 746 and shaft 220. Examples of a vortex generator include: an aerodynamic fin, a vapor booster, a vane wingtip, expansion chamber geometry, valving, first inlet port 162 orientation, an exhaust port booster, and/or power shaft injector inlet.

The about adiabatic expansion resulting in the expansive force 743 and the generation of a vortex resulting in the vortical force 744 continue throughout the power cycle of the rotary engine, which is nominally complete at about the 6 o'clock position of the reference cell. Thereafter, the reference cell progressively decreases in volume, as in the first reduction chamber 365, second reduction chamber 375, and third reduction chamber 385. In a task 748, the fuel is exhausted or released 748 from the reference cell, such as through exhaust grooves cut through the housing 210, the first endplate 212, and/or the second endplate 214 at or about the 6 o'clock to 8 o'clock position. The exhausted fuel is optionally discarded in a non-circulating system. Preferably, the exhausted fuel is condensed 750 to liquid form in the condenser 120, optionally stored in the reservoir 130, and re-circulated 760, as described supra.

Still referring to FIG. 7, the main controller 170 optionally controls any of the steps of providing fuel 710, heating the fuel 720, injecting the fuel 730, operating the rotary engine, condensing the fuel 750, circulating the fuel 760, controlling temperature 770, and/or controlling electrical output.

Fuel

Fuel is optionally any liquid or liquid/solid mixture that expands into a vapor, vapor-solid, gas, compressed gas, gas-solid, gas-vapor, gas-liquid, gas-vapor-solid mix where the expansion of the fuel releases energy used to drive the rotor 440. The fuel is preferably substantially a liquid component and/or a fluid that phase changes to a vapor phase at a very low temperature and has a significant vapor expansion characteristic. Additives, such as deuterium oxide, into the fuel and/or mixtures of fuels include any permutation and/or combination of fuel elements described herein. A first example of a fuel is any fuel that both phase changes to a vapor at a very low temperature and has a significant vapor expansion characteristic for aid in driving the rotor 440, such as a nitrogen and/or an ammonia-based fuel. A second example of a fuel is a diamagnetic liquid fuel. A third example of a fuel is a liquid having a permeability of less than that of a vacuum and that has an induced magnetism in a direction opposite that of a ferromagnetic material. A fourth example of a fuel is a fluorocarbon, such as Fluorinert liquid FC-77® (3M, St. Paul, Minn.), 1,1,1,3,3-pentafluoropropane, and/or Genetron® 245fa (Honeywell, Morristown, N.J.). A fifth example of a fuel is a plasmatic fluid composed of a non-reactive liquid component to which a solid component is added. The solid component is optionally a particulate held in suspension within the liquid component. Preferably the liquid and solid components of the fuel have a low coefficient of vaporization and a high heat transfer characteristic making the plasmatic fluid suitable for use in a closed-loop engine with moderate operating temperatures, such as below about 400° C. (750° F.) at moderate pressures. The solid component is preferably a particulate paramagnetic substance having non-aligned magnetic moments of the atoms when placed in a magnetic field and that possess magnetization in direct proportion to the field strength. An example of a paramagnetic solid additive is powdered magnetite ($Fe_3O_4$) or a variation thereof. The plasmatic fluid optionally contains other components, such as an ester-based fuel lubricant, a seal lubricant, and/or an ionic salt. The plasmatic fluid preferably comprises a diamagnetic liquid in which a particulate paramagnetic solid is suspended, such as when the plasmatic fluid is vaporized the resulting vapor carries a paramagnetic charge, which sustains an ability to be affected by an electromagnetic field. That is, the gaseous form of the plasmatic fluid is a current-carrying plasma and/or an electromagnetically responsive vapor fluid. The exothermic release of chemical energy of the fuel is optionally used as a source of power.

The fuel is optionally an electromagnetically responsive fluid and/or vapor. For example, the electromagnetically responsive fuel contains one or more of: a salt and a paramagnetic material.

The engine system 100 is optionally run in either an open loop configuration or a closed loop configuration. In the open loop configuration, the fuel is consumed and/or wasted. In the closed loop, the fuel is consumed and/or re-circulated.

Power Stroke

The power stroke of the rotary engine 110 occurs when the fuel is expanding exerting the expansive force 743 and/or is exerting the vortical force 744. In a first example, the power stroke occurs from through about the first 180 degrees of rotation, such as from about the 12 o'clock position to the about 6 o'clock position. In a second example, the power stroke or a power cycle occurs through about 360 degrees of rotation. In a third example, the power stroke occurs from when the reference cell is in approximately the 1 o'clock position until when the reference cell is in approximately the 6 o'clock position. From the 1 o'clock to 6 o'clock position, the reference chamber 333 preferably increases continuously in volume, in a cross-sectional solid angle from the shaft 220 to the housing 210. The increase in volume allows energy to be obtained from the combination of vapor hydraulics, adiabatic expansion forces 743, and/or the vortical forces 744 as greater surface areas on the leading vane are available for application of the applied force backed by simultaneously increasing volume of the reference chamber 333. To maximize use of energy released by the vaporizing fuel, preferably the curvature of housing 210 relative to the rotor 450 results in a radial cross-sectional distance or a radial cross-sectional area that has a volume of space within the reference cell that increases at about a golden ratio, $\phi$, as a function of radial angle. The golden ratio is defined as a ratio where the lesser is to the greater as the greater is to the sum of the lesser plus the greater, equation 2.

$$\frac{a}{b} = \frac{b}{a+b} \qquad \text{(eq. 2)}$$

Assuming the lesser, a, to be unity, then the greater, b, becomes $\phi$, as calculated in equations 3 to 5.

$$\frac{1}{\phi} = \frac{\phi}{1+\phi} \qquad \text{(eq. 3)}$$

$$\phi^2 = \phi + 1 \qquad \text{(eq. 4)}$$

$$\phi^2 - \phi - 1 = 0 \qquad \text{(eq. 5)}$$

Using the quadratic formula, limited to the positive result, the golden ratio is about 1.618, which is the Fibonacci ratio, equation 6.

$$\phi = \frac{1-\sqrt{5}}{2} \cong 1.618033989 \qquad \text{(eq. 6)}$$

Hence, the cross-sectional area of the reference chamber 333 as a function of rotation or the surface area of the leading vane 450 as a function of rotation is preferably controlled by geometry of the rotary engine 110 to increase at a ratio of about 1.4 to 1.8 and more preferably to increase with a ratio of about 1.5 to 1.7, and still more preferably to increase at a ratio of about 1.618 through any of the power stroke from the about 1 o'clock to about the 6 o'clock position. More generally, at any position within the power stroke of the rotary engine, the radial cross-sectional area of a plane swept by the vane 450 between the center of the shaft 220 and the housing 210 increases from a first area to a second area by within 10, 5, 2, and/or 1 percent of 1.618 as a function of rotation of 1, 2, 3, 5, 10, 15, 30, 45, 60, and/or 90 degrees.

The ratio is controlled by a combination of one or more of use of: the double offset rotor geometry 400, use of the first cut-out 510 in the housing 210, use of the build-up 610 in the housing 210, and/or use of the second cut-out 520 in the housing. Further, the fuels described maintain about adiabatic expansion to a high ratio of gas/liquid when maintained at a relatively constant temperature by the temperature controller 172.

Expansion Volume

Figure 8:
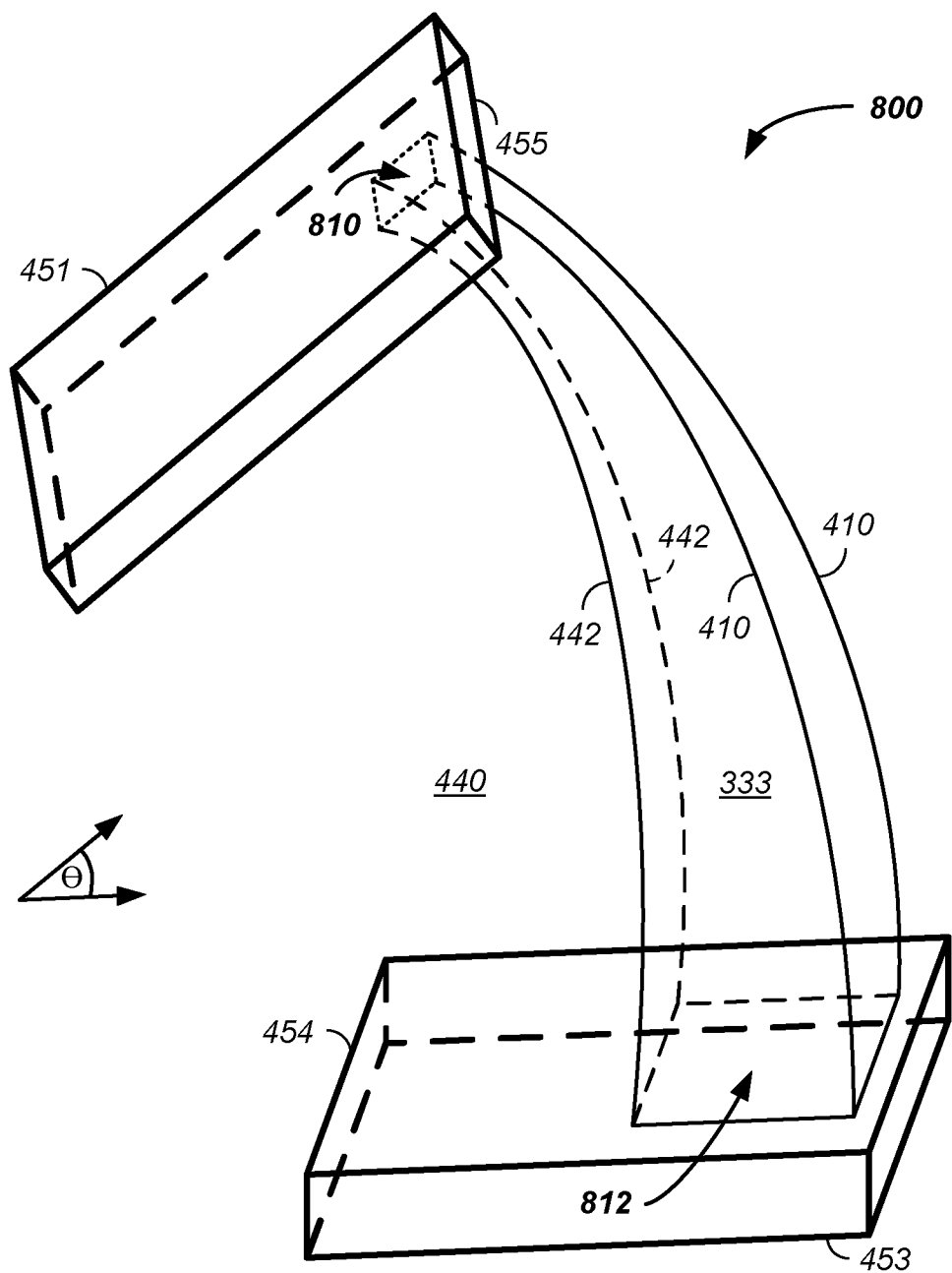
FIG. 8 illustrates changes in expansion chamber volume with rotor rotation.

Referring now to FIG. 8, an expansion volume of a chamber 800 preferably increases as a function of radial angle through the power stroke/expansion phase of the expansion chamber of the rotary engine, such as from about the 12 o'clock position through about the 6 o'clock position, where the radial angle, e, is defined by two hands of a clock having a center. Illustrative of a chamber volume, the expansion chamber 333 is illustrated between: an outer rotor surface 442 of the rotor 440, the inner wall of the housing 410, a trailing vane 451, and a leading vane 453. The trailing vane 451 has a trailing vane chamber side 455 and the leading vane 453 has a leading vane chamber side 454. It is observed that the expansion chamber 333 has a smaller interface area 810, $A_1$, with the trailing vane chamber side 455 and a larger interface area 812, $A_2$, with the leading vane chamber side 454. Fuel expansion forces applied to the rotating vanes 451, 453 are proportional to the interface area. Thus, the trailing vane interface area 810, $A_1$, experiences expansion force 1, $F_1$, and the leading vane interface area 812, $A_2$, experience expansion force 2, $F_2$. Hence, the net rotational force, $F_T$, is about the difference in the forces, according to equation 7.

$$F_T \cong F_2 - F_1 \qquad \text{(eq. 7)}$$

Figure 9:
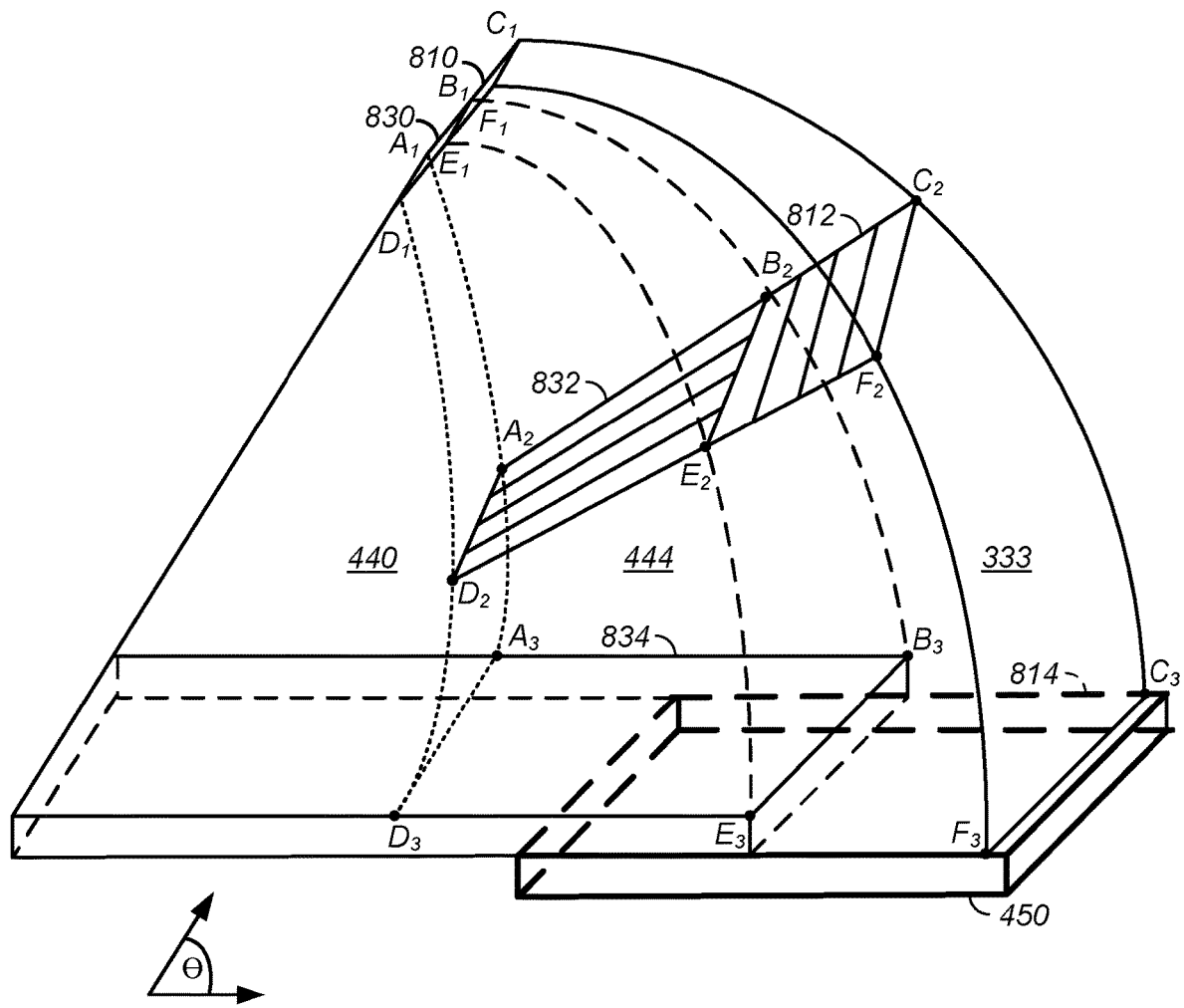
FIG. 9 illustrates an expanding concave expansion chamber with rotor rotation.

The force calculation according to equation 7 is an approximation and is illustrative in nature. However, it is readily observed that the net turning force in a given expansion chamber 333 is the difference in expansive force applied to the leading vane 453 and the trailing vane 451. Hence, the use of the any of: the single offset rotary engine 300, the double offset rotary engine 400, the first cutout 510, the build-up 610, and/or the second cutout 520, which allow a larger cross-section of the expansion chamber 333 as a function of radial angle yields more net turning forces on the rotor 440. Referring now to FIG. 9, to further illustrate, the cross-sectional area of the expansion volume 333 described in FIG. 8 is illustrated in FIG. 9 at three radial positions. In the first radial position, the cross-sectional area of the expansion volume 333 is illustrated as the area defined by points $B_1$, $C_1$, $F_1$, and $E_1$. The cross-sectional area of the expansion chamber 333 is observed to expand at a second radial position as illustrated by points $B_2$, $C_2$, $F_2$, and $E_2$. The cross-sectional area of the expansion chamber 333 is observed to still further expand at a third radial position as illustrated by points $B_3$, $C_3$, $F_3$, and $E_3$. Hence, as described supra, the net rotational force turns the rotor 440 due to the increase in cross-sectional area of the expansion chamber 333 as a function of radial angle.

Referring still to FIG. 9, a rotor cutout expansion volume is described that yields a yet larger net turning force on the rotor 440. As illustrated in FIG. 3, the outer surface of rotor 320 is circular. As illustrated in FIG. 4, the outer surface of the rotor 442 is optionally shaped to increase the distance between the outer surface of the rotor and the inner wall of the housing 432 as a function of radial angle through at least a portion of a expansion chamber 333. Optionally, the rotor 440 has an outer surface proximate the expansion chamber 333 that is concave. Preferably, the outer wall of rotor 440 includes walls next to each of: the endplates 212, 214, the trailing edge of the rotor, and the leading edge of the rotor. The concave rotor chamber is optionally described as a rotor wall cavity, a 'dug-out' chamber, or a chamber having several sides partially enclosing an expansion volume larger than an expansion chamber having an inner wall of a circular rotor. The 'dug-out' volume optionally increases as a function of radial angle within the reference expansion cell, illustrated as the expansion chamber or expansion cell 333. Referring still to FIG. 9, the 'dug-out' rotor 444 area of the rotor 440 is observed to expand with radial angle theta and is illustrated at the same three radial angles as the expansion volume cross-sectional area. In the first radial position, the cross-section of the 'dug-out' rotor 444 area is illustrated as the area defined by points $A_1$, $B_1$, $E_1$, and $D_1$. The cross-sectional area of the 'dug-out' rotor 440 volume is observed to expand at the second radial position as illustrated by points $A_2$, $B_2$, $E_2$, and $D_2$. The cross-sectional area of the 'dug-out' rotor 444 is observed to still further expand at the third radial position as illustrated by points $A_3$, $B_3$, $E_3$, and $D_3$. Hence, as described supra, the rotational forces applied to the leading rotor surface exceed the forces applied to the trailing rotor edge yielding a net expansive force applied to the rotor 440, which adds to the net expansive forces applied to the vane, $F_T$, which turns the rotor 440. The 'dug-out' rotor 444 volume is optionally machined or cast at time of rotor creation and the term 'dug-out' is descriptive in nature of shape, not of a manufacturing process of producing the dug-out rotor 444.

The overall volume of the expansion chamber 333 is increased by removing a portion of the rotor 440 to form the dug-out rotor. The increase in the overall volume of the expansion chamber using a dug-out rotor enhances rotational force of the rotary engine 110 and/or efficiency of the rotary engine.

Vane Valves/Seals
Fuel Routing Valves/Seals

Figure 10A:
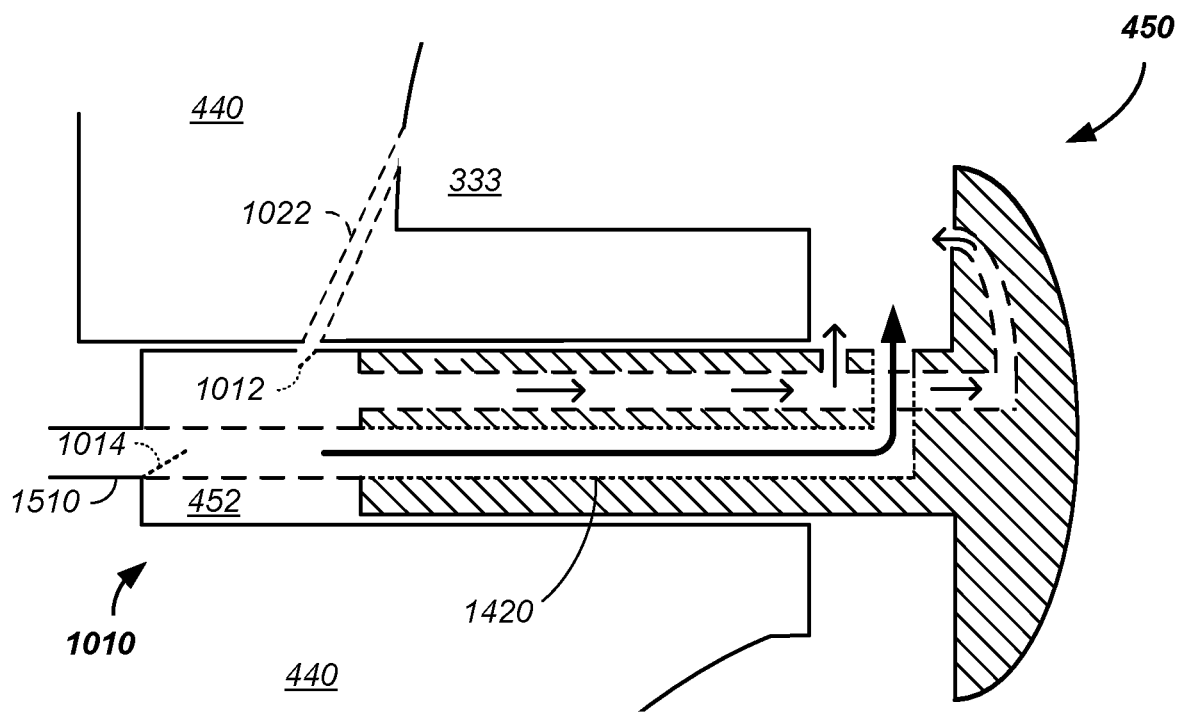
FIG. 10A illustrates a vane having valved flow pathways and FIG. 10B illustrates a vane having seals functioning as valves.
Figure 10B:
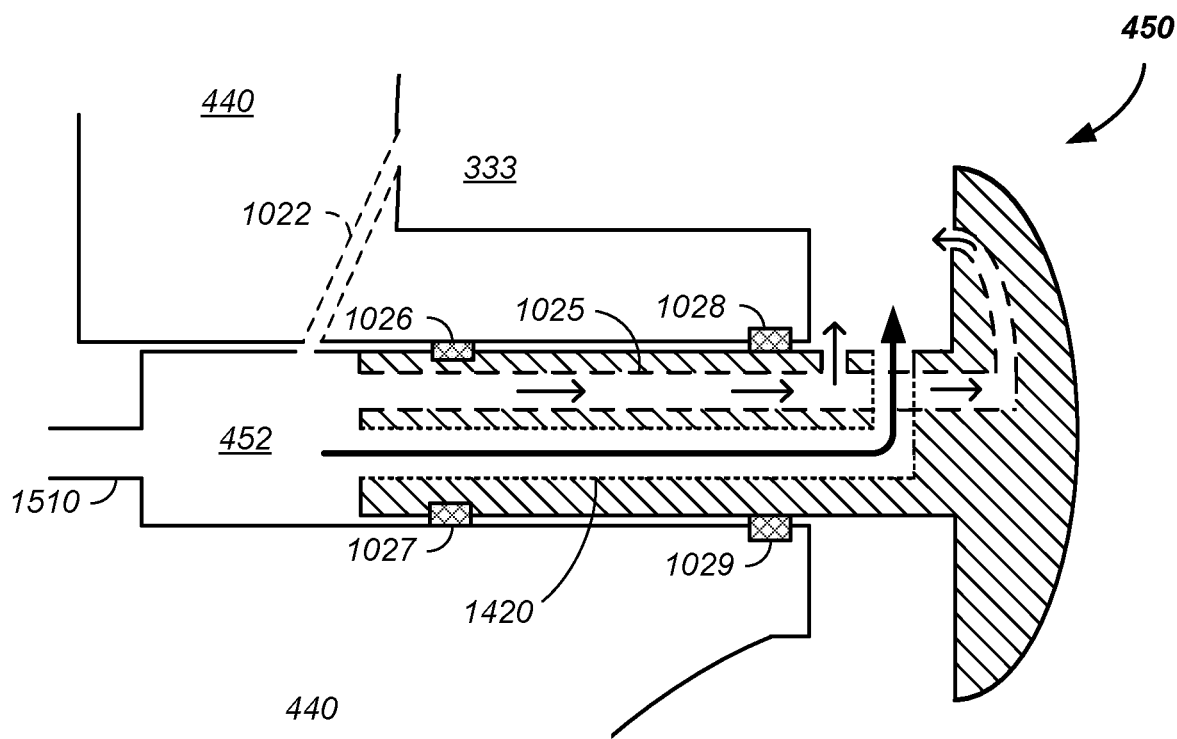
Figure 14A:
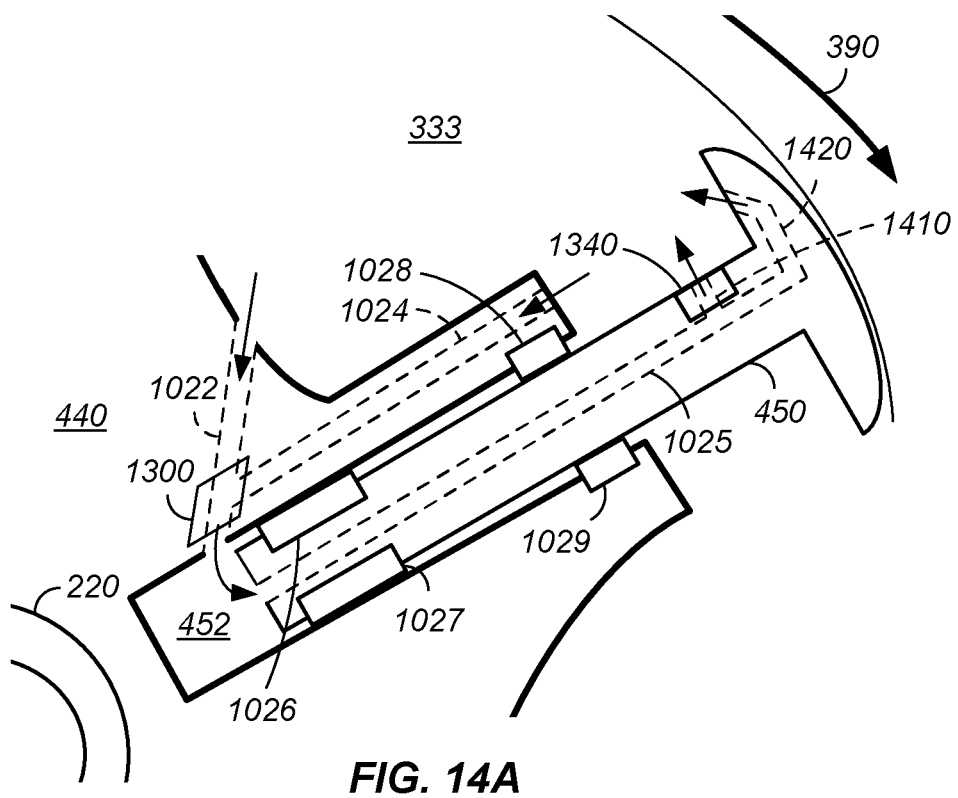
FIG. 14A and FIG. 14B illustrate a vane having multiple fuel paths and a vane/rotor rod, respectively.
Figure 14B:
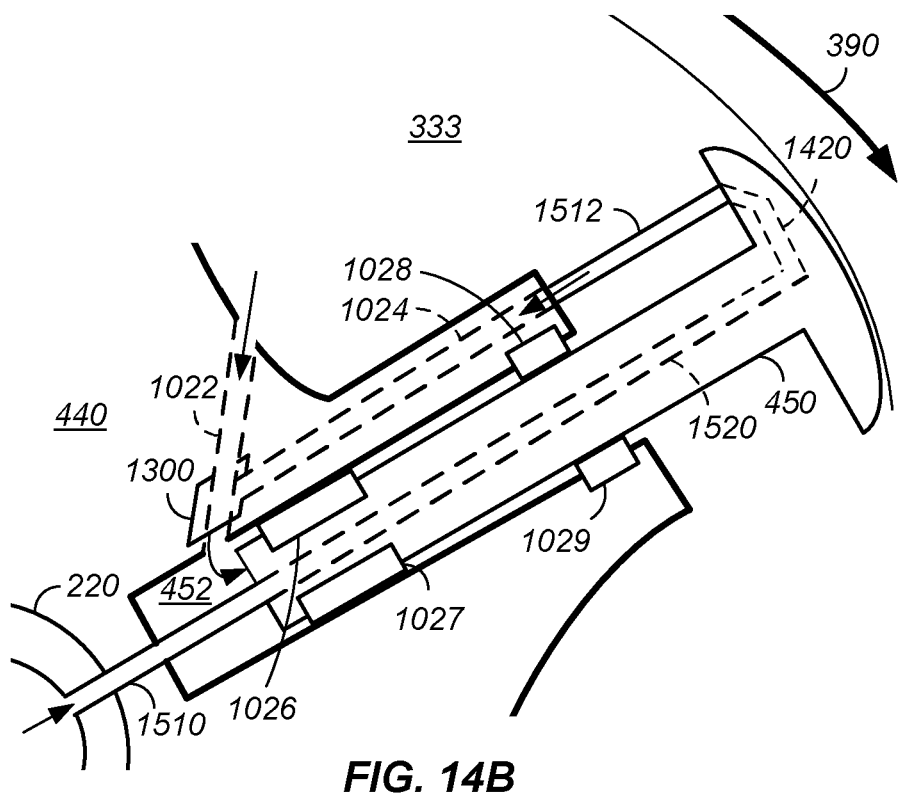

Referring now to FIG. 10A, FIG. 10B, and FIG. 14B, in another embodiment, gas, expanding gas, vapor, and/or fluid fuels are routed from an expansion chamber 333 through one or more rotor conduits 1020 leading from the expansion chamber 333 to the rotor-vane chamber 452 or rotor-vane slot on a shaft 220 side of the vane 450 in the rotor guide. The expanding fuel optionally runs through the rotor 440 to the rotor-vane chamber 452; into the vane 450 and/or into a tip of the vane 450; and into the expansion chamber 333. Fuel routing paths additionally optionally run through the shaft 220 of the rotary engine 110, through piping 1510, which is optionally thorium coated, and into the rotor-vane chamber 452. Any of the fuel routing paths are optionally controlled, such as a function of time, rotation, power demand, and/or load, using valves and/or seals as further described, infra.

Valves

Figure 11A:
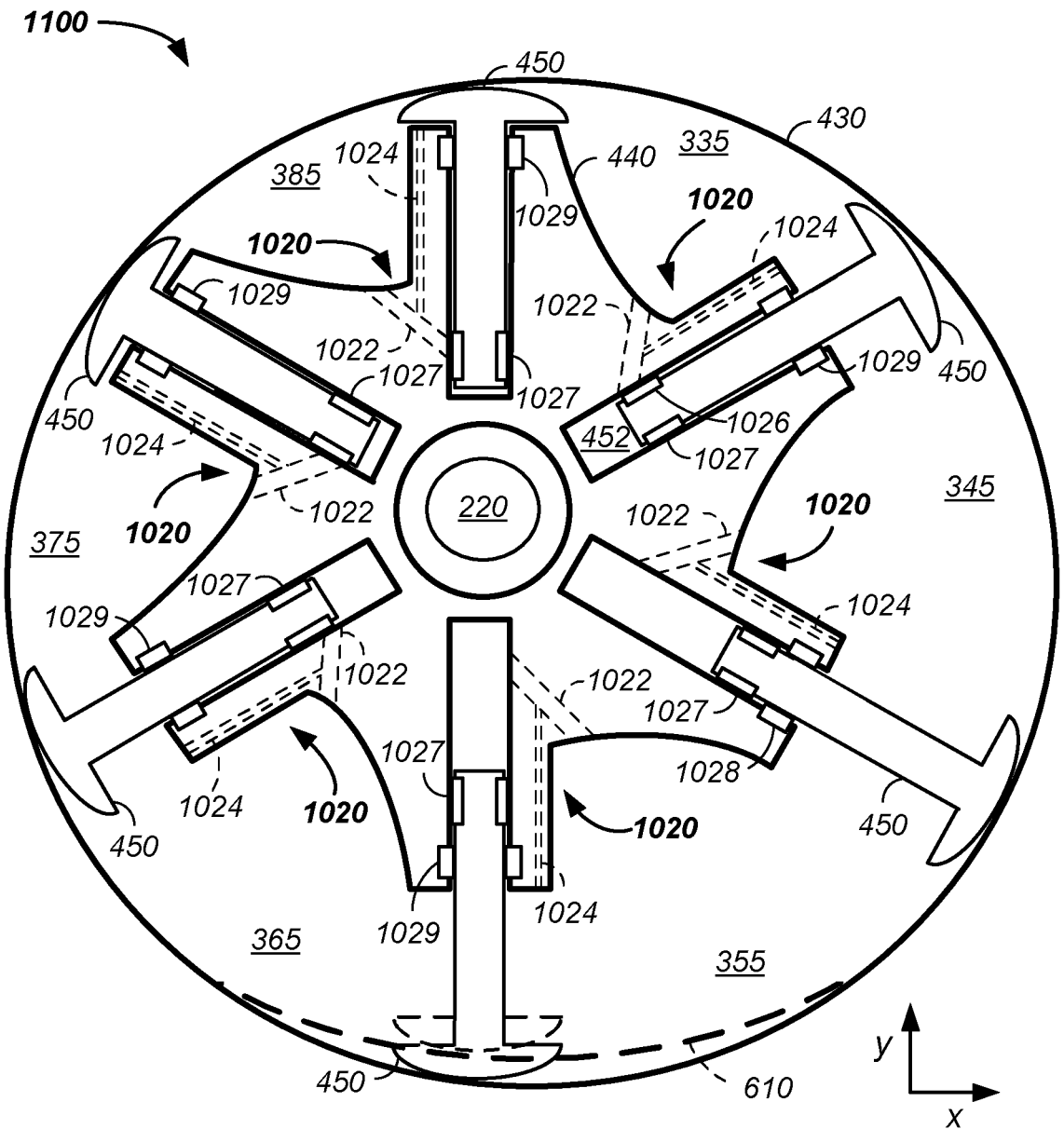
FIG. 11A illustrates a cross-section of a rotor having valving and FIG. 11B illustrates distances between vane valves.

Referring now to FIG. 10A and FIG. 11, one or more rotary engine valves 1010 are used to direct and/or time flow of the fuel through one or more elements of the rotary engine 110. To illustrate, several non-limiting examples are provided. In a first example of a rotary engine valve 1010, a rotor conduit valve 1012 is used to control timing of flow of fuel through a first rotor conduit 1022, further described infra, into a rotor-vane chamber 452, further described infra, and subsequently into any passageway leading therefrom. In a second example of a rotary engine valve 1010, a shaft fuel conduit inlet port, referred to herein as a second inlet port 1014 or second fuel inlet port, is used to control flow of fuel anywhere through a passageway leading through the shaft 220 and subsequently through the vane 450. In a third example, the rotary engine valves are optionally positioned in: (1) the rotor 440, such as in a rotor conduit 1020; (2) in a vane 450, such as in a vane conduit, a vane base, a vane head, a vane wing, a trailing vane side; and/or (3) in the shaft 220, such as in a shaft passageway. Any of the rotary engine valves 1010 are optionally controlled by the main controller 170. Optionally, the main controller 170 times/sequences opening and/or closing of one or more of the rotary engine valves as a function of: (1) provided power to the rotary engine; (2) rotational velocity of the rotor 440 about the shaft 220; (3) a sensed temperature from a temperature sensor or probe, such as a from one or more of: an auxiliary fuel temperature sensor, an inlet port temperature sensor, an expansion chamber temperature sensor, a rotor temperature sensor, a vane temperature sensor, a shaft temperature sensor, and/or an exhaust port temperature sensor; and/or (4) a power load demand.

Seals

Referring now to FIG. 10B, an example of a vane 450 is provided. Preferably, the vane 450 includes a plurality of seals, such as: a lower trailing vane seal 1026, a lower leading seal 1027, an upper trailing seal 1028, an upper leading seal 1029, an inner seal, and/or an outer seal. The lower trailing seal 1026 and lower leading seal 1028 are preferably (1) attached to the vane 450 and (2) move or slide with the vane 450. The upper trailing seal 1028 and upper leading seal 1029 are (1) preferably attached to the rotor 440 and (2) do not move relative to the rotor 440 as the vane 450 moves. Both the lower trailing seal 1026 and upper trailing seal 1028 optionally operate as valves, as described infra. Each of the seals 1026, 1027, 1028, 1029 restrict and/or stop expansion of the fuel between the rotor 440 and vane 450.

Seals/Valves

One or more seals of the plurality of seals optionally/additionally function as valves. Particularly, as the seal translates along an axis, the seal functions as a valve by moving across a fuel and/or expansion fuel route. For example, as the vane 450 and lower trailing vane seal 1026 retracts into the rotor-vane chamber 452 the lower trailing vane seal 1026 optionally functions as a valve by closing a rotor passageway, such as the first rotor conduit 1022, and subsequently again functions as a valve by opening the rotor passageway when the vane 450 moves outward away from the rotor vane base 448. The use of one or more seals functioning as valves in the rotary engine 110 is further described, infra.

Referring again to FIG. 11, an example of a rotor 440 having fuel routing paths 1100 is provided. The fuel routing paths, valves, and seals are all optional. Upon expansion and/or flow, fuel in the expansion chamber 333 enters into a first rotor conduit, tunnel, or fuel pathway running from the expansion chamber 333 or rotor dug-out chamber 444 to the rotor-vane chamber 452. The rotor-vane chamber 452: (1) aids in guiding movement of the vane 450 and (2) optionally provides a partial containment chamber for fuel from the expansion chamber 333 as described herein and/or as a partial containment chamber from fuel routed through the shaft 220, as described infra.

In an initial position of the rotor 440, such as for the first expansion chamber at about the 2 o'clock position, the first rotor conduit 1022 terminates at the lower trailing vane seal 1026, which prevents further expansion and/or flow of the fuel through the first rotor conduit 1022. Stated again, the lower trailing vane seal 1026 functions as a valve that is off or closed at about the 2 o'clock position and is on or open at a later position in the power stroke of the rotary engine 110, as described infra. The first rotor conduit 1022 optionally runs from any portion of the expansion chamber 333 to the rotor vane guide, but preferably runs from the expansion chamber dug-out volume 444 of the expansion chamber 333 to an entrance port sealed by either the vane body 1610 or lower trailing vane seal 1026. When the entrance port is open, the fuel runs through the first rotor conduit 1022 into the rotor vane guide or rotor-vane chamber 452 on an inner radial side of the vane 450, which is the side of the vane closest to the shaft 220. The cross-sectional geometry of the first rotor conduit 1022 is preferably circular, but is optionally of any geometry. An optional second rotor conduit 1024 runs from the expansion chamber 333 to the first rotor conduit 1022. Preferably, the first rotor conduit 1022 includes a cross-sectional area at least twice that of a cross-sectional area of the second rotor conduit 1024. The intersection of the first rotor conduit 1022 and second rotor conduit 1024 is further described, infra.

As the rotor 440 rotates, such as to about the 4 o'clock position, the vane 450 extends toward the housing 430. As described supra, the lower trailing vane seal 1026 is preferably affixed to the vane 450 and hence moves, travels, translates, and/or slides with the vane 450. The extension of the vane 450 results in outward radial movement of the lower vane seals 1026, 1027. Outward radial movement of the lower trailing vane seal 1026 opens a pathway, such as opening of a valve, at the lower end of the first rotor conduit 1022 into the rotor-vane chamber 452 or the rotor guiding channel on the shaft 220 side of the vane 450. Upon opening of the lower trailing vane seal or valve 1026, the expanding fuel enters the rotor-vane chamber 452 behind the vane and the expansive forces of the fuel aid centrifugal forces in the extension of the vane 450 toward the inner wall of the housing 430. The lower vane seals 1026, 1027 hinders and preferably stops flow of the expanding fuel about outer edges of the vane 450. As described supra, the upper trailing vane seal 1028 is preferably affixed to the rotor 440, which results in no movement of the upper vane seal 1028 with movement of the vane 450. The optional upper vane seals 1028, 1029 hinders and preferably prevents direct fuel expansion from the expansion chamber 333 into a region between the vane 450 and rotor 440.

As the rotor 440 continues to rotate, the vane 450 maintains an extended position keeping the lower trailing vane seal 1028 in an open position, which maintains an open aperture at the terminal end of the first rotor conduit 1022. As the rotor 440 continues to rotate, the inner wall 432 of the housing 430 forces the vane 450 back into the rotor guide, which forces the lower trailing vane seal 1026 to close or seal the terminal aperture of the first rotor conduit 1022.

During a rotation cycle of the rotor 440, the first rotor conduit 1022 provides a pathway for the expanding fuel to push on the back of the vane 450 during the power stroke. The moving lower trailing vane seal 1026 functions as a valve opening the first rotor conduit 1022 near the beginning of the power stroke and further functions as a valve closing the rotor conduit 1022 pathway near the end of the power stroke.

Figure 12:
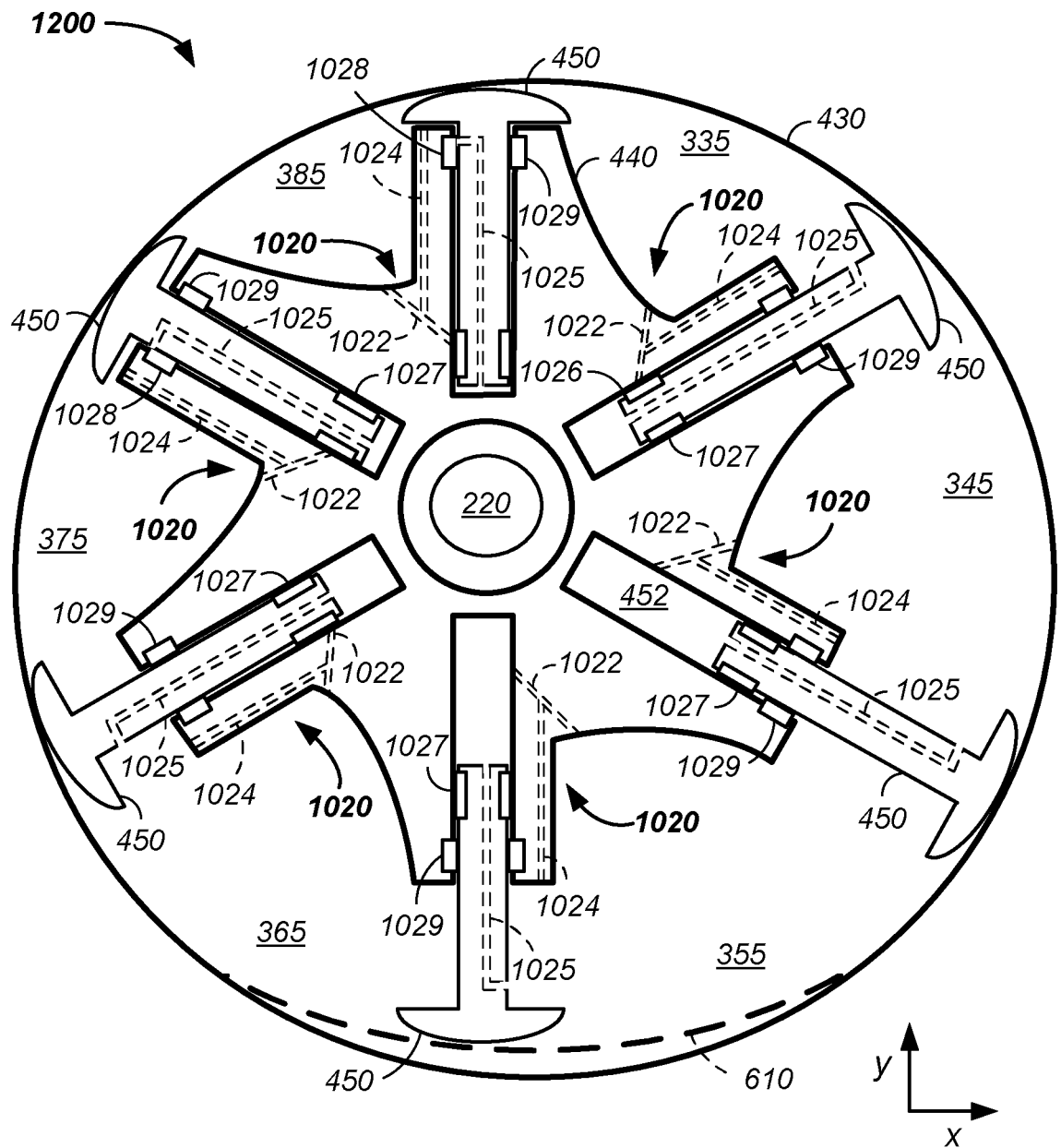
FIG. 12 illustrates a rotor and vanes having fuel paths.

Referring now to FIG. 12, concurrently, the upper trailing vane seal 1028 functions as a second valve. The upper trailing vane seal 1028 valves an end of the vane conduit 1025 proximate the expansion chamber 333. For example, at about the 10 o'clock and 12 o'clock positions, the upper trailing vane seal 1028 functions as a closed valve to the vane conduit 1025. Similarly, in the about 4 o'clock and 6 o'clock positions, the upper trailing vane seal functions as an open valve to the vane conduit 1025.

In one embodiment, a distance between vanes seals periodically varies as a function of rotation of the rotor 440 about the shaft 220. For example, the distance between the upper trailing vane seal 1028 and lower trailing vane seal 1026 is at a minimum distance when the vane 450 is fully extended and at a maximum distance, at least 200, 300, and/or 400 percent of the minimum distance, when the vane 450 is fully retracted. The distance similarly varies between the upper leading vane seal 1029 and lower leading vane seal 1027.

Optionally, the expanding fuel is routed through at least a portion of the shaft 220 to the rotor-vane chamber 452 in the rotor guide on the inner radial side of the vane 450, as discussed infra.

Figure 11B:
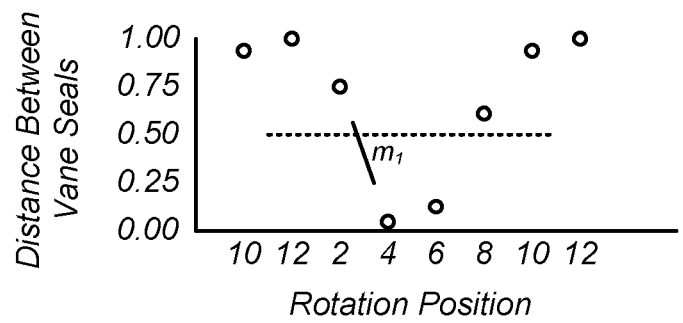

Referring now to FIG. 11B, nonlinearity of size of the reference chamber 333 as a function of rotation is further described. As described, supra, the reference chamber 333 expands in cross-sectional area and/or in total volume as the rotor 440 turns through the power stroke. Here, vane extension or inter-vane seal distance is quantified by use of a distance between two seals, one affixed to the rotor 440 that does not move radially and one affixed to the vane 450, that varies in radial position from the shaft 220 as a function of rotation of the rotor 440. In this example, the relative distance between the lower trailing vane seal 1026 and upper trailing vane seal 1024 is plotted as a function of rotor clock position. Several features of the design of the rotary engine 110 are demonstrated. First, the greatest rate of expansion of the inter-vane seal distance as a function of rotation occurs in the power stroke, such as represented by slope $m_1$ in FIG. 11B. Second, an intra-vane seal distance of greater than fifty percent of maximum is represented by greater than one-half of all clock positions.

Vane Conduits

Referring again to FIG. 12, in yet another embodiment the vane 450 includes a fuel conduit 1200. In this embodiment, expanding fuel moves from the rotor-vane chamber 452 in the rotor guide at the inner radial side of the vane 450 into one or more vane conduits. Preferably 2, 3, 4 or more vane conduits are used in the vane 450. For clarity, a single vane conduit is used in this example. The single vane conduit, first vane conduit 1025, flows about longitudinally along or through at least fifty percent of the length of the vane 450 and terminates along a trailing edge of the vane 450 into the expansion chamber 333. Hence, fuel runs and/or expands sequentially: from the first inlet port 162, through the expansion chamber 333, through a rotor conduit 1020, such as the first rotor conduit 1022 and/or second rotor conduit 1024, to the rotor-vane chamber 452 at the inner radial side of the vane 450, through a portion of the vane in the first vane conduit 1025, and exits or returns into the same expansion chamber 333. The exit of the first vane conduit 1025 from the vane 450 back to the expansion chamber 333, which is additionally referred to as the trailing expansion chamber 333, is optionally through a vane exit port on the trailing edge of the vane and/or through a trailing portion of the T-form vane head. The expanding fuel exiting the vane provides a rotational force aiding in rotation 390 of the rotor 450 about the shaft 220. Either the rotor 440 body or the upper trailing vane seal 1028 controls timing of opening and closing of a pressure equalization path between the expansion chamber 333 and the rotor-vane chamber 452. Preferably, the exit port from the vane conduit to the trailing expansion chamber 333 couples two vane conduits into a vane flow booster 1340. The vane flow booster 1340 is a species of a flow booster 1300, described infra. The vane flow booster 1340 uses fuel expanding and/or flowing in a first vane flow path in the vane to accelerate fuel expanding into the expansion chamber 333.

Flow Booster

Figure 13:
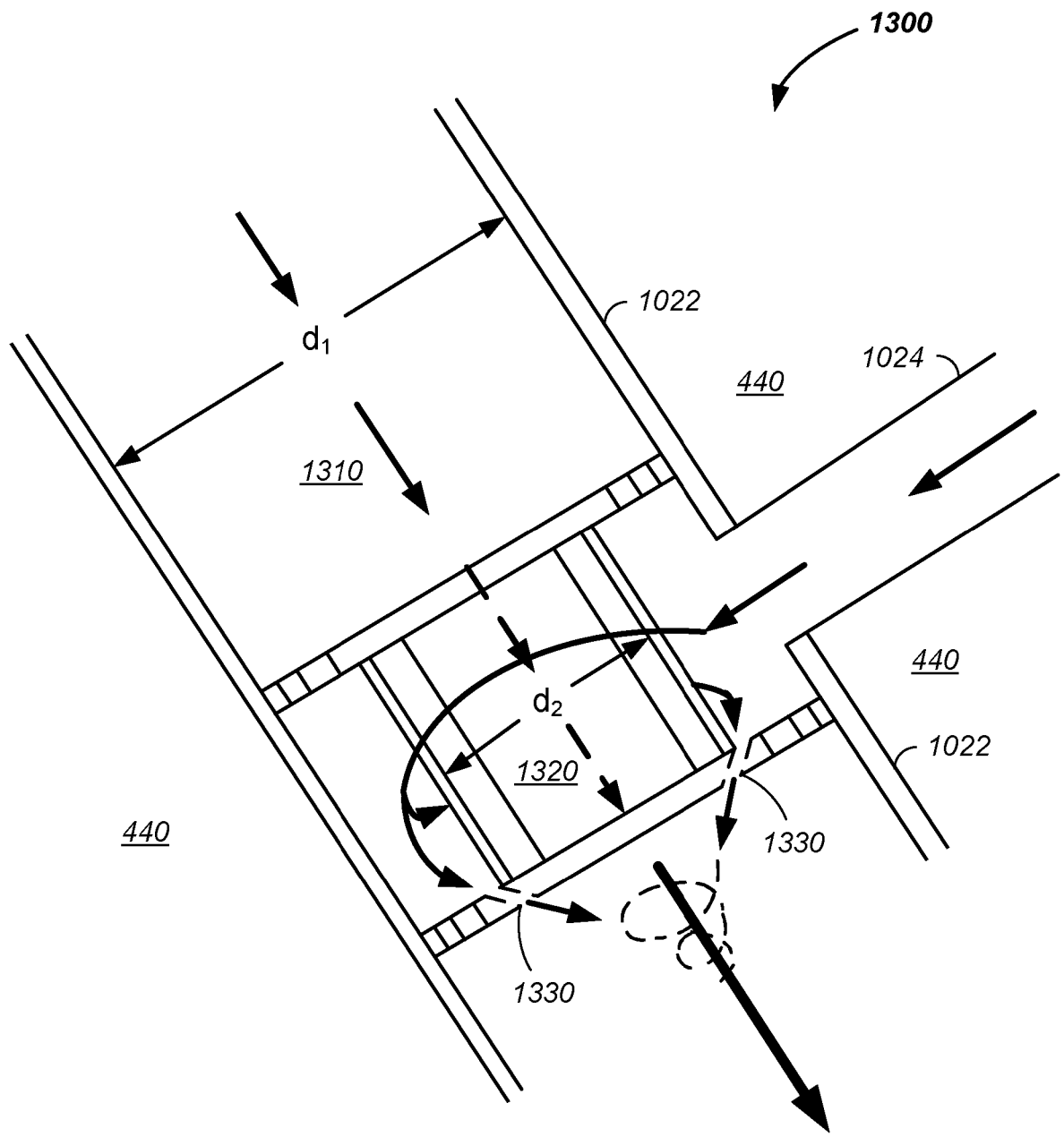
FIG. 13 illustrates a flow booster.

Referring now to FIG. 13, an optional flow booster 1300 or amplifier accelerates movement of the gas/fuel in the first rotor conduit 1022. In this description, the flow booster is located at the junction of the first rotor conduit 1022 and second rotor conduit 1024. However, the description applies equally to flow boosters located at one or more exit ports of the fuel flow path exiting the vane 450 into the trailing expansion chamber 333. In this example, fuel in the first rotor conduit 1022 optionally flows from a region having a first cross-sectional distance 1310, $d_1$, through a region having a second cross-sectional distance 1320, $d_2$, where $d_1 > d_2$. At the same time, fuel and/or expanding fuel flows through the second rotor conduit 1024 and optionally circumferentially encompasses an about cylindrical barrier separating the first rotor conduit 1022 from the second rotor conduit 1024. The fuel in the second rotor conduit 1024 passes through an exit port 1330 and mixes and/or forms a vortex with the fuel exiting out of the cylindrical barrier in the first rotor conduit 1022, which accelerates the fuel traveling through the first rotor conduit 1022.

Branching Vane Conduits

Referring now to FIG. 14A, in yet another embodiment, expanding fuel moves from the rotor-vane chamber 452 in the rotor guide at the inner radial side of the vane 450 into a branching vane conduit. For example, the first vane conduit 1025 runs about longitudinally along or through at least fifty percent of the length of the vane 450 and branches into at least two branching vanes, where each of the branching vanes exit the vane 450 into the trailing expansion chamber 333. For example, the first vane conduit 1025 branches into a first branching vane conduit 1410 and a second branching vane conduit 1420, which each in turn exit to the trailing expansion chamber 333. Alternatively, the expanding fuel passes through the first rotor conduit 1022 and applies an outward force on the base of the vane 450 toward the housing 210. In all cases, the fuel/expanding gas flow is optionally controlled using valves controlled by the main controller 170 and/or is controlled through mechanical means, such as the lower trailing vane seal 1026 functioning as a valve, as described supra.

Referring now to FIG. 14B, in still yet another embodiment, expanding fuel moves from the shaft 220 through a flow tube 1510, passing through the rotor-vane chamber 452, into a shaft-vane conduit 1520, which leads to an outlet, such as (1) a trailing vane side port, which provides an additional rotational force applied to the vane 450; (2) through an inward side of a trailing vane wing to provide an outward sealing force pushing the vane 450 toward the housing 210; and/or (3) into the second rotor conduit 1024, optionally via a telescoping second rotor conduit insert 1512, to provide a booster flow to fuel expanding through the first rotor conduit 1022. In all cases, the fuel/expanding gas flow is optionally controlled using one or more valves, positioned anywhere in the fuel expansion/flow path, controlled by the main controller 170. For example, fuel flow from the shaft 220 is timed using the main controller 170 to: (1) provide an outward force on the vane toward the housing at zero or low rotational velocity, such as less 5, 10, 50, and/or 100 revolutions per minute; (2) to provide additional vane rotational forces when energy/load demand increases and/or is above a threshold; and/or (3) when provided energy to the rotary engine 110 is increasing and/or above a threshold. Fuel flow through the shaft 220 to move the vane 450 toward the housing 410 is useful to initiate a vane-housing seal at startup of the rotary engine 110 and/or to maintain proximate contact between the vane 450 and the housing 410 at low rotational speeds of the rotary engine 110 where centrifugal force is not sufficient to push the vane 450 radially outward to a sealing position.

Multiple Fuel Lines

Figure 15A:
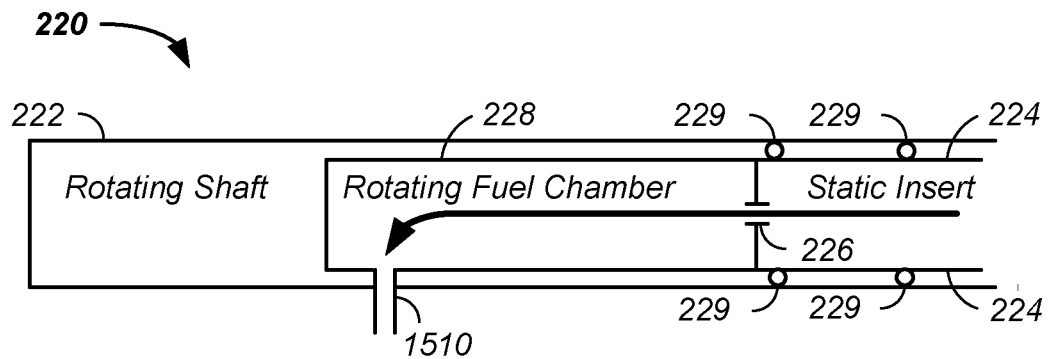
FIG. 15A and FIG. 15B illustrate a fuel path running through a shaft and into a vane, respectively.
Figure 15B:
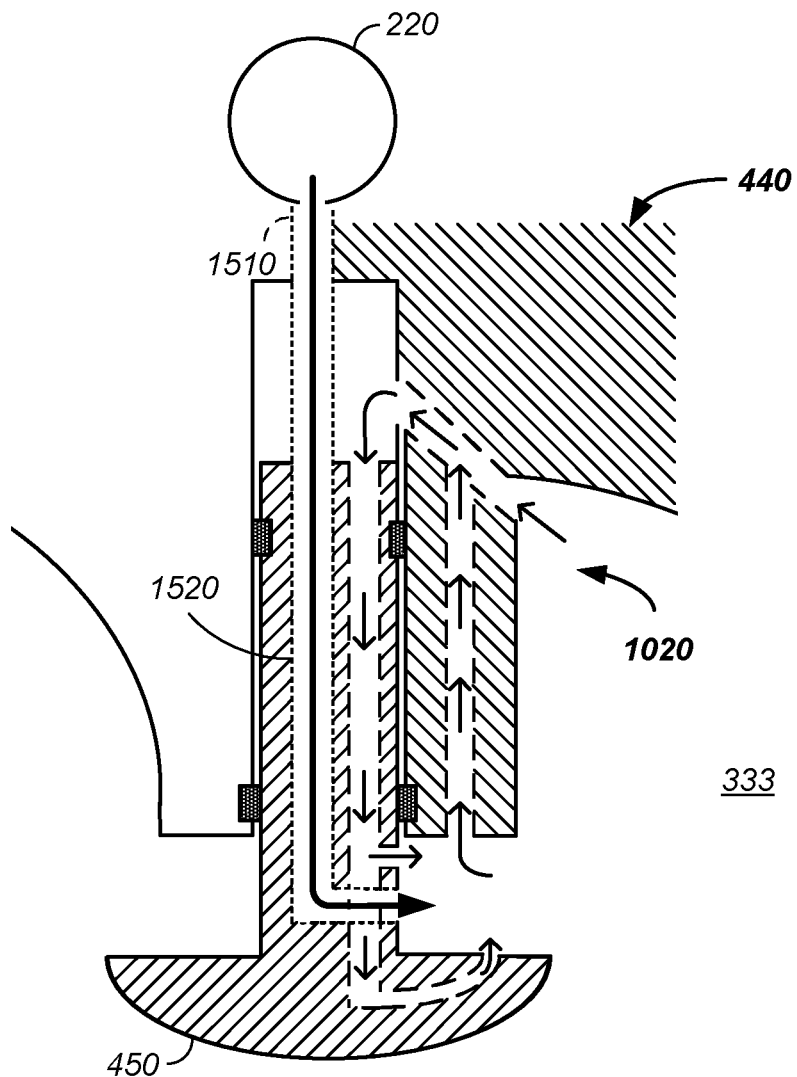

Referring now to FIG. 15A and FIG. 15B, in still yet an additional embodiment, fuel additionally enters into the rotor-vane chamber 452 through at least a portion of the shaft 220. Referring now to FIG. 15A, the shaft 220 is illustrated. The shaft 220 optionally includes an internal insert 224. The insert 224 remains static while a wall 222 of the shaft 220 rotates about the insert 224 on one or more bearings 229. Fuel, preferably under pressure, flows from the insert 224 through an optional valve 226, which is optionally controlled by the main controller 170, into a fuel shaft chamber 228, which rotates with the shaft wall 222. Referring now to FIG. 15B, a flow tube 1510, which rotates with the shaft wall 222 transports the fuel from the rotating fuel shaft chamber 228 and optionally through the rotor-vane chamber 452 where the fuel enters into a shaft-vane conduit 1520, which terminates at the trailing expansion chamber 333. The pressurized fuel in the static insert 224 expands before entering the expansion chamber 333 and the force of expansion and/or directional booster force of propulsion provides torsional forces against the rotor 440 to force the rotor to rotate. Optionally, a second vane conduit is used in combination with a flow booster to enhance movement of the fuel into the expansion chamber 333 adding additional expansion and directional booster forces. Upon entering the expansion chamber 333, the fuel may proceed to expand through any of the rotor conduits 1020, as described supra.

Vanes

Figure 16A:
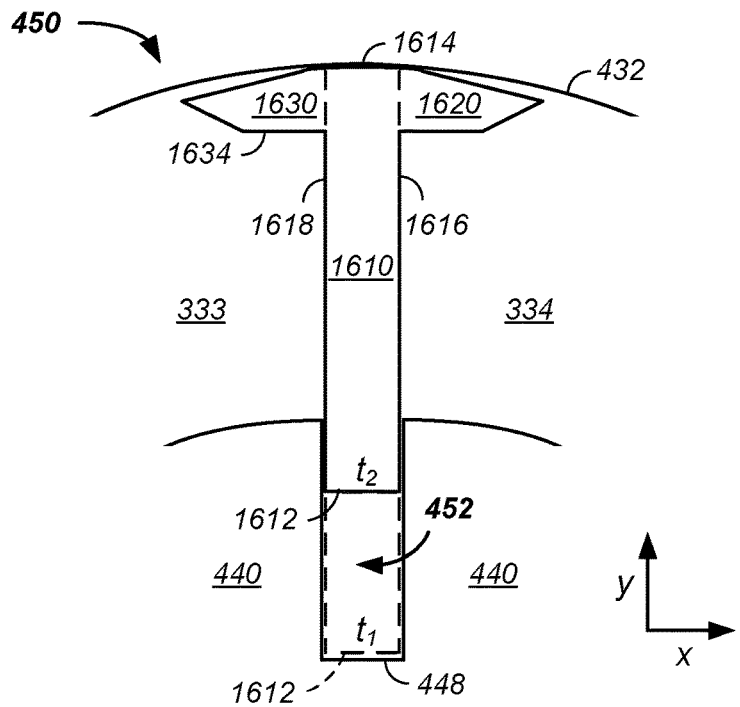
FIG. 16A and FIG. 16B respectively illustrate a sliding vane in a cross-sectional view and in a perspective view and FIG. 16C illustrates a vane with a flexible vane head.

Referring now to FIG. 16A, a sliding vane 450 is illustrated relative to a rotor 440 and the inner wall 432 of the housing 210. The inner wall 432 is exemplary of the inner wall of any rotary engine housing. Referring still to FIG. 16A and now referring to FIG. 16B, the vane 450 is illustrated in a perspective view. The vane includes a vane body 1610 between a vane base 1612, and vane-tip 1614. The vane-tip 1614 is proximate the inner housing 432 during use. The vane 450 has a leading face 1616 proximate a leading chamber 334 and a trailing face 1618 proximate a trailing chamber or reference expansion chamber 333. In one embodiment, the leading face 1616 and trailing face 1618 of the vane 450 extend as about parallel edges, sides, or faces from the vane base 1612 to the vane-tip 1614. Optional wing tips are described, infra. Herein, the leading chamber 334 and reference expansion chamber 333 are both expansion chambers. The leading chamber 334 and reference expansion chamber 333 are chambers on opposite sides of a vane 450.

Vane Axis

The vanes 450 rotate with the rotor 440 about a rotation point and/or about the shaft 220. Hence, a localized axis system is optionally used to describe elements of the vane 450. For a static position of a given vane, an x-axis runs through the vane body 1610 from the trailing chamber or 333 to the leading chamber 334, a y-axis runs from the vane base 1612 to the vane-tip 1614, and a z-axis is normal to the x/y-plane, such as defining a thickness of the vane. Hence, as the vane rotates, the axis system rotates and each vane has its own axis system at a given point in time.

Vane Head

Figure 17:
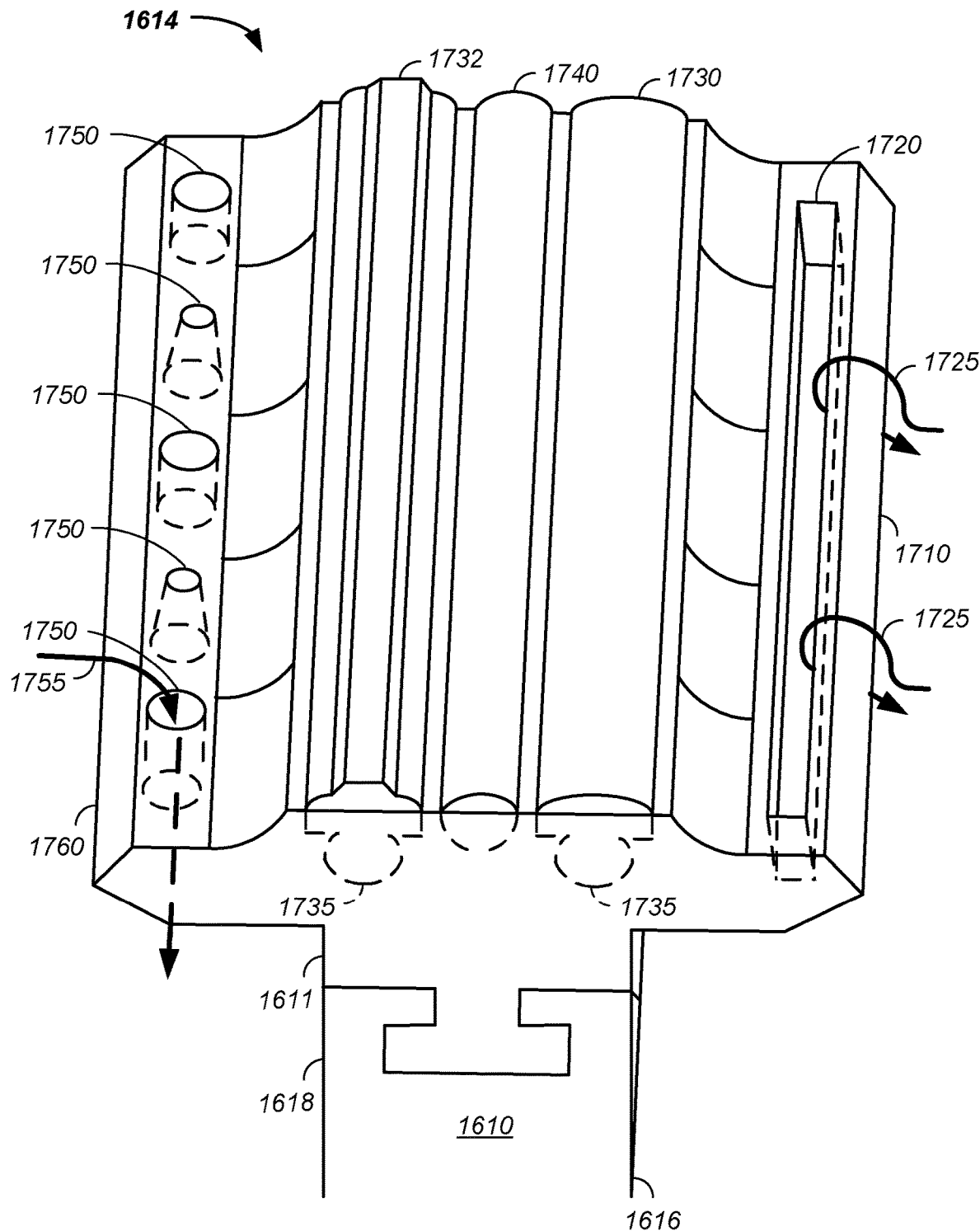
FIG. 17 illustrates a perspective view of a vane tip.

Referring now to FIG. 17, the vane 450 optionally includes a replaceably attachable vane head 1611 attached to the vane body 1610. The replaceable vane head 1611 allows for separate machining and ready replacement of the vane wings, such as the leading vane wing 1620 and/or the trailing vane wing 1630, and vane tip 1614 elements. Optionally the vane head 1611 snaps or slides onto the vane body 1610.

Vane Caps/Vane Seals

Preferably vane caps, not illustrated, cover the upper and lower surface of the vane 450. For example, an upper vane cap covers the entirety of the upper z-axis surface of the vane 450 and a lower vane cap covers the entirety of the lower z-axis surface of the vane 450. Optionally the vane caps function as seals or seals are added to the vane caps.

Vane Movement

Referring again to FIG. 16A and FIG. 16B, the vane 450, optionally, slidingly moves along and/or within the rotor-vane chamber 452 or rotor-vane slot. The edges of the rotor-vane chamber 452 function as guides to restrict movement of the vane along the x-axis. The vane movement moves the vane body, in a reciprocating manner, toward and then away from the housing inner wall 432. The vane 450 is illustrated at a fully retracted position into the rotor-vane chamber 452 or rotor-vane channel at a first time, $t_1$, and at a fully extended position at a second time, $t_2$.

Vane Wing-Tips

Herein vane wings are defined, which extend away from the vane body 1610 along the x-axis. Certain elements are described for a leading vane wing 1620, that extends into the leading chamber 334 and certain elements are described for a trailing vane wing 1630, that extends into the expansion chamber 333. Any element described with reference to the leading vane wing 1620 is optionally applied to the trailing vane wing 1630. Similarly, any element described with reference to the trailing vane wing 1630 is optionally applied to the leading vane wing 1620. Further, the rotary engine 110 optionally runs clockwise, counter-clockwise, and/or is reversible from clock-wise to counter-clockwise rotation.

Figure 16B:
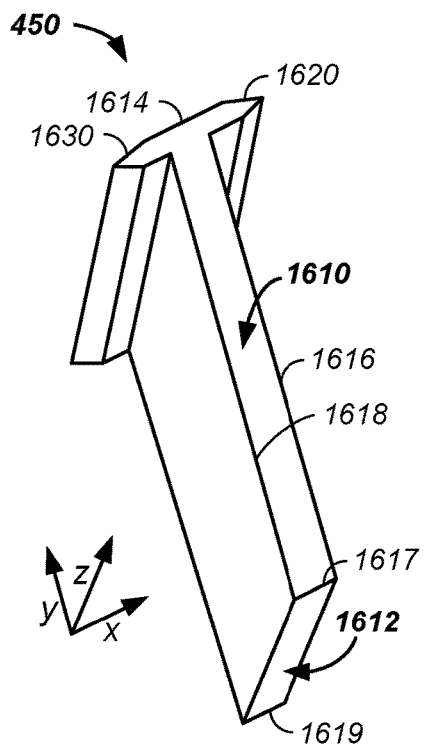

Still referring to FIG. 16A and FIG. 16B, optional vane-tips are illustrated. Optionally, one or more of a leading vane wing 1620, also referred to as a leading vane wing-tip, and a trailing vane wing 1630, also referred to as a trailing vane wing-tip, are added to the vane 450. The leading vane wing 1620 extends from about the vane-tip 1614 into the leading chamber 334 and the trailing vane wing 1630 extends from about the vane-tip 1614 into the trailing chamber or reference expansion chamber 333. The leading vane wing 1620 and trailing vane wing 1630 are optionally of any geometry.

Figure 16C:
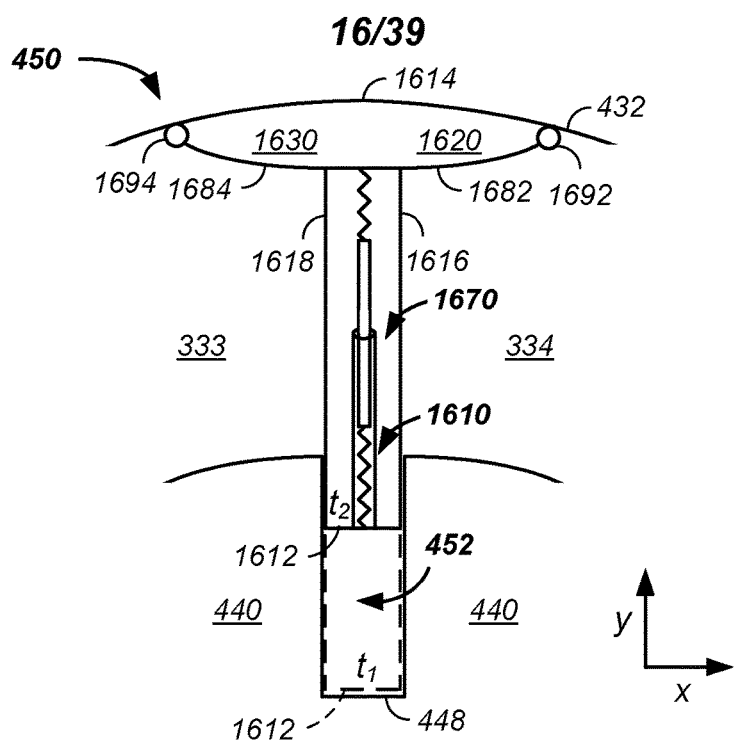

Referring now to FIG. 16C, another example of a vane 450 is described. In this example, the leading vane wing 1620 is a first flexible wing element 1682 and the trailing vane wing 1630 is a second flexible wing element 1684, where there is an air gap between the leading vane wing 1620 and the trailing vane wing 1630. As the rotor 440 rotates, the first and/or second flexible wing elements 1682, 1684 flex and follow the non-circular inner wall 432 of the housing. Optionally, the first flexible wing element 1682 terminates with a first terminal wing element 1692 and/or the second flexible wing element 1684 terminates with a second terminal wing element 1694 that are optionally seals and/or a magnetic seal attracted to the housing and/or a magnet therein or thereon.

Still referring to FIG. 16C, the vane 450 is illustrated with an outward vane Still referring to FIG. 16C, the vane 450 is illustrated with an outward vane force system 1670. As illustrated, the outward vane force system includes a rod within a rod, where the internal rod is a push rod with one or both longitudinal ends of the internal push rod connected to springs and/or a potential energy loaded accordion shaped metal, such as a shape memory alloy metal, a spring steel metal, and/or nitinol, which provides a radially outward force to a section of the vane that provides a sealing force between the vane 450 and the inner wall 432 of the housing.

The preferred geometry of the wing-tips reduces chatter or vibration of the vane-tips against the outer housing during operation of the engine. Chatter is unwanted opening and closing of the seal between expansion chamber 333 and leading chamber 334. The unwanted opening and closing results in unwanted release of pressure from the expansion chamber 333, because the vane tip 1614 is forced away from the inner wall 432 of the housing, with resulting loss of expansion chamber 333 pressure and rotary engine 110 power. For example, the outer edge of the leading vane wing 1620 and/or the trailing vane wing 1630, proximate the inner wall 432, is progressively further from the inner wall 432 as the wing-tip extends away from the vane-tip 1614 along the x-axis. In another example, a distance between the inner edge of the wing-tip bottom 1634 and the inner housing 432 decreases along a portion of the x-axis versus a central x-axis point of the vane body 1610. Some optional wing-tip shape elements include:

- an about perpendicular wing-tip bottom 1634 adjoining the vane body 1610;
- a curved wing-tip surface proximate the inner housing 432;
- a pivotable concave wingtip, the concave portion facing the housing inner wall 432;
- an outer vane wing-tip surface extending further from the housing inner wall 432 with increasing x-axis or rotational distance from a central point of the vane-tip 1614;
- the inner vane wing-tip bottom 1634, or radially inner portion of the wing-tip, having a decreasing y-axis distance to the housing inner wall 432 with increasing x-axis or rotational distance from a central point of the vane-tip 1614;
- the outer vane wing-tip top, or radially outer portion of the wing-tip, having a decreasing y-axis distance to the housing inner wall 432 with increasing x-axis or rotational distance from a central point of the vane-tip 1614;
- the outer vane wing-tip top, or radially outer portion of the wing-tip, having an increasing y-axis distance to the housing inner wall 432 with increasing x-axis or rotational distance from a central point of the vane-tip 1614; and
- a 3, 4, 5, 6, or more sided polygon perimeter in an x-, y-cross-sectional plane of an individual wing tip, such as the leading vane wing 1620 or trailing vane wing 1630.

Further examples of wing-tip shapes are illustrated in connection with optional wing-tip pressure elements and vane caps, described infra.

A t-shaped vane refers to a vane 450 having both a leading vane wing 1620 and trailing vane wing 1630.

Vane-Tip Components

Referring now to FIG. 17, examples of optional vane-tip 1614 components are illustrated. Optional and preferable vane-tip 1614 components include:

- one or more bearings for bearing the force of the vane 450 applied to the inner housing 420;
- one or more seals for providing a seal between the leading chamber 334 and expansion chamber 333;
- one or more pressure relief cuts for reducing pressure build-up between the vane wings 1620, 1630 and the inner wall 432 of the housing; and
- a booster enhancing pressure equalization above and below a vane wing.

Each of the bearings, seals, pressure relief cuts, and booster are further described herein.

Bearings

The vane-tip 1614 optionally includes a roller bearing 1740. The roller bearing 1740 preferably takes a majority of the force of the vane 450 applied to the inner housing 432, such as fuel expansion forces and/or centrifugal forces. The roller bearing 1740 is optionally an elongated bearing or a ball bearing. An elongated bearing is preferred as the elongated bearing distributes the force of the vane 450 across a larger portion of the inner housing 432 as the rotor 440 turns about the shaft 220, which minimizes formation of a wear groove on the inner housing 432. The roller bearing 1740 is optionally 1, 2, 3, or more bearings. Preferably, each roller bearing is spring loaded to apply an outward force of the roller bearing 1740 into the inner wall 432 of the housing. The roller bearing 1740 is optionally magnetic.

Seals

Still referring to FIG. 17, the vane-tip 1614 preferably includes one or more seals affixed to the vane 450. The seals provide a barrier between the leading chamber 334 and expansion chamber 333. A first vane-tip seal 1730 example comprises a seal affixed to the vane-tip 1614, where the vane-seal includes a longitudinal seal running along the z-axis from about the top of the vane 1617 to about the bottom of the vane 1619. The first-vane seal 1730 is illustrated as having an arched longitudinal surface. A second vane-tip seal 1732 example includes a flat edge proximately contacting the housing inner wall 432 during use. Optionally, for each vane 450, 1, 2, 3, or more vane seals are configured to provide proximate contact between the vane-tip 1614 and housing inner wall 432. Optionally, the vane-seals 1730, 1732 are fixedly and/or replaceably attached to the vane 450, such as by sliding into a groove in the vane-tip running along the z-axis. Preferably, the vane-seal comprises a plastic, fluoropolymer, flexible, and/or rubber seal material.

Pressure Relief Cuts

As the vane 450 rotates, a resistance pressure builds up between the vane-tip 1614 and the housing inner wall 432, which may result in chatter. For example, pressure builds up between the leading wing-tip surface 1710 and the housing inner wall 432. Pressure between the vane-tip 1614 and housing inner wall 432 results in vane chatter and inefficiency of the engine.

The leading vane wing 1620 optionally includes a leading wing-tip surface 1710. The leading wing-tip surface 1710, which is preferably an edge running along the z-axis cuts, travels, and/or rotates through air and/or fuel in the leading chamber 334.

The leading vane wing 1620 optionally includes: a cut, aperture, hole, fuel flow path, air flow path, and/or tunnel 1720 cut through the leading wing-tip along the y-axis. The cut 1720 is optionally 1, 2, 3, or more cuts. As air/fuel pressure builds between the leading wing-tip surface 1710 or vane-tip 1614 and the housing inner wall 432, the cut 1720 provides a pressure relief flow path 1725, which reduces chatter in the rotary engine 110. Hence, the cut or tunnel 1720 reduces build-up of pressure, resultant from rotation of the engine vanes 450, about the shaft 220, proximate the vane-tip 1614. The cut 1720 provides an air/fuel flow path 1725 from the leading chamber 334 to a volume above the leading wing-tip surface 1710, through the cut 1720, and back to the leading chamber 334. Any geometric shape that reduces engine chatter and/or increases engine efficiency is included herein as possible wing-tip shapes.

Still referring to FIG. 17, the vane-tip 1614 optionally includes one or more trailing: cuts, apertures, holes, fuel flow paths, air flow paths, and/or tunnels 1750 cut through the trailing vane wing 1630 along the y-axis. The trailing cut 1750 is optionally 1, 2, 3, or more cuts. As fuel expansion pressure builds between the trailing edge tip 1750 or vane-tip 1614 and the housing inner wall 432, the cut 1750 provides a pressure relief flow path 1755, which reduces chatter in the rotary engine 110. Hence, the cut or tunnel 1750 reduces build-up of pressure, resultant from fuel expansion in the trailing chamber during rotation of the engine vanes 450 about the shaft 220, proximate the vane-tip 1614. The cut 1750 provides an air/fuel flow path 1755 from the expansion chamber 333 to a volume above the trailing wing-tip surface 1760, through the cut 1750, and back to the trailing chamber or reference chamber 333. Any geometric shape that reduces engine chatter and/or increases engine efficiency is included herein as possible wing-tip shapes.

Vane Wing

Figure 18:
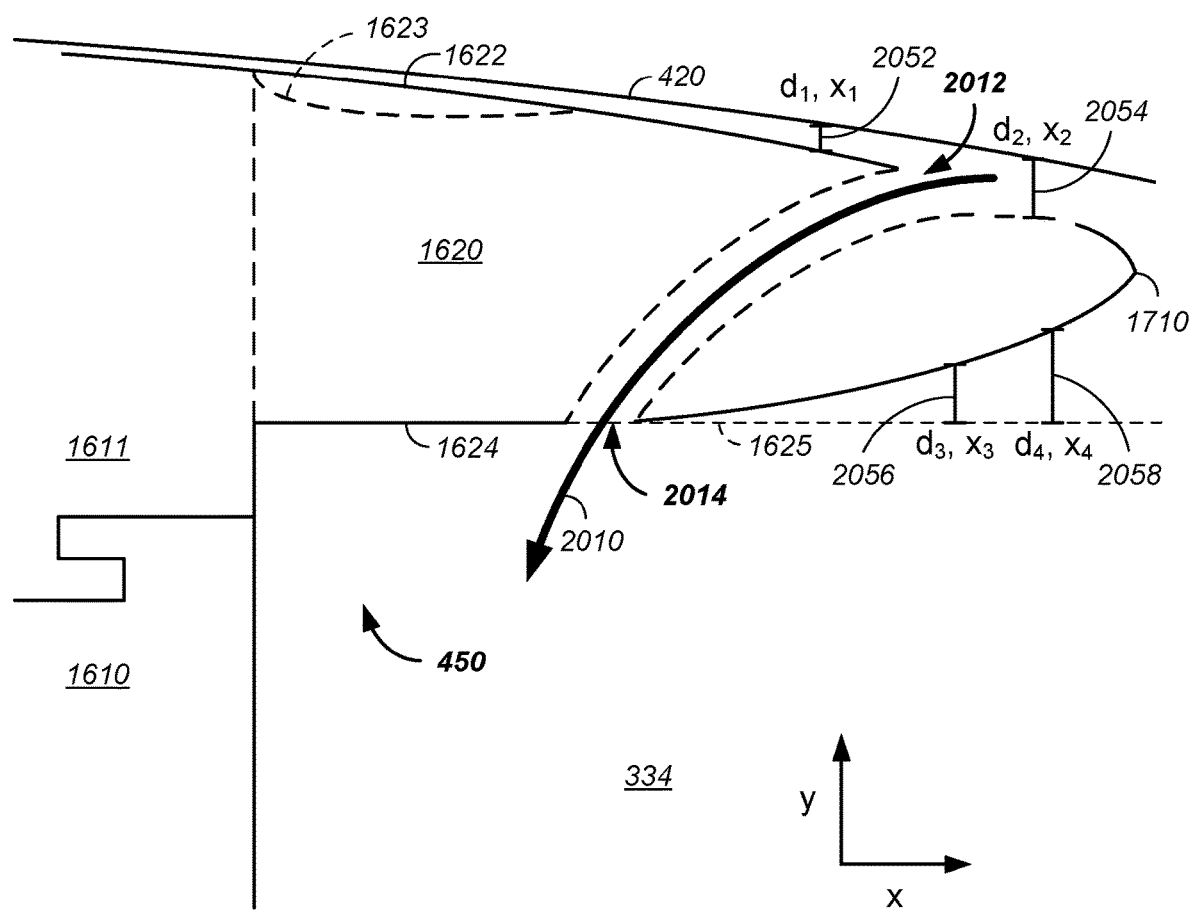
FIG. 18 illustrates a vane wing.

Referring now to FIG. 18, a cross-section of the vane 450 is illustrated having several optional features including: a curved outer surface, a curved inner surface, and a curved tunnel, each described infra.

The first optional feature is a curved outer surface 1622 of the leading vane wing 1620. In a first case, the curved outer surface 1622 extends further from the inner wall of the housing 432 as a function of x-axis position relative to the vane body 1610. For instance, at a first x-axis position, $x_1$, there is a first distance, $d_1$, between the outer surface 1622 of the leading vane wing 1620 and the inner housing 432. At a second position, $x_2$, further from the vane body 1610, there is a second distance, $d_2$, between the outer surface 1622 of the leading vane wing 1620 and the inner housing 432 and the second distance, $d_2$, is greater than the first distance, $d_1$. Preferably, there are positions on the outer surface 1622 of the leading vane wing 1620 where the second distance, $d_2$, is about 2, 4, or 6 times as large as the first distance, $d_1$. In a second case, the outer surface 1622 of the leading vane wing 1620 contains a negative curvature section 1623. The negative curvature section 1623 is optionally described as a concave region. The negative curvature section 1623 on the outer surface 1622 of the leading vane wing 1620 allows the build-up 610 and the cut-outs 510, 520 in the housing as without the negative curvature 1623, the vane 450 mechanically catches or physically interferes with the inner wall of the housing 432 with rotation of the vane 450 about the shaft 220 when using a double offset housing 430.

The second optional feature is a curved inner surface 1624 of the leading vane wing 1620. The curved inner surface 1624 extends further toward the inner wall of the housing 432 as a function of x-axis position relative to the vane body 1610. Stated differently, the inner surface 1624 of the leading vane curves away from a reference line 1625 normal to the vane body at the point of intersection of the vane body 1610 and the leading vane wing 1620. For instance, at a third x-axis position, $x_3$, there is a third distance, $d_3$, between the outer surface 1622 of the leading vane wing 1620 and the reference line 1625. At a fourth position, $x_4$, further from the vane body 1610, there is a fourth distance, $d_4$, between the outer surface 1622 of the leading vane wing 1620 and the reference line 1625 and the fourth distance, $d_4$, is greater than the third distance, $d_3$. Preferably, there are positions on the outer surface 1622 of the leading vane wing 1620 where the fourth distance, $d_4$, is about 2, 4, or 6 times as large as the third distance, $d_3$.

The third optional feature is a curved fuel flow path 2010 running through the leading vane wing 1620, where the fuel flow path is optionally described as a hole, aperture, and/or tunnel. The curved fuel flow path 2010 includes an entrance opening 2012 and an exit opening 2014 of the fuel flow path 2010 in the leading vane wing 1620. The edges of the fuel flow path are preferably curved, such as with a curvature approximating an aircraft wing. A distance from the vane wing-tip 1710 through the fuel flow path 2010 to the inner surface at the exit port 2014 of the leading wing 1624 is longer than a distance from the vane wing-tip 1710 to the exit port 2014 along the inner surface 1624 of the leading vane wing 1620. Hence, the flow rate of the fuel through the fuel flow path 2010 maintains a higher velocity compared to the fuel flow velocity along the base 1624 of the leading vane wing 1620, resulting in a negative pressure between the leading vane wing 1620 and the inner housing 432. The negative pressure lifts the vane 450 toward the inner wall 432, which lifts the vane tip 1614 along the y-axis to proximately contact the inner housing 432 during use of the rotary engine 110. The fuel flow path 2010 additionally reduces unwanted pressure between the leading vane wing 1620 and inner housing 432, where excess pressure results in detrimental engine chatter during intermittent release of the excess pressure via leakage between expansion chambers.

Generally, an aperture through the leading vane wing allows pressure relief before the pressure creates momentary forces between the vane 450 and the housing 210 results in chatter. For instance, as the vane rotates, forces build up at the intersection of the leading vane side and the housing, such as resultant from a diminishing cross-sectional area available for the expanding fuel as a function of rotation and/or more time for the fuel to expand. When the pressure exceeds a threshold and/or a small gap is present between a vane/housing seal, the pressure forces the vane inward until the pressure is relieved, which results in chatter. By placing an aperture through the leading wing vane at a point where the vane wing does not touch the housing, the pressure is relieved prior to the occurrence and/or initiation of chatter. Optionally, the aperture is elongated along the z-axis to allow uniform relief of the building pressure. For example, the z-axis opening size of the aperture is at least 200, 300, 400, and/or 500 percent of the x-axis opening size of the aperture.

Trailing Wing

Figure 19A:
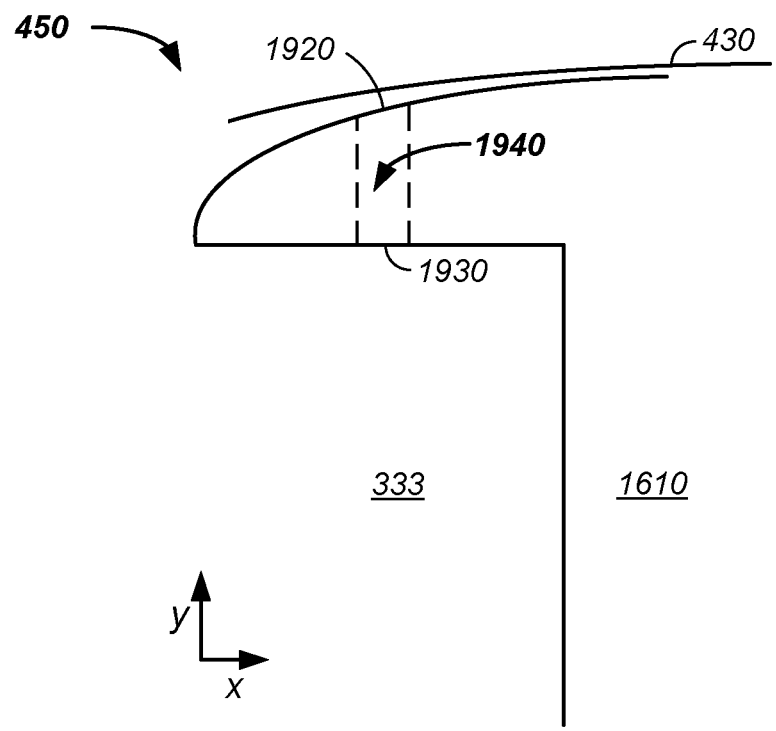
FIG. 19A and FIG. 19B illustrate a first pressure relief cut and a second pressure relief cut in a vane wing, respectively.
Figure 19B:
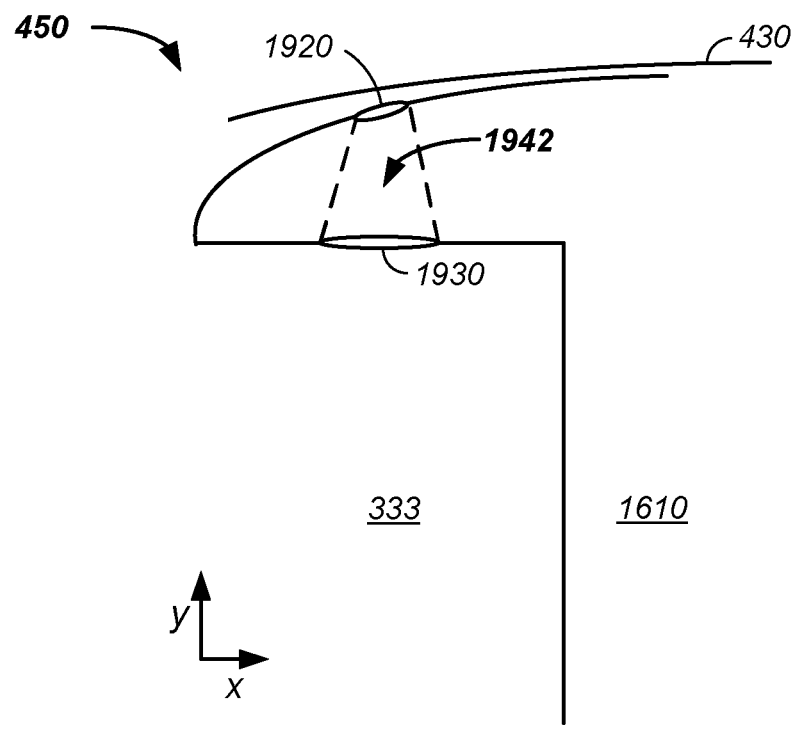

Referring now to FIG. 19A and FIG. 19B, an example of a trailing cut 1750 in a vane 450 trailing vane wing 1630 is illustrated. For clarity, only a portion of vane 450 is illustrated. The trailing vane wing 1630 is illustrated, but the elements described in the trailing vane wing 1630 are optionally used in the leading vane wing 1620. The optional hole or aperture 1750 leads from an outer area 1920 of the wing-tip to an inner area 1930 of the wing-tip. Referring now to FIG. 19A, a cross-section of a single hole 1940 having about parallel sides is illustrated. The aperture aids in equalization of pressure in an expansion chamber between an inner side of the wing-tip and an outer side of the wing-tip.

Still referring to FIG. 19A, a single aperture 1750 is illustrated. Optionally, a series of holes 1750 are used where the holes are separated along the z-axis. Optionally, the series of holes are connected to form a groove similar to the cut 1720. Similarly, groove 1720 is optionally a series of holes, similar to holes 1750.

Referring now to FIG. 19B, a vane 450 having a trailing vane wing 1630 with an optional aperture 1940 configuration is illustrated. In this example, the aperture 1942 expands from a first cross-sectional distance at the outer area of the wing 1920 to a larger second cross-sectional distance at the inner area of the wing 1930. Preferably, the second cross-sectional distance is at least 1½ times that of the first cross-sectional distance and optionally about 2, 3, 4 times that of the first cross-sectional distance. the invented conical shape allows for expansion of the gas trapped between the trailing wing tip and the housing 430, which aids in pressure relief and/or allows a greater surface area for the expanding gases in the reference expansion chamber 333 to push up along the y-axis, yielding a greater force pushing the vane 450 toward the housing 210.

Booster

Figure 20:
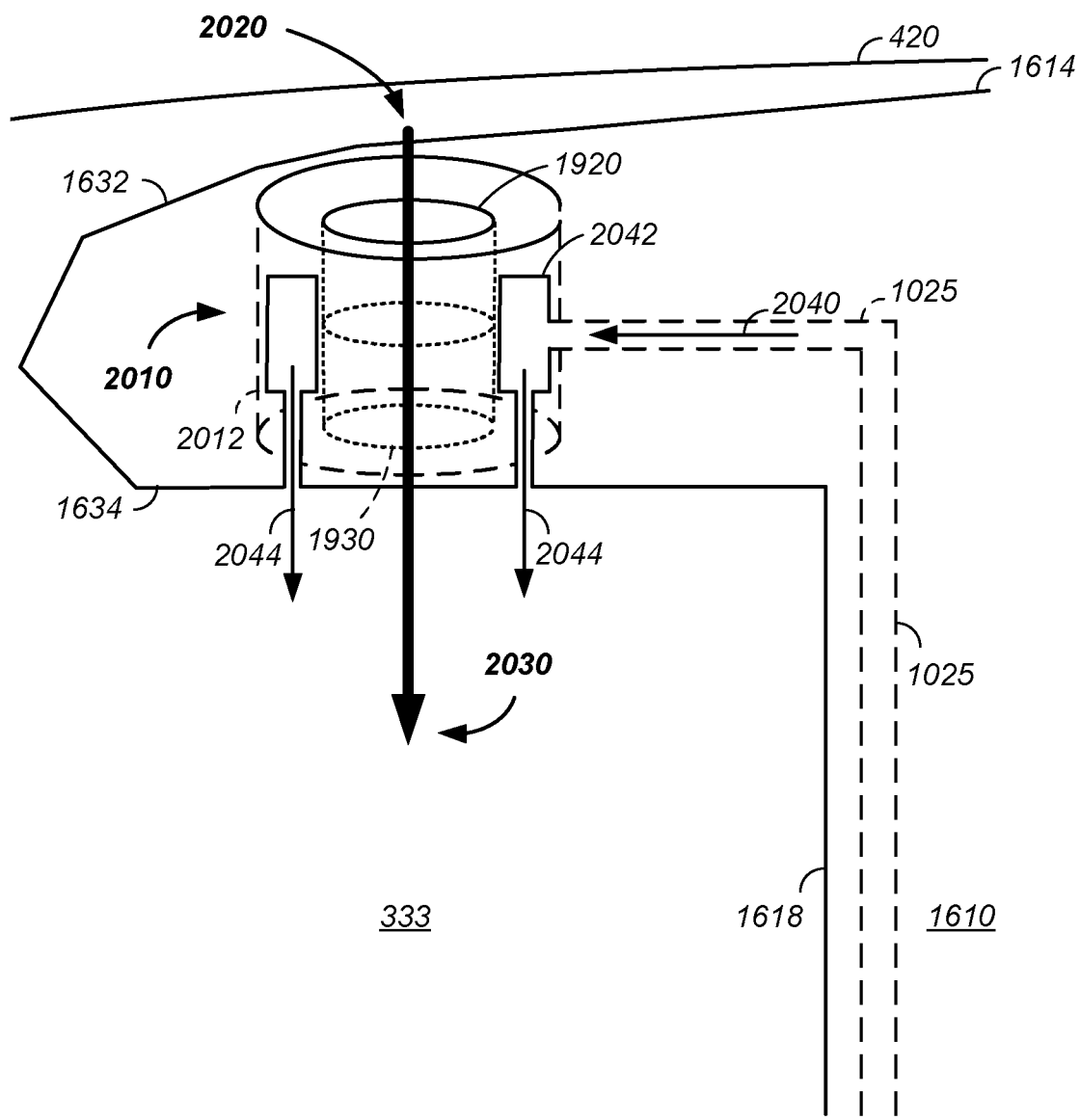
FIG. 20 illustrates a vane wing booster.

Referring now to FIG. 20, an example of a vane 450 having a booster 1300 is provided. The booster 1300 is applied in a vane booster 2010 configuration. The flow along the trailing pressure relief flow path 1755, is optionally boosted or amplified using flow through the vane conduit 1025. Flow from the vane conduit runs along a vane flow path 2040 to an acceleration chamber 2042 at least partially about the trailing flow path 1755. Flow from the vane conduit 1025 exits the trailing vane wing 1630 through one or more exit ports 2044. The flow from the vane conduit 1025 exiting through the exit ports 2044 provides a partial vacuum force that accelerates the flow along the trailing pressure relief flow path 1755, which aids in pressure equalization above and below the trailing vane wing 1630, which reduces vane 450 and rotary engine 110 chatter. Preferably, an insert 2012 contains one or more of and preferably all of: the inner area of the wing 1920, the outer area of the wing 1930, the acceleration chamber 2042, and exit port 2044 along with a portion of the trailing pressure relief flow path 2030 and vane flow path 2020.

Swing Vane

In another embodiment, a swing vane 2100 is used in combination with an offset rotor, such as a double offset rotor in the rotary engine 110. More particularly, the rotary engine using a swing vane separating expansion chambers is provided for operation with a pressurized fuel or fuel expanding during a rotation of the engine. A swing vane pivots about a pivot point on the rotor yielding an expansion chamber separator ranging from the width of the swing vane to the length of the swing vane. The swing vane, optionally, slidingly extends to dynamically lengthen or shorten the length of the swing vane. The combination of the pivoting and the sliding of the vane allows for use of a double offset rotor in the rotary engine and the use of rotary engine housing wall cut-outs and/or buildups to expand rotary engine expansion chamber volumes with corresponding increases in rotary engine power and/or efficiency.

The swing vane 2100 is optionally used in place of the sliding vane 450. The swing vane 2100 is optionally described as a separator between expansion chambers. For example, the swing vane 2100 separates expansion chamber 333 from leading chamber 334. The swing vane 2100 is optionally used in combination with any of the elements described herein used with the sliding vane 450.

Swing Vane Rotation

Figure 21A:
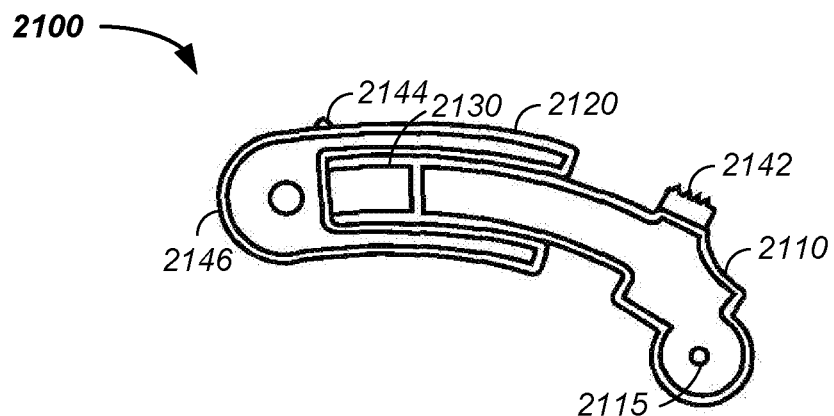
FIG. 21A and FIG. 21B illustrate a swing vane and a set of swing vanes, respectively, in a rotary engine.
Figure 21B:
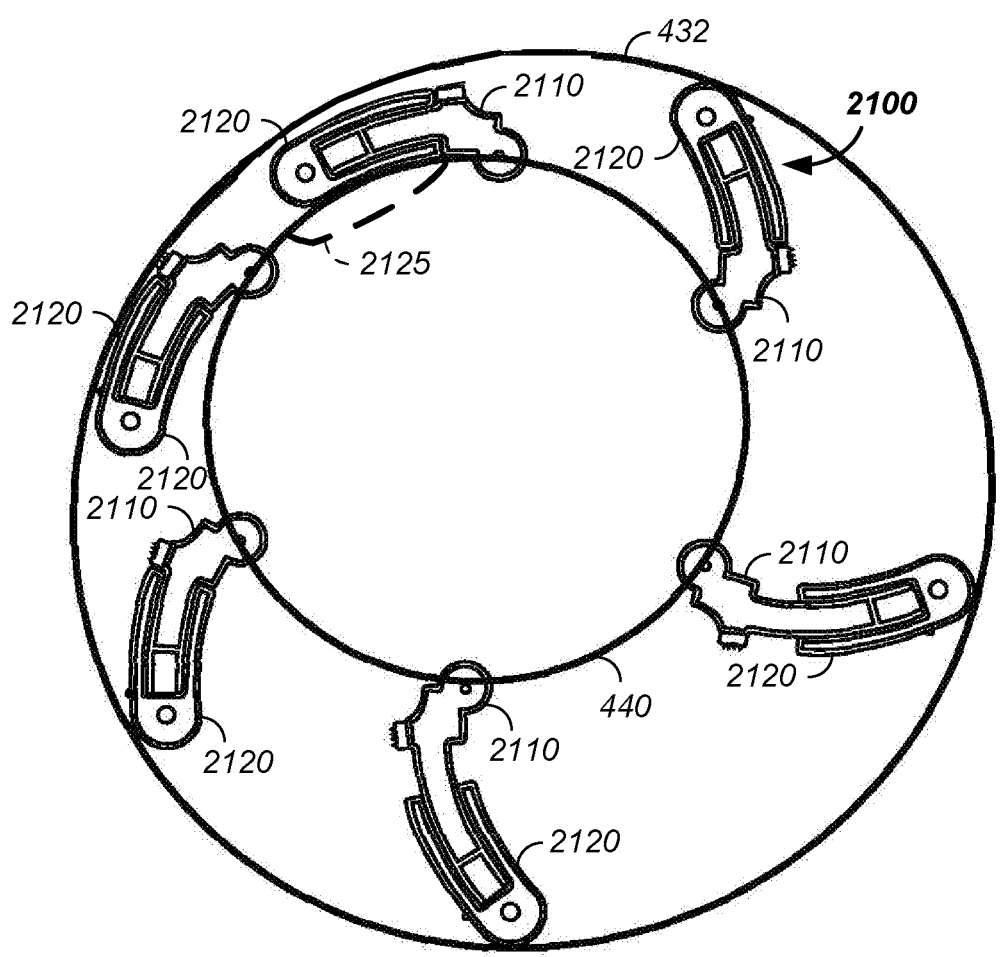

Referring now to FIG. 21A and FIG. 21B, in one example, a swing vane 2100 includes a swing vane base 2110, which is attached to the rotor 440 of a rotary engine 110 at a swing vane pivot 2115. Preferably, a spring loaded pin provides a rotational force that rotates the swing vane base 2110 about the swing vane pivot 2115. The spring-loaded pin additionally provides a damping force that prevents rapid collapse of the swing vane 2100 back to the rotor 440 after the power stroke in the exhaust phase. The swing vane 2100 pivots about the swing vane pivot 2115 attached to the rotor 440 during use. Since the swing vane pivots with rotation of the rotor in the rotary engine, the reach of the swing vane between the rotor and housing ranges from a narrow width of the swing vane to the length of the swing vane. For example, at about the 12 o'clock position, the swing vane 2100 is laying on its side and the distance between the rotor 440 and inner housing 432 is the width of the swing vane 2100. Further, at about the 3 o'clock position the swing vane extends nearly perpendicularly outward from the rotor 440 and the distance between the rotor and the inner housing 432 is the length of the swing vane. Hence, the dynamic pivoting of the swing vane yields an expansion chamber separator ranging from the short width of the swing vane to the length of the swing vane, which allows use of an offset rotor in the rotary engine.

Swing Vane Extension

Preferably, the swing vane base 2110 includes an optional curved section, slideably or telescopically attached to a curved section of the vane base 2110, referred to herein as a sliding swing vane 2120. For example, the sliding swing vane 2120 slidingly extends along the curved section of the swing vane base 2110 during use to extend an extension length of the swing vane 2100. The extension length extends the swing vane 2100 from the rotor 440 into proximate contact with the inner housing 432. One or both of the curved sections on the swing vane base 2110 or sliding swing vane 2120 guides sliding movement of the sliding swing vane 2120 along the swing vane base 2110 to extend a length of the swing vane 2100. For example, at about the 6 o'clock position the swing vane extends nearly perpendicularly outward from the rotor 440 and the distance between the rotor and the inner housing 432 is the length of the swing vane plus the length of the extension between the sliding swing vane 2120 and swing vane base 2110. In one case, an inner curved surface of the sliding swing vane 2120 slides along an outer curved surface of the swing vane base 2110, which is illustrated in FIG. 21A. In a second case, the sliding swing vane inserts into the swing vane base and an outer curved surface of the sliding swing vane slides along an inner curved surface of the swing vane base.

A vane actuator 2130 provides an outward force, where the outward force extends the sliding swing vane 2120 into proximate contact with the inner housing 432. A first example of vane actuator is a spring attached to either the swing vane base 2110 or to the sliding swing vane 2120. The spring provides a spring force resulting in sliding movement of the sliding swing vane 2120 relative to the swing vane base 2110. A second example of vane actuator is a magnet and/or magnet pair where at least one magnet is attached or embedded in either the swing vane base 2110 or to the sliding swing vane 2120. The magnet provides a repelling magnet force providing a partial internal separation between the swing vane base 2110 from the sliding swing vane 2120. A third example of the vane actuator 2130 is air and/or fuel pressure directed through the swing vane base 2110 to the sliding swing vane 2120. The fuel pressure provides an outward sliding force to the sliding swing vane 2120, which extends the length of the swing vane 2100. The spring, magnet, and fuel vane actuators are optionally used independently or in combination to extend the length of the swing vane 2100 and the vane actuator 2130 operates in combination with centrifugal force of the rotary engine 110.

Referring now to FIG. 21B, swing vanes 2100 are illustrated at various points in rotation and/or extension about the shaft 220. The swing vanes 2100 pivot about the swing vane pivot 2115. Additionally, from about the 12 o'clock position to about the 6 o'clock position, the swing vane 2100 extends to a greater length through sliding of the sliding swing vane 2120 along the swing vane base 2110 toward the inner housing 432. The sliding of the swing vane 2100 is aided by centrifugal force and optionally with vane actuator 2130 force. From about the 6 o'clock position to about the 12 o'clock position, the swing vane 2100 length decreases as the sliding swing vane 2120 slides back along the swing vane base 2110 toward the rotor 440. Hence, during use the swing vane 2100 both pivots and extends. The combination of swing vane 2100 pivoting and extension allows greater reach of the swing vane. The greater reach allows use of the double offset rotor, described supra. The combination of the swing vane 2100 and double offset rotor in a double offset rotary engine 400 yields increased volume in the expansion chamber from about the 12 o'clock position to about the 6 o'clock position, as described supra. Further, the combination of the pivoting and the sliding of the vane allows for use with a double offset rotary engine having housing wall cut-outs and/or buildups, described supra. The greater volume of the expansion chamber during the power stroke of the rotary engine results in the rotary engine 110 having increased power and/or efficiency.

Swing Vane Seals

Referring again to FIG. 21A and still to FIG. 21B, the swing vane 2100 proximately contacts the inner housing 432 during use at one or more contact points or areas. A first example of a sliding vane seal is a rear sliding vane seal 2142 on an outer surface of the swing vane base 2110. A second example of a sliding vane seal is a forward vane seal 2144 on an outer surface of the sliding swing vane 2120. The rear seal 2142 and/or the forward seal 2142 is optionally a wiper seal or a double lip seal. A third example of a sliding vane seal is a tip seal 2146, where a region of the end of the sliding swing vane 2120 proximately contacts the inner housing 432. The tip seal is optionally a wiper seal, such as a smooth outer surface of the end of the sliding swing vane 2120, and/or a secondary seal embedded into the wiper seal. At various times in rotation of the rotor 440 about the shaft 220, one or more of the rear seal 2142, forward seal 2144, and tip seal 2146 contact the inner housing 432. For example, from about the 12 o'clock position to about the 8 o'clock position, the tip seal 2146 of the sliding swing vane proximately contacts the inner housing 432. From about the 9 o'clock position to about the 12 o'clock position, first the forward seal 2144 and then both the forward seal 2144 and the rear seal 2142 proximately contact the inner housing 432. For example, when the vane 450 is in about the 11 o'clock position both the forward seal 2144 and rear seal 2142 are in simultaneous/proximate contact the inner surface of the second cut-out 520 of the inner housing 432. Generally, during one rotation of the rotor 440 and the reference swing vane 2100 about the shaft, first the tip seal 2146, then the forward seal 2144, then both the forward seal 2144 and rear seal 2142 contact the inner housing 432.

Rotor-Vane Cut-Out

Optionally, the rotor 440 includes a rotor cut-out 2125. The rotor cut-out allows the swing vane 2100 to fold into the rotor 440. By folding the swing vane 2100 into the rotor 440, the distance between the rotor 440 and inner housing 432 is reduced, since at least a portion of the width of the swing vane 2100 lays in the rotor 440. By folding the swing vane 2100 into the rotor 440, the double offset position of the rotor 440 is optionally increased to allow a larger expansion chamber, such as at the 4 o'clock position and a smaller expansion/compression chamber at about the 11 o'clock position, which enhances efficiency and power of the power stroke. Optionally, the swing vane 2100 includes a swing vane cap, described infra.

Scalability

The swing vane 2100 attaches to the rotor 440 via the swing vane pivot 2115. Since, the swing vane movement is controlled by the swing vane pivot 2115, the rotor-vane chamber 452 is not necessary. Hence, the rotor 440 does not necessitate the rotor-vane chamber 452. When scaling down a rotor 440 guiding a sliding vane 450, the rotor-vane chamber 452 limits the minimum size of the rotor. As the swing vane 2100 does not require the rotor-vane chamber 452, the diameter of the rotor 440 is optionally about as small as ¼, ½, 1, or 2 inches or as large as about 1, 2, 3, or 5 feet.

Cap

Figure 22:
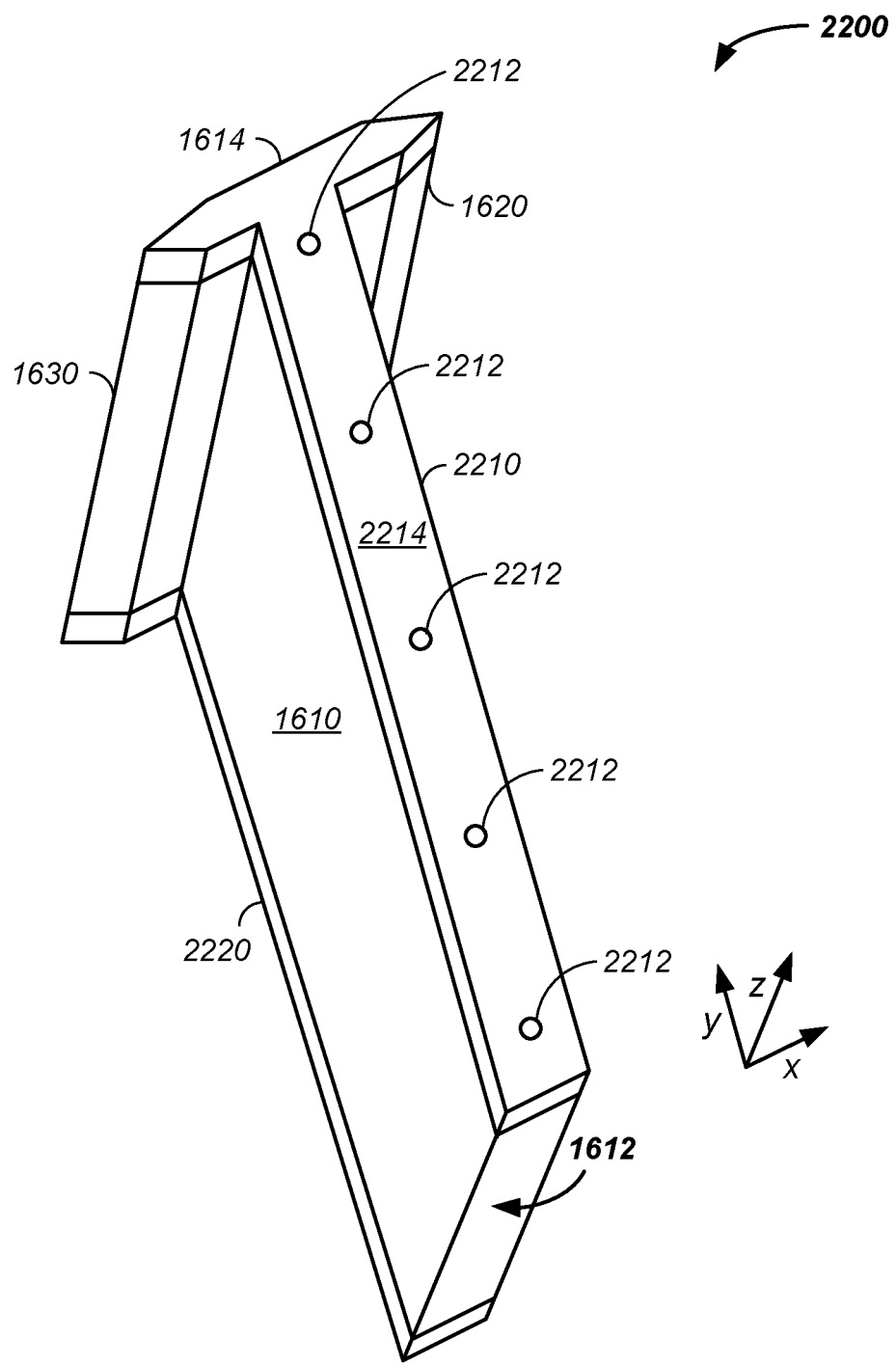
FIG. 22 illustrates a perspective view of a vane having a cap.

Referring now to FIG. 22, in yet another embodiment, dynamic caps 2200 or seals seal boundaries between fuel containing regions and surrounding rotary engine 110 elements. For example, caps 2200 seal boundaries between the reference expansion chamber 333 and surrounding rotary engine elements, such as the rotor 440 and vane 450. Types of caps 2200 include vane caps, rotor caps, and rotor-vane caps. Generally, dynamic caps float along an axis normal to the caps outer sealing surface. Herein, vane caps are first described in detail. Subsequently, rotor caps are described using the vane cap description and noting key differences.

More particularly, a rotary engine method and apparatus configured with a dynamic cap seal is described. A dynamic cap 2200 or seal restricts fuel flow from a fuel compartment to a non-fuel compartment and/or fuel flow between fuel compartments, such as between a reference expansion chamber 333 and any of an engine: rotor, vane, housing, and/or a leading or the trailing expansion chamber. For a given type of cap, optional sub-cap types exist. In a first example, types of vane caps include: vane-housing caps, vane-rotor caps, and rotor-vane slot caps. As a second example, types of rotor caps include: rotor-slot caps, rotor/expansion chamber caps, and/or inner rotor/shaft caps. Generally, caps float along an axis normal to an outer seal forming surface of the cap. For example, a first vane cap 2210 includes an outer surface 2214, which seals to the endplate element 212, 214. Generally, the outer surface of the cap seals to a rotary engine element, such as a housing 210 or endplate element 212, 214, providing a dynamic seal. Means for providing a cap sealing force to seal the cap against a rotary engine housing element comprise one or more of: a spring force, a magnetic force, a deformable seal force, and a fuel force. The dynamic caps ability to track a noncircular path while still providing a seal are particularly beneficial for use in a rotary engine having an offset rotor and with a non-circular inner rotary engine compartment having engine wall cut-outs and/or build-ups. For example, the dynamic caps ability to move to form a seal allows the seal to be maintained between a vane and a housing of the rotary engine even with a housing cut-out at about the 1 o'clock position. Further, the dynamic sealing forces provide cap sealing forces over a range of temperatures and operating engine rotation speeds.

Still more particularly, caps 2200 dynamically move or float to seal a junction between a sealing surface of the cap and a rotary engine component. For example, a vane cap sealing to the inner housing 432 dynamically moves along the y-axis until an outer surface of the cap seals to the inner housing 432.

In one example, caps 2200 function as seals between rotary chambers over a range of operating speeds and temperatures. For the case of operating speeds, the dynamic caps seal the rotary engine chambers at zero revolutions per minute (rpm) and continue to seal the rotary engine compartments as the engine accelerates to operating revolutions per minute, such as about 1000, 2000, 5000, or 10,000 rpm. For example, since the caps move along an axis normal to an outer surface and have dynamic means for forcing the movement to a sealed position, the caps seal the engine compartments when the engine is any of: off, in the process of starting, is just started, or is operating. In an exemplary case, the rotary engine vane 450 is sealed against the rotary engine housing 210 by a vane cap. For the case of operating temperatures, the same dynamic movement of the caps allows function over a range of temperatures. For example, the dynamic cap sealing forces function to apply cap sealing forces when an engine starts, such as at room temperature, and continues to apply appropriate sealing forces as the temperature of the rotary engine increases to operational temperature, such as at about 100, 250, 500, 1000, or 1500 degrees centigrade. The dynamic movement of the caps 2200 is described, infra.

Vane Caps

A vane 450 is optionally configured with one or more dynamic caps 2200. A particular example of a cap 2200 is a vane/endplate cap, which provides a dynamic seal or wiper seal between the vane body 1610 and a housing endplate, such as the first endplate 212 and/or second endplate 214. Vane/endplate caps cover one or both z-axis sides of the vane 450 or swing vane 2100. Referring now to FIG. 22, an example of the first vane cap 2210 and the second vane cap 2220 covering an innermost and an outermost z-axis side of the vane 450, respectively, is provided. The two vane endplate caps 2210, 2220 function as wiper seals, sealing the edges of the vane 450 or swing vane 2100 to the first endplate 212 and second endplate 214, respectively. Preferably, a vane/endplate cap includes one or more z-axis vane cap bearings 2212, which are affixed directly to the vane body 1610 and pass through the vane cap 2200 without interfering with the first vane cap 2210 movement and proximately contact the rotary engine endplates 212, 214. For example, FIG. 22 illustrates a first vane cap 2210 configured with five vane cap bearings 2212 that contact the first endplate 212 of the rotary engine 110 during use. Each of the vane/endplate cap elements are further described, infra. The vane and endplate cap elements described herein are exemplary of optional cap 2200 elements.

Herein, for a static position of a given vane, an x-axis runs through the vane body 1610 from the reference chamber 333 to the leading chamber 334, a y-axis runs from the vane base 1612 to the vane-tip 1614, and a z-axis is normal to the x/y-plane, such as defining the thickness of the vane between the first endplate 212 and second endplate 214. Further, as the vane rotates, the axis system rotates and each vane has its own axis system at a given point in time.

Figure 23A:
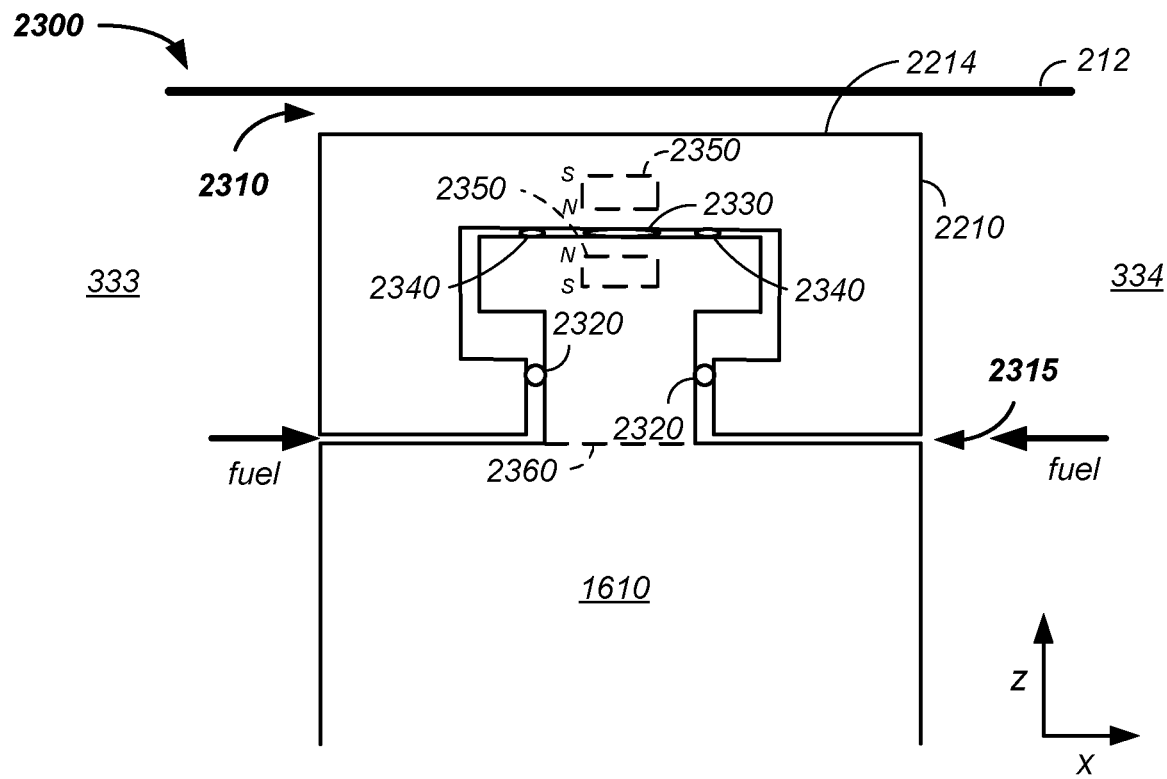
FIG. 23A and FIG. 23B illustrate a dynamic vane cap in a high potential energy state for vane cap actuation and in a relaxed vane cap actuated state, respectively.
Figure 23B:
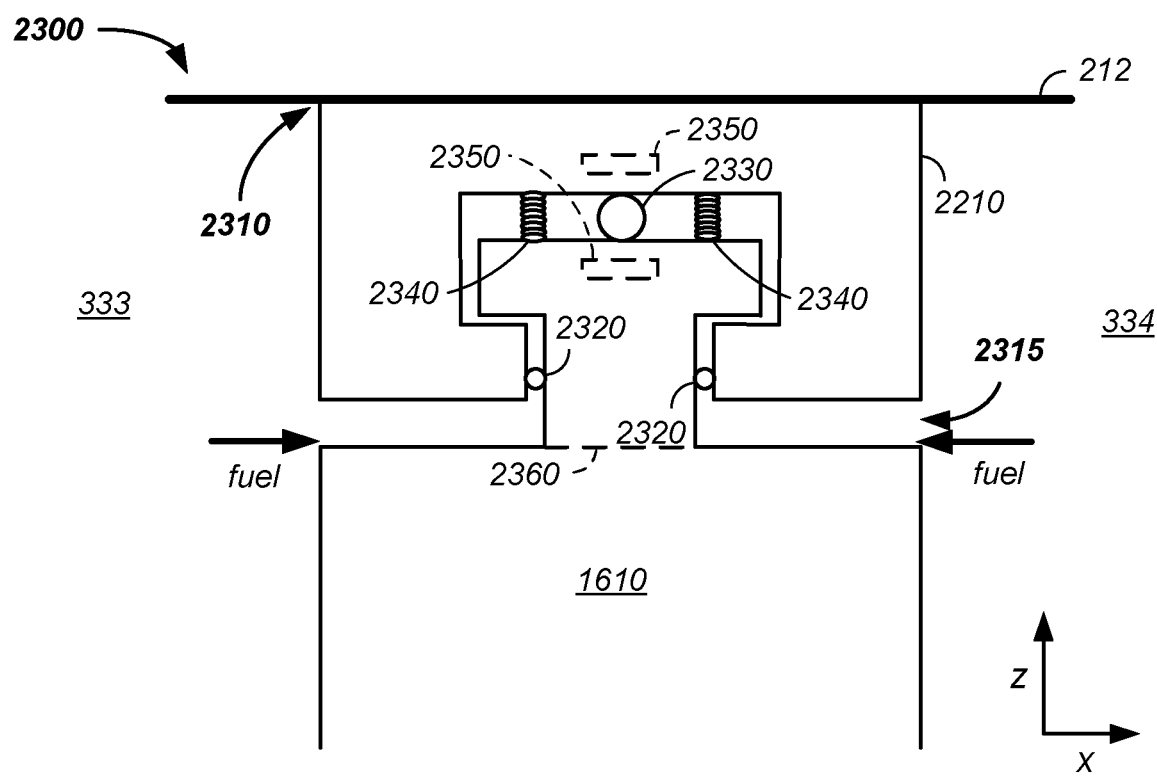

Referring now to FIG. 23A and FIG. 23B, an example of a cross-section of a dynamic vane/endplate cap 2300 is provided. The vane/endplate cap 2300 resides on the z-axis between the vane body 1610 and an endplate, such as the first endplate 212 and the second endplate 214. In the illustrated example, the first vane cap 2210 resides on the z-axis between the vane body 1610 and the first endplate 212. Further, the vane body 1610 and first vane cap 2210 combine to provide a separation, barrier, and seal between the reference expansion chamber 333 and leading expansion chamber 334. Means for providing a z-axis force against the first vane cap 2210 forces the first vane cap 2210 into proximate contact with the first endplate 212 to form a seal between the first vane cap 2210 and first endplate 212. Referring now to FIG. 23A, it is observed that a cap/endplate gap 2310 could exist between an outer face 2214 of the first vane cap 2210 and the first endplate 212. However, now referring to FIG. 23B, the z-axis force positions the vane cap outer face 2214 of the first vane cap 2210 into proximate contact with the first endplate 212 reducing the cap/endplate gap 2310 to about a nominal zero distance, which provides a seal between the first vane cap 2210 and the first endplate 212. While the vane/endplate cap 2210 moves into proximate contact with the housing endplate 212, one or more inner seals 2320, 2330 prevent or minimize movement of fuel from the reference expansion chamber 333 to the leading chamber 334, where the potential fuel leakage follows a path running between the vane body 1610 and first vane cap 2210.

Vane Cap Movement

Still referring to FIG. 23A and FIG. 23B, the means for providing a z-axis force against the first vane cap 2210, which forces the first vane cap 2210 into proximate contact with the first endplate 212 to form a seal between the first vane cap 2210 and first endplate 212 is further described. The vane cap z-axis force moves the first vane cap 2210 along the z-axis relative to the vane 450. Examples of vane cap z-axis forces include one or more of:

a spring force;
a magnetic force
a deformable seal force; and
a fuel flow or fuel force.

Examples are provided of a vane z-axis spring, magnet, deformable seal, and fuel force.

In a first example, a vane cap z-axis spring force is described. One or more vane cap springs 2340 are affixed to one or both of the vane body 1610 and the first vane cap 2210. In FIG. 23A, two vane cap springs 2340 are illustrated in a compressed configuration between the vane body 1610 and the first vane cap 2210. As illustrated in FIG. 23B the springs extend or relax by pushing the first vane cap 2210 into proximate contact with the first endplate 212, which seals the first vane cap 2210 to the first endplate 212 by reducing the cap/endplate gap 2310 to a distance of about zero, while increasing a second vane body/vane cap gap 2315 between the first vane cap 2210 and the vane body 1610.

In a second example, a vane cap z-axis magnetic force is described. One or more vane cap magnets 2350 are: affixed to, partially embedded in, and/or are embedded within one or both of the vane body 1610 and first vane cap 2210. In FIG. 23A, two vane cap magnets 2350 are illustrated with like magnetic poles facing each other in a magnetic field resistant position. As illustrated in FIG. 23B the magnets 2350 repel each other to force the first vane cap 2210 into proximate contact with the first endplate 212, thereby reducing the cap/endplate gap 2310 to a gap distance of about zero, which provides a seal between the first vane cap 2210 and first endplate 212.

In a third example, a vane cap z-axis deformable seal force is described. One or more vane cap deformable seals 2330 are affixed to and/or are partially embedded in one or both of the vane body 1610 and first vane cap 2210. In FIG. 23A, a deformable seal 2330 in a high potential energy state is illustrated between the vane body 1610 and first vane cap 2210. As illustrated in FIG. 23B the deformable seal 2330 expands toward a natural state to force the first vane cap 2210 into proximate contact with the first endplate 212, thereby reducing the cap/endplate gap 2310 to a gap distance of about zero, which provides a seal between the first vane cap 2210 and first endplate 212. An example of a deformable seal is a rope shaped flexible type material or a packing material type seal. The deformable seal is optionally positioned on an extension 2360 of the vane body 1610 or on an extension of the first vane cap 2210, described infra. Notably, the deformable seal has duel functionality: (1) providing a z-axis force as described herein and (2) providing a seal between the vane body 1610 and first vane cap 2210, described infra.

The spring force, magnetic force, and/or deformable seal force are optionally set to provide a sealing force that seals the vane cap outer face 2214 to the first endplate 212 with a force that is (1) great enough to provide a fuel leakage seal and (2) small enough to allow a wiper seal movement of the vane cap outer face 2214 against the first endplate 212 with rotation of the rotor 440 in the rotary engine 110. The sealing force is further described, infra.

In a fourth example, a vane cap z-axis fuel force is described. As fuel penetrates into the vane body/cap gap 2315, the fuel provides a z-axis fuel force pushing the first vane cap 2210 into proximate contact with the first endplate 212. The cap/endplate gap 2310 and vane body/cap gap 2315 are exaggerated in the provided illustrations to clarify the subject matter. The potential fuel leak path between the first vane cap 2210 and vane body 1610 is blocked by one or more of a first seal 2320, the deformable seal 2330, and a flow-path reduction geometry. An example of a first seal 2320 is an O-ring positioned about either an extension 2360 of the vane body 1610 into the first vane cap 2210, as illustrated, or an extension of the first vane cap 2210 into the vane body 1610, not illustrated. In a first case, the first seal 2320 is affixed to the vane body 1610 and the first seal 2320 remains stationary relative to the vane body 1610 as the first vane cap 2210 moves along the z-axis. Similarly, in a second case the first seal 2320 is affixed to the first vane cap 2210 and the first seal 2320 remains stationary relative to the first vane cap 2210 as the first vane cap 2210 moves along the z-axis. The deformable seal 2330 was described, supra. The flow path reduction geometry reduces flow of the fuel between the vane body 1610 and first vane cap 2210 by forcing the fuel through a labyrinth type path having a series of at least 2, 4, 6, 8, 10, or more right angle turns about the above described extension. Fuel flowing through the labyrinth must turn multiple times breaking the flow velocity or momentum of the fuel from the reference expansion chamber 333 to the leading expansion chamber 334.

Vane Cap Sealing Force

Figure 24A:
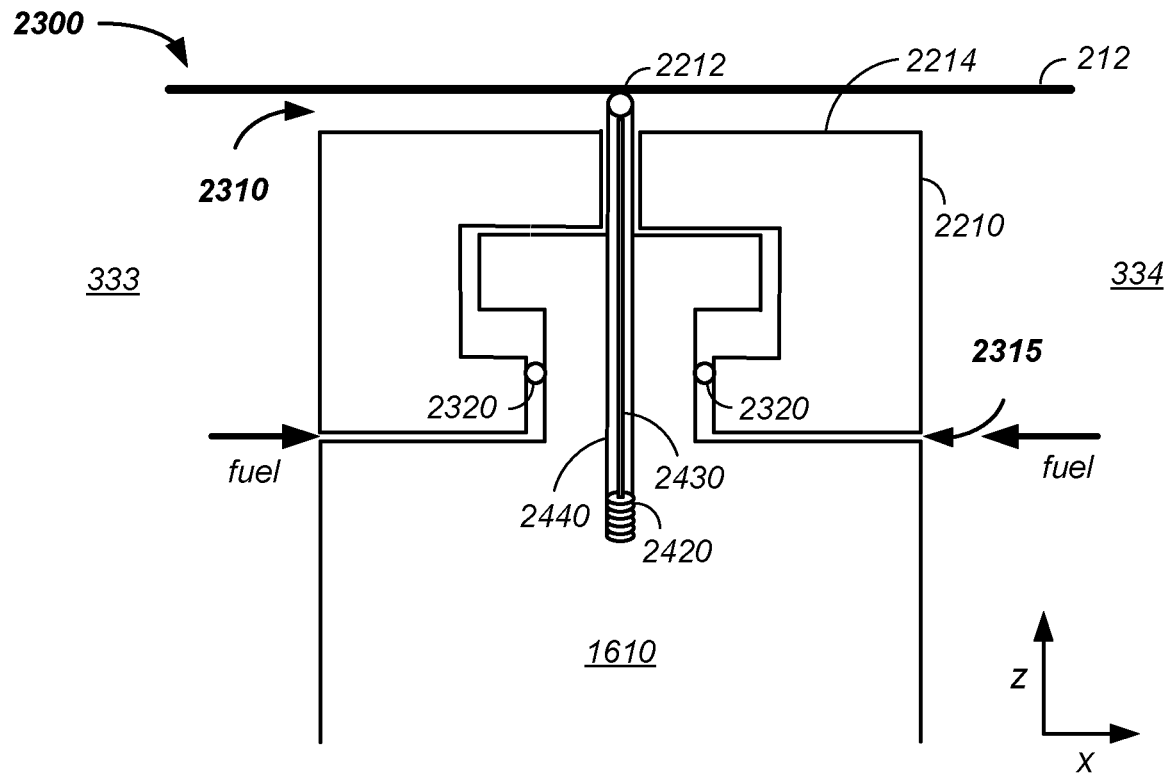
FIG. 24A and FIG. 24B illustrate a cap bearing relative to a vane cap in an un-actuated state and actuated state, respectively.
Figure 24B:
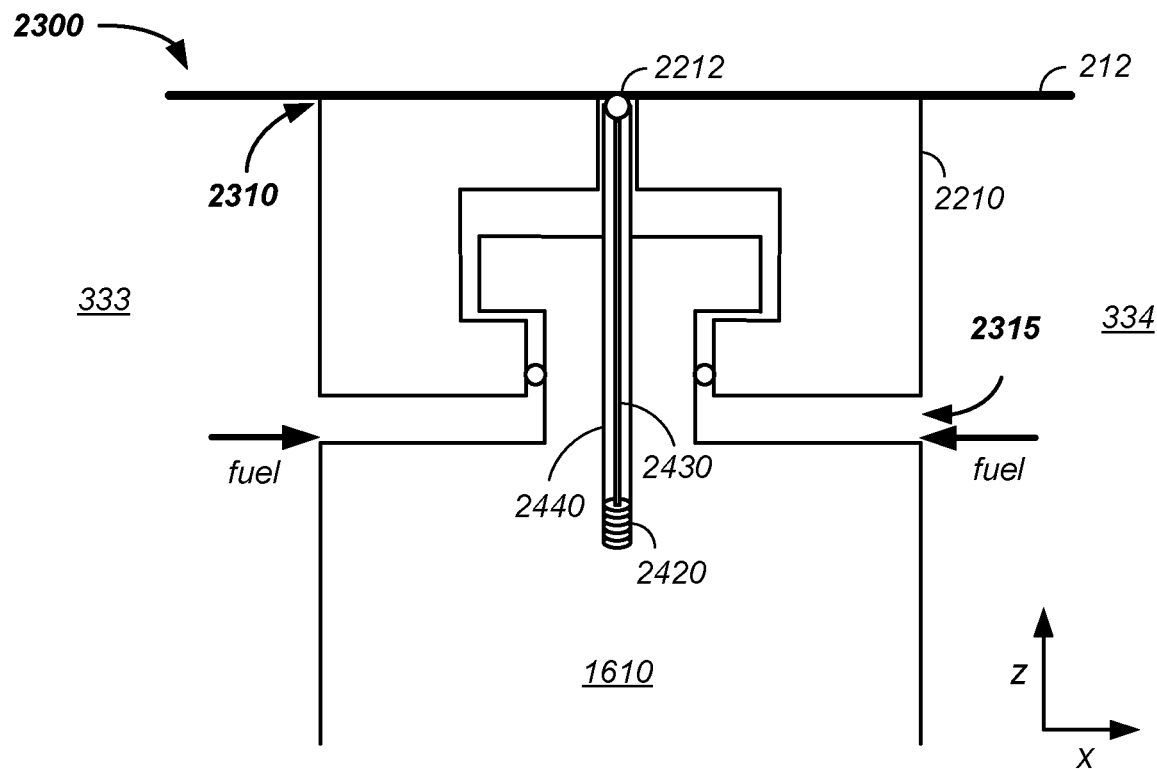

Referring now to FIG. 24A and FIG. 24B, examples of applied sealing forces in a cap 2200 and controlled sealing forces are described using the vane/endplate cap 2300 as an example. Optionally, one or more vane cap bearings 2212 are incorporated into the vane 450 and/or vane cap 2210. The vane cap bearing 2212 has a z-axis force applied via a vane body spring 2420 and intermediate vane/cap linkages 2430, which transmits the force of the spring 2420 to the vane cap bearing 2212. Optionally, a rigid support 2440, such as a tube or bearing containment wall, extends from the vane cap outer face 2214 to and preferably into the vane body 1610. The rigid support 2440 transmits the force of the vane 450 to the first endplate 212 via the vane cap bearing 2212. Hence, the vane cap bearing 2212, rigid support 2440, and vane body spring 2420 support the majority of the force applied by the vane 450 to the first endplate 212. The vane body spring 2420 preferably applies a greater outward z-axis force to the vane cap bearing 2212 compared to the lighter outward z-axis forces of one or more of the above described spring force, magnetic force, and/or deformable seal force. For example, the vane body spring 2420 results in a greater friction between the vane cap bearing 2212 and end plate 212 compared to the smaller friction resulting from the outward z-axis forces of one or more of spring force, magnetic force, and/or deformable seal force. Hence, there exists a first coefficient of friction resultant from the vane body spring 2420, usable to set a load bearing force. Additionally, there exists a second coefficient of friction resultant from the spring force, magnetic force, and/or deformable seal force, usable to set a sealing force. Each of the load bearing force and spring force are independently controlled by their corresponding springs. Further, the reduced contact area of the bearing 2212 with the endplate 212, compared to the potential contact area of all of outer surface 2214 with the endplate 212, reduces friction between the vane 450 and the endplate 212. Still further, since the greater outward force is supported by the vane cap bearing 2212, rigid support 2440, and vane body spring 2420, the lighter spring force, magnetic force, and/or deformable seal force providing the sealing force to the cap 2200 are adjusted to provide a lesser wiper sealing force sufficient to maintain a seal between the first vane cap 2210 and first endplate 212. Referring again to FIG. 24B, the sealing force reduces the cap/endplate gap 2310 to a distance of about zero.

The rigid support 2440 additionally functions as a guide controlling x- and/or y-axis movement of the first vane cap 2210 while allowing z-axis sealing motion of the first vane cap 2210 against the first endplate 212.

Positioning of Vane Caps

Figure 25:
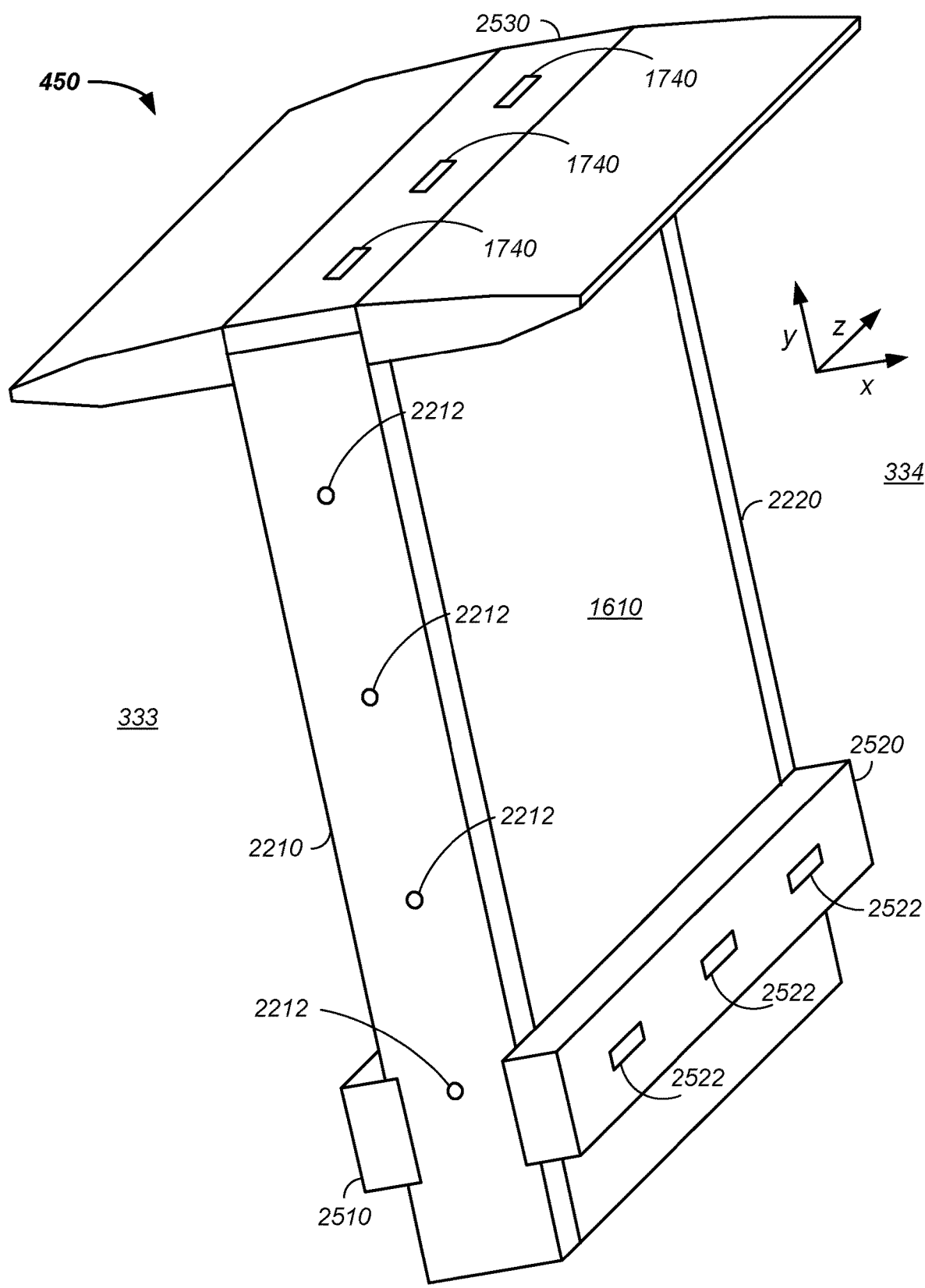
FIG. 25 illustrates multiple axes vane caps.

FIG. 22, FIG. 23, and FIG. 24 illustrate a first vane cap 2210. One or more of the elements of the first vane cap 2210 are applicable to a multitude of caps in various locations in the rotary engine 110. Referring now to FIG. 25, additional vane caps 2300 or seals are illustrated and described.

The vane 450 in FIG. 25 illustrates five optional vane caps: the first vane cap 2210, the second vane cap 2220, a reference chamber vane cap 2510, a leading chamber vane cap 2520, and vane tip cap 2530. The reference chamber vane cap 2510 is a particular type of the lower trailing vane seal 1026, where the reference chamber vane cap 2510 has functionality of sealing movement along the x-axis. Similarly, the leading chamber vane cap 2520 is a particular type of lower trailing seal 1028. Though not illustrated, the upper trailing seal 1028 and upper leading seal 1029 each are optionally configured as dynamic x-axis vane caps.

The vane seals seal potential fuel leak paths. The first vane cap 2210, second vane cap 2220 and the vane tip cap 2530 provide three x-axis seals between the expansion chamber 333 and the leading chamber 334. As described, supra, the first vane cap 2210 provides a first x-axis seal between the expansion chamber 333 and the leading chamber 334. The second vane cap 2220 is optionally and preferably a mirror image of the first vane cap 2210. The second vane cap 2220 contains one or more elements that are as described for the first vane cap 2210, with the second end cap 2220 positioned between the vane body 1610 and the second endplate 214. Like the first end cap 2210, the second end cap 2220 provides another x-axis seal between the reference expansion chamber 333 and the leading chamber 334. Similarly, the vane tip cap 2530 preferably contains one or more elements as described for the first vane cap 2210, only the vane tip cap is located between the vane body 1610 and inner wall 432 of the housing 210. The vane tip cap 2530 provides yet another seal between the expansion chamber 333 and the leading chamber 334. The vane tip cap 2530 optionally contains any of the elements of the vane head 1611. For example, the vane tip cap 2530 preferably uses the roller bearings 1740 described in reference to the vane head 1611 in place of the bearings 2212. The roller bearings 1740 aid in guiding rotational movement of the vane 450 about the shaft 220.

The vane 450 optionally and preferably contains four additional seals between the expansion chamber 333 and rotor-vane chamber 452. For example, the reference chamber vane cap 2510 provides a y-axis seal between the reference chamber 333 and the rotor-vane chamber 452. Similarly, the leading chamber vane cap 2520 provides a y-axis seal between the leading chamber 334 and the rotor-vane chamber 452. The reference chamber vane cap 2510 and/or leading chamber vane cap 2520 contain one or more elements that correspond with any of the sealing elements described herein. The reference and leading chamber vane caps 2510, 2520 preferably contain roller bearings 2522 in place of the bearings 2212. The roller bearings 2522 aid in guiding movement of the vane 450 next to the rotor 440 along the y-axis as the roller bearings have unidirectional ability to rotate. The reference chamber vane cap 2510 and leading chamber vane cap 2520 each provide y-axis seals between an expansion chamber and the rotor-vane chamber 452. The upper trailing seal 1028 and upper leading seal 1029 are optionally configured as dynamic x-axis floatable vane caps, which also function as y-axis seals, though the upper trailing seal 1028 and upper leading seal 1029 function as seals along the upper end of the rotor-vane chamber 452 next to the reference and leading expansion chambers 333, 334, respectively.

Generally, the vane caps 2300 are species of the generic cap 2200. Caps 2200 provide seals between the reference expansion chamber and any of: the leading expansion chamber 334, the trailing expansion chamber 333, the rotor-vane chamber 452, the inner housing 432, and a rotor face. Similarly, caps provide seals between the rotor-vane chamber 452 and any of: the leading expansion chamber 334, the trailing expansion chamber 333, and a rotor face.

Rotor Caps

Figure 26:
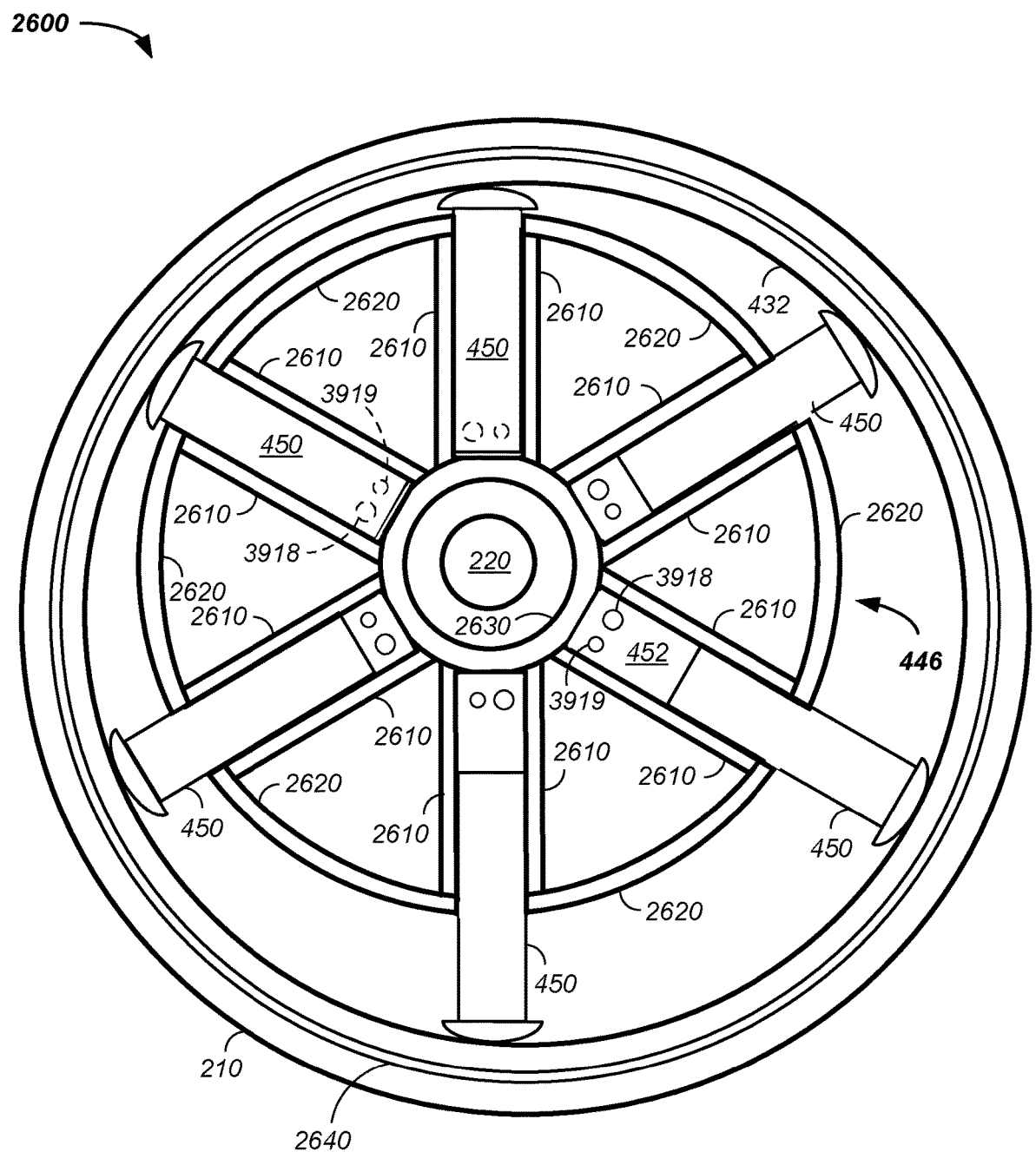
FIG. 26 illustrates rotor caps.

Referring now to FIG. 26, examples of rotor caps 2600 between the first end plate 212 and a face of the rotor 446 are illustrated. Examples of rotor caps 2600 include: a rotor/vane slot cap 2610, a rotor/expansion chamber cap 2620, and an inner rotor cap 2630. Any of the rotor caps 2600 exist on one or both z-axis faces of the rotor 446, such as proximate the first end plate 212 and the second end plate 214. The rotor/vane slot cap 2610 is a cap proximate the rotor-vane chamber 452 on the rotor endplate face 446 of the rotor 440. The rotor/expansion cap 2620 is a cap proximate the reference expansion chamber 333 on an endplate face 446 of the rotor 440. Herein, the reference expansion chamber 333 is also referred to as the trailing expansion chamber. The inner rotor cap 2630 is a cap proximate the shaft 220 on a rotor endplate face 446 of the rotor 440. Generally, the rotor caps 2600 are caps 2200 that contain any of the elements described in terms of the vane caps 2300. Generally, the rotor caps 2600 seal potential fuel leak paths, such as potential fuel leak paths originating in the reference chamber 333 or rotor-vane chamber 452. The inner rotor cap 2630 optionally seals potential fuel leak paths originating in the rotor-vane chamber 452 and or in a fuel chamber proximate the shaft 220.

Magnetic/Non-Magnetic Rotary Engine Elements

Optionally, the bearing 2212, roller bearing 1740, and/or roller bearing 2522 are magnetic. Optionally, any of the remaining elements of rotary engine 110 are non-magnetic. Combined, the bearing 2212, roller bearing 1740, rigid support 2440, intermediate vane/cap linkages 2430, and/or vane body spring 2420 provide an electrically conductive pathway between the housing 210 and/or endplates 212, 214 to a conductor proximate the shaft 220. Optionally, windings and/or coils are positioned in the housing 210 or radially outward from the housing 210 by the power stroke section of a the engine allowing a magnetic field/electrical current to be generated in the power stroke phase, where the electrical current is subsequently used for another purpose, such as opening or closing a valve and/or heating.

Lip Seals

Referring to FIG. 21, in still yet another embodiment, a lip seal 2710 is an optional rotary engine 110 seal sealing boundaries between fuel-containing regions and surrounding rotary engine 110 elements. A seal seals a gap between two surfaces with minimal force that allows movement of the seal relative to a rotary engine 110 component. For example, a lip seal 2710 seals boundaries between the reference expansion chamber 333 and surrounding rotary engine elements, such as the rotor 440, vane 450, housing 210, and first and second end plates 212, 214. Generally, one or more lip seals 2710 are inserted into any dynamic cap 2200 as a secondary seal, where the dynamic cap 2200 functions as a primary seal. However, a lip seal 2710 is optionally affixed or inserted into a rotary engine surface in place of the dynamic cap 2200. For example, a lip seal 2710 is optionally placed in any location previously described for use of a cap seal 2200. Herein, lips seals are first described in detail as affixed to a vane 450 or vane cap. Subsequently, lips seals are described for rotor 440 elements. When the lip seal 2710 moves in the rotary engine 110, the lip seal 2710 functions as a wiper seal.

More particularly, a rotary engine method and apparatus configured with a lip seal 2710 is described. A lip seal 2710 restricts fuel flow from a fuel compartment to a non-fuel compartment and/or fuel flow between fuel compartments, such as between a reference expansion chamber and any of an engine: rotor 440, vane 450, housing 210, a leading expansion chamber 334, and/or the trailing expansion chamber also referred to as the reference chamber 333. Generally, a lip seal 2710 is a semi-flexible insert, into a vane 450 or dynamic cap 2200, that dynamically flexes in response to fuel flow to seal a boundary, such as sealing a vane 450 or rotor 440 to a rotary engine 110 housing 210 or endplate element 212, 214. The lip seal 2710 provides a seal between a high pressure region, such as in the reference expansion chamber 333, and a low pressure region, such as the leading chamber 334 past the 7 o'clock position in the exhaust phase. Further, lip seals are inexpensive, and readily replaced.

Figure 27:
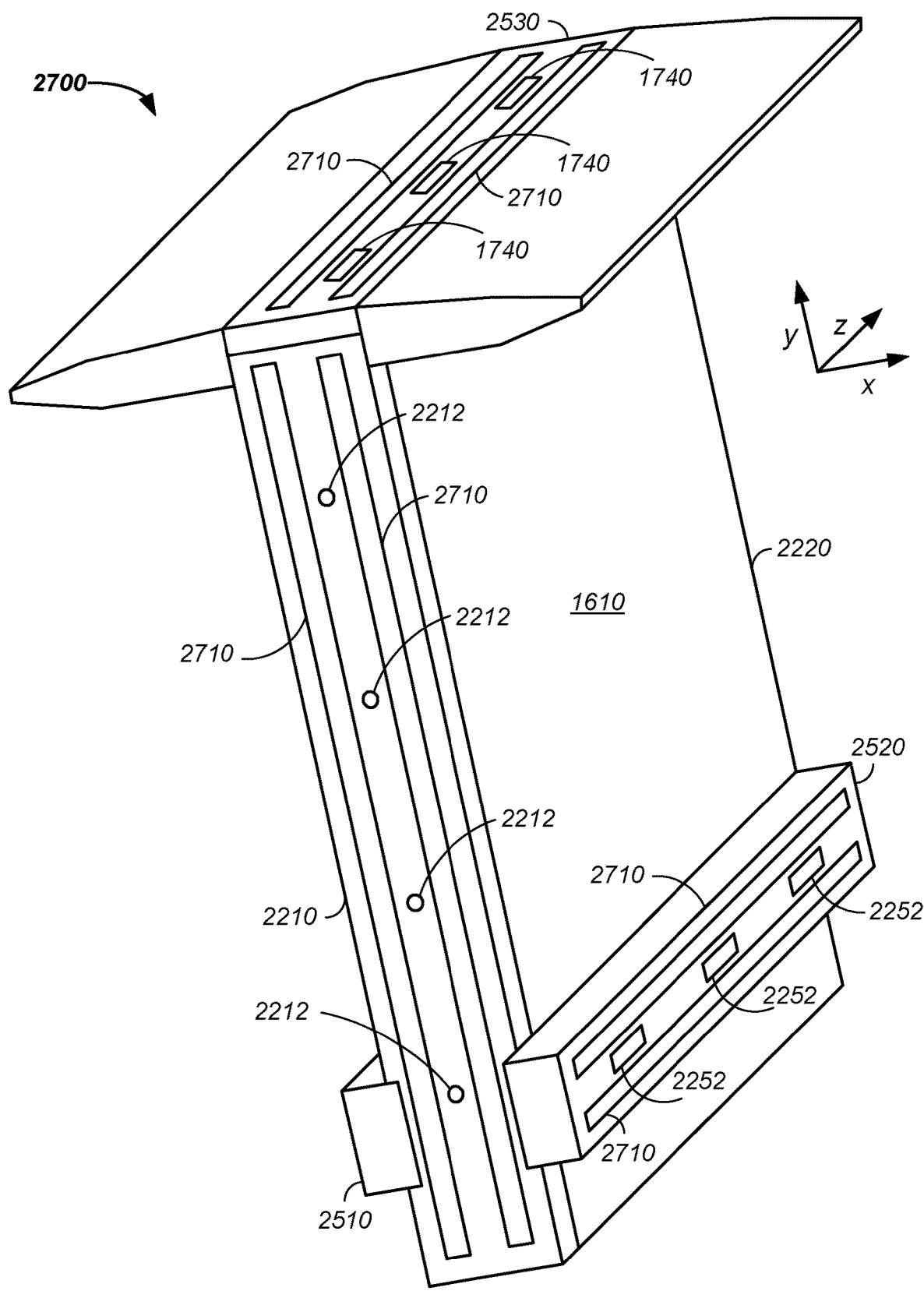
FIG. 27 provides an illustrated perspective view of a vane having lip seals.

Referring still to FIG. 27, a vane configured with lip seals 2700 is used as an example in a description of a lip seal 2710. In FIG. 27, vane caps are illustrated with a plurality of optional lip seals 2710, however, the lip seals 2710 are optionally affixed directly to the vane 450 without the use of a cap 2200. As illustrated, lip seals 2710 are incorporated into each of the first vane cap 2210, the second vane cap 2220, the reference chamber vane cap 2510, the leading chamber vane cap 2520, and the vane tip cap 2530. Each lip seal 2710 seals a potential fuel leak path. For example, the lip seals 2710 on the first vane cap 2210, the second vane cap 2220, and the vane tip cap 2530 provide three x-axis seals between the expansion reference chamber 333 and the leading chamber 334. Lip seals 2710 are also illustrated on each of the reference chamber vane cap 2510 and the leading chamber vane cap 2520, providing seals between an expansion chamber 333, 334 and the rotor-vane chamber 452, respectively. Not illustrated are lip seals 2710 corresponding to the upper trailing seal 1028 and upper leading seal 1029. For clarity of presentation, the lip seals 2710 are illustrated along most of a length of a supporting surface, so that individual lip seals are readily illustrated. In practice, each lip seal optionally and preferably extends along an entire longitudinal surface of the supporting element to which the lip seal is affixed and typically abut an adjoining lip seal.

Lip seals 2710 are compatible with one or more cap 2200 elements. For example, lip seals 2710 are optionally used in conjunction with any of bearings 2212, roller bearings 2522, and any of the means for dynamically moving the cap 2200.

Figure 28:
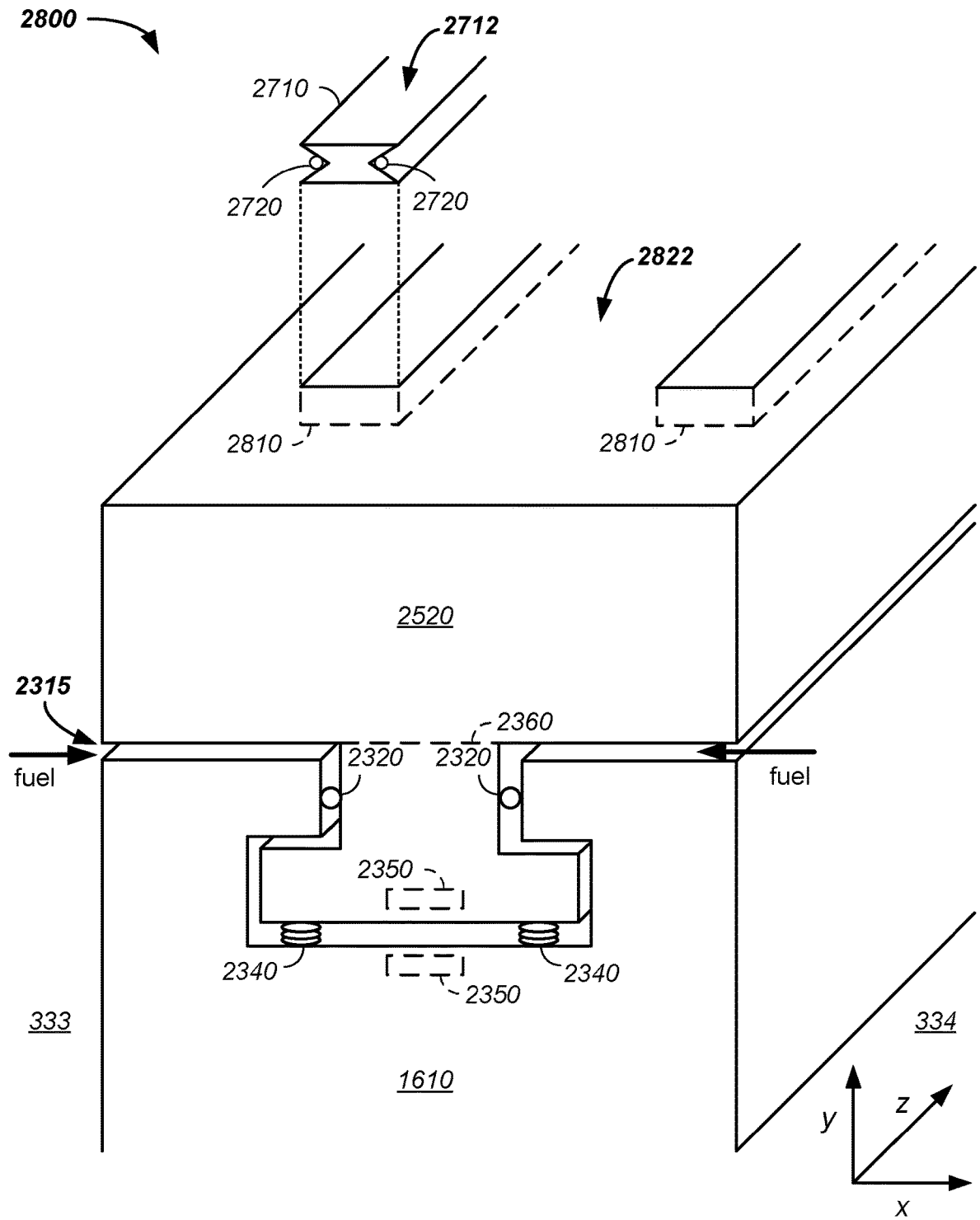
FIG. 28 provides an illustrated perspective view of a cap having a lip seal.

Referring now to FIG. 28, an example of a cap configured with seals 2800 is provided. Particularly, the leading chamber vane cap 2520 configured with two lip seals 2710 is figuratively illustrated. The leading chamber vane cap 2520 is configured with one, two, or more channels 2810. The lip seal 2710 inserts into the channel 2810. Preferably, the channel 2810 and lip seal 2710 are configured so that the outer surface of the lip seal 2712 is about flush and/or with the outer surface of the leading chamber vane cap 2822 or protrudes slightly therefrom. A ring-seal 2720, such as an O-ring, restricts and/or prevents flow of fuel between the lip seal 2710 and the leading chamber vane cap 2520.

Still referring to FIG. 28, as fuel flows between the outer surface of the leading chamber vane cap 2822 and housing 210, the fuel hits the lip seal 2710. The flexible lip seal 2710 deforms to form contact with the housing 210. More particularly, the fuel provides a deforming force that pushes an outer edge of the flexible lip seal into the housing 210.

Figure 29A:
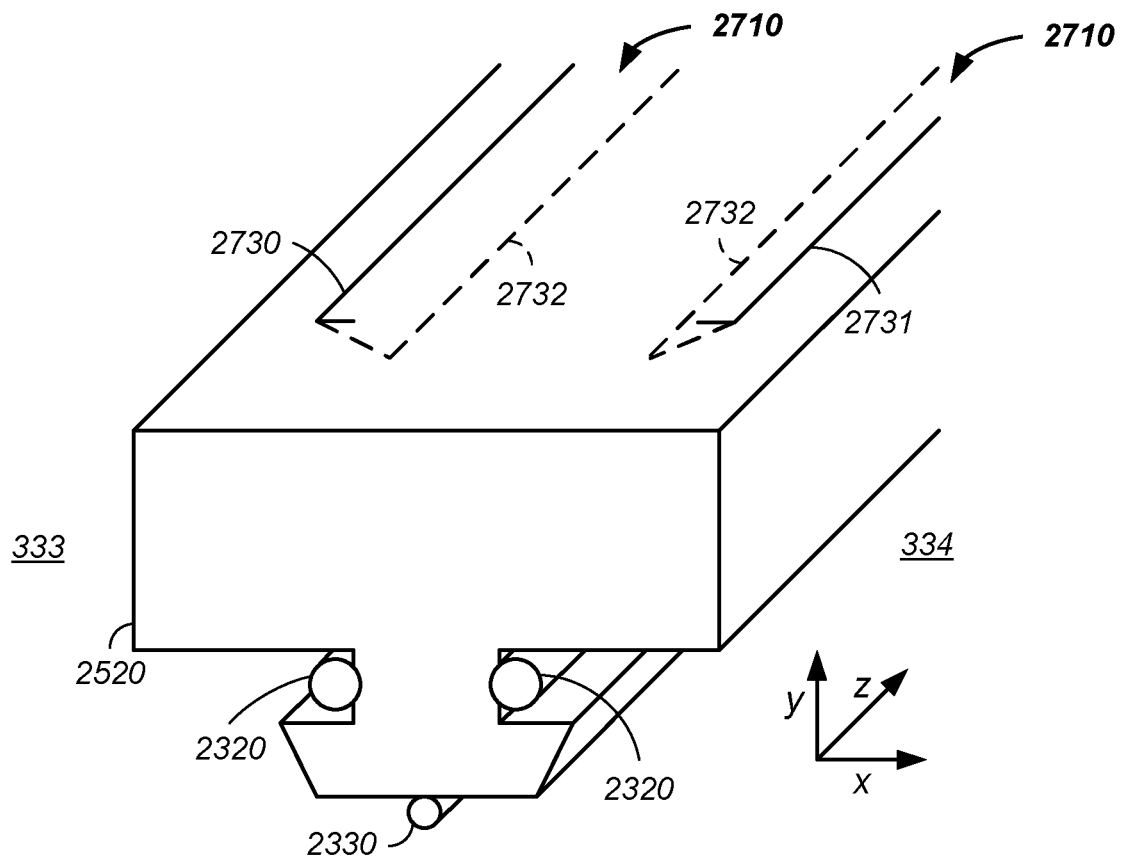
FIG. 29A and FIG. 29B provide a perspective view of lip seals in a natural state and in a deformed state, respectively.
Figure 29B:
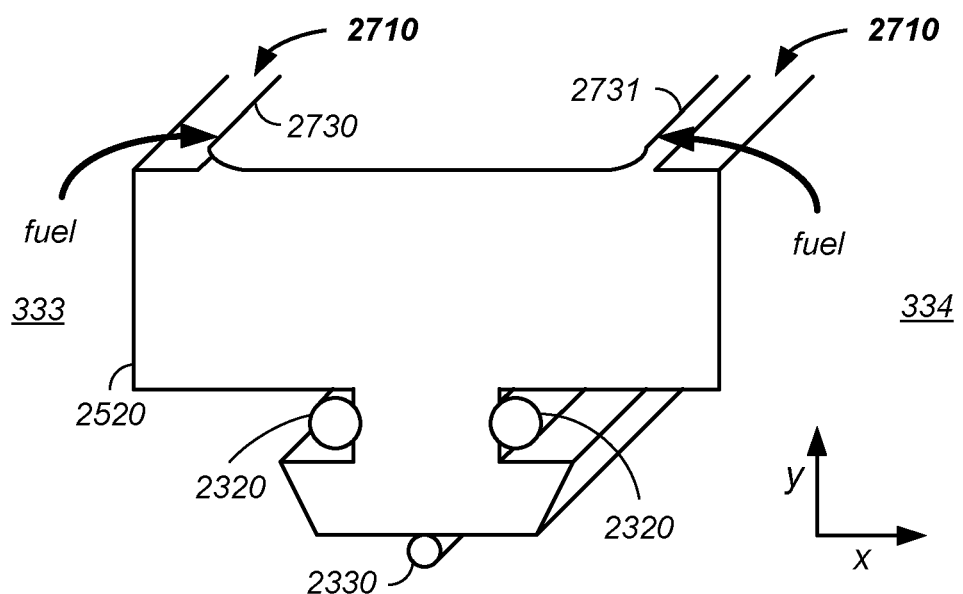

Referring now to FIG. 29A, an example of the lip seal 2710 is further illustrated. The flexible lip seal 2710 contains a trailing lip seal edge 2730 facing the reference expansion chamber 333. The lip seal 2710 penetrates into the leading chamber vane cap to a depth 2732, such as along an insert line. Referring now to FIG. 29B, as fuel runs from the reference expansion chamber 333 between the leading chamber vane cap 2520 and the housing 210, the trailing lip seal edge 2730 deforms to form tighter contact with the housing 210. Similarly, as fuel runs from the leading expansion chamber 334 between the leading chamber vane cap 2520 and the housing 210, the leading lip seal edge 2731 deforms to form tighter contact with the housing 210. Optionally, both the trailing and leading lip seal edges 2730, 2731 are incorporated into a single inset within channel 2810.

Figure 30:
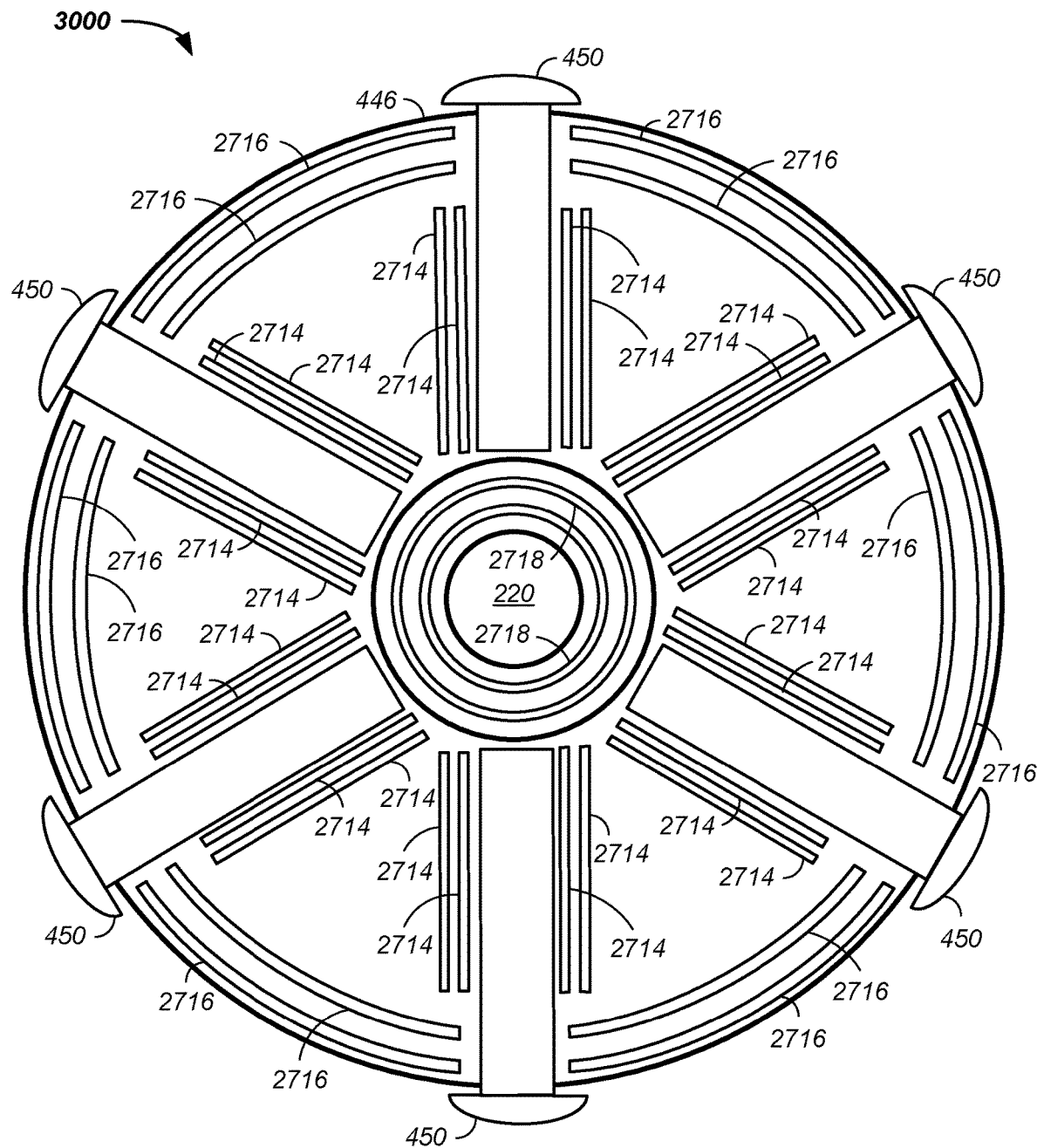
FIG. 30 provides an illustrated a cross-sectional view of a rotor having lip seals.

Referring now to FIG. 30, lip seals, such as the lip seal 2710 previously described, are optionally placed proximate the rotor face, such as next to the first end plate 212 and/or the second end plate 214. Examples of lip seals on the rotor face include: a rotor/vane lip seal 2714, a rotor/expansion chamber lip seal 2716, and an inner rotor lip seal 2718. The rotor/vane lip seal 2714 is located on the trailing edge of rotor-vane chamber 452 and/or on a leading edge of rotor/vane slot, which aids in sealing against fuel flow from the rotor-vane chamber 452 and/or reference expansion chamber 333 to the face of the rotor 440. The rotor/expansion chamber lip seal 2716 aids in sealing against fuel flow from the reference expansion chamber 333 to the face of the rotor 440. The inner rotor lip seal 2718 aids in sealing against fuel flow from the rotor-vane chamber 452 to the face of the rotor 440 toward the shaft 220. For clarity of presentation, the rotor/vane lip seal 2714, the rotor/expansion chamber lip seal 2716, and the inner rotor lip seal 2718 form a continuously connected ring of seals on a rotor edge side of the reference chamber. A first end of the rotor/vane lip seal 2714 optionally terminates within about 1, 2, 3, or more millimeters from a termination of the rotor/expansion chamber lip seal 2716. A second end of the rotor/vane lip seal 2714 optionally terminates within about 1, 2, 3, or more millimeters from the inner rotor lip seal 2718.

Lip seals 2710 are optionally used alone or in pairs. Optionally a second lip seal lays parallel to the first lip seal. In a first case of a rotor face lip seal, the second seal provides an additional seal against fuel making it past the first lip seal. In a second case, referring again to FIG. 29B, the two lip seals seal against fuel flow from two opposite directions, such as fuel from the reference expansion chamber 333 or leading expansion chamber 334 past seals 2730 and 2731 on the leading chamber vane cap 2520, respectively.

Exhaust

Generally, a rotary engine method and apparatus is optionally configured with an exhaust system. The exhaust system includes an exhaust cut into one or more of a housing or an endplate of the rotary engine, which interrupts the seal surface of the expansion chamber housing. The exhaust cut directs spent fuel from the rotary engine fuel expansion/compression chamber out of the rotary engine either directly or via an optional exhaust port and/or an exhaust booster. The exhaust system vents fuel to atmosphere or into the condenser 120 for recirculation of fuel in a closed loop, circulating rotary engine system. Exhausting the engine reduces back pressure on the rotary engine thereby enhancing rotary engine efficiency and reducing negative work forces directed against the primary rotor rotation direction.

More specifically, fuel is exhausted from the rotary engine 110. After the fuel has expanded in the rotary engine and the expansive forces have been used to turn the rotor 440 and shaft 220, the fuel is still in the reference expansion chamber 333. For example, the fuel is in the reference expansion chamber after about the 6 o'clock position. As the reference expansion chamber decreases in volume from about the 6 o'clock position to about the 12 o'clock position, the fuel remaining in the reference expansion chamber resists rotation of the rotor. Hence, the fuel is preferentially exhausted from the rotary engine 110 after about the 6 o'clock position.

For clarity, the reference expansion chamber 333 terminology is used herein in the exhaust phase or compression phase of the rotary engine, though the expansion chamber 333 is alternatively referred to as a compression chamber. Hence, the same terminology following the reference expansion chamber 333 through a rotary engine cycle is used in both the power phase and exhaust and/or compression phase of the rotary engine cycle. In the examples provided herein, the power phase of the engine is from about the 12 o'clock to 6 o'clock position and the exhaust phase or compression phase of the rotary engine is from about the 6 o'clock position to about the 12 o'clock position, assuming clockwise rotation of the rotary engine.

Exhaust Cut

Figure 31:
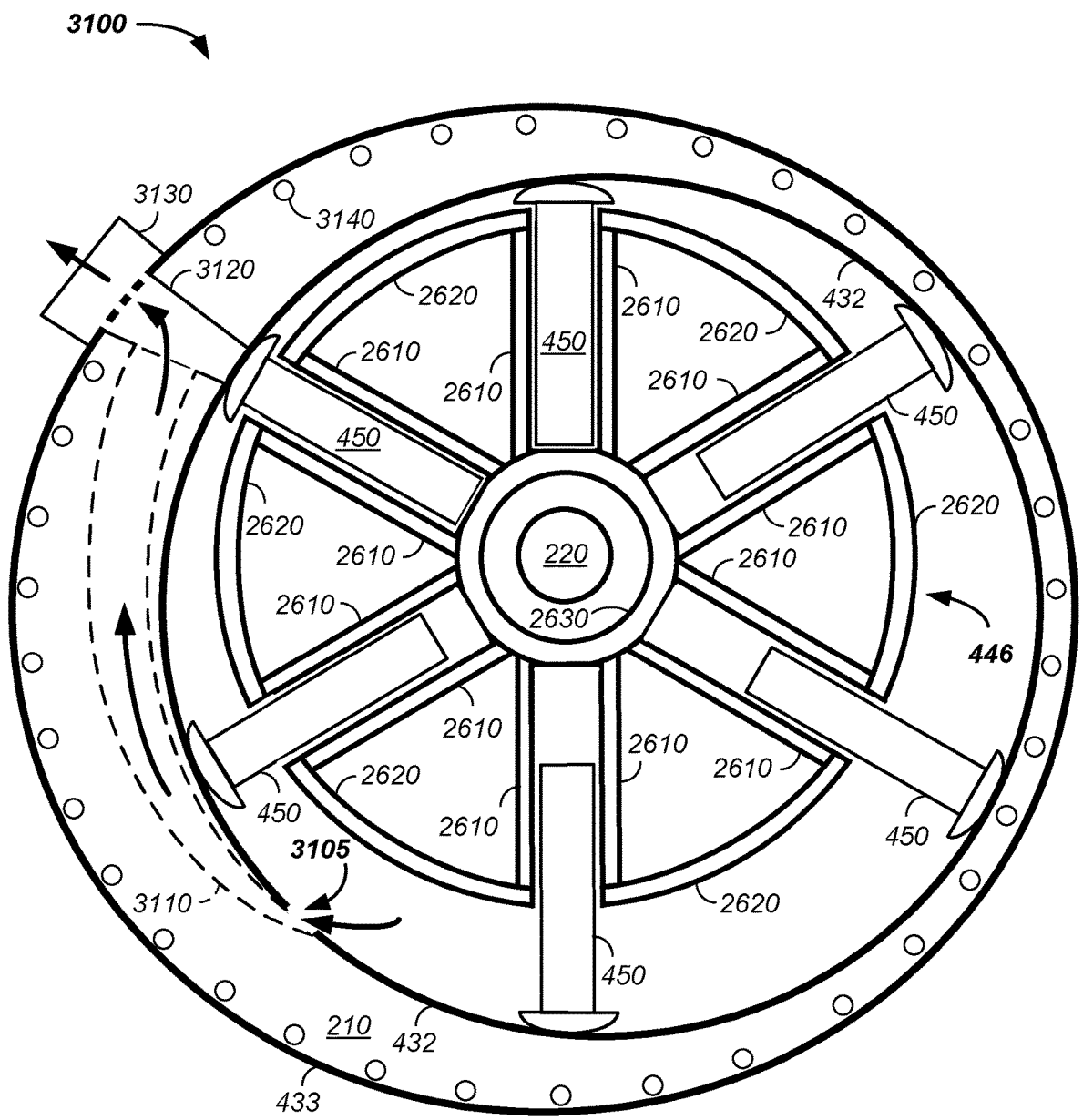
FIG. 31 provides an illustrated cross-sectional view of a rotary engine having an exhaust cut.

Referring now to FIG. 31, an exhaust cut is illustrated. One method and apparatus for exhausting fuel 3100 from the rotary engine 110 is via the use of an exhaust cut channel or exhaust cut 3110. The exhaust cut 3110 is one or more cuts venting fuel from the rotary engine. A first example of an exhaust cut 3110 is a cut in the housing 210 that directly or indirectly vents fuel from the reference expansion chamber 333 to a volume outside of the rotary engine 110. A second example of an exhaust cut 3110 is a cut in one or both of the first endplate 212 and second endplate 214 that directly or indirectly vents fuel from the reference expansion chamber 333 to a volume outside of the rotary engine 110. Preferably the exhaust cuts vent the reference expansion 333 chamber from about the 6 o'clock to 12 o'clock position. More preferably, the exhaust cuts vent the reference expansion chamber 333 from about the 7 o'clock to 9 o'clock position. Specific embodiments of exhaust cuts 3110 are further described, infra.

Housing Exhaust Cut

Still referring to FIG. 31, a first example of an exhaust cut 3110 is illustrated. In the illustrated example, the exhaust cut 3110 forms an exhaust cut, exhaust hole, exhaust channel, or exhaust aperture 3105 into the reference expansion chamber 333 at about the 7 o'clock position. The importance of the 7 o'clock position is described, infra. The exhaust aperture 3105 is made into the housing 210. The exhaust cut 3110 runs through the housing 210 from an inner wall 432 of the housing directly to an outer wall of the housing 433 or indirectly to an exhaust port 3120. In the case of use of an exhaust port, the exhaust flows sequentially from the exhaust aperture 3105, through the exhaust cut 3110, into the exhaust port 3120, and then either out through the outer wall 433 of the housing 210 or into an exhaust booster 3130. The exhaust is then vented to atmosphere, to the condenser 120 as part of the circulation system 180, to a pump or compressor, and/or to an inline pump or compressor.

Figure 32A:
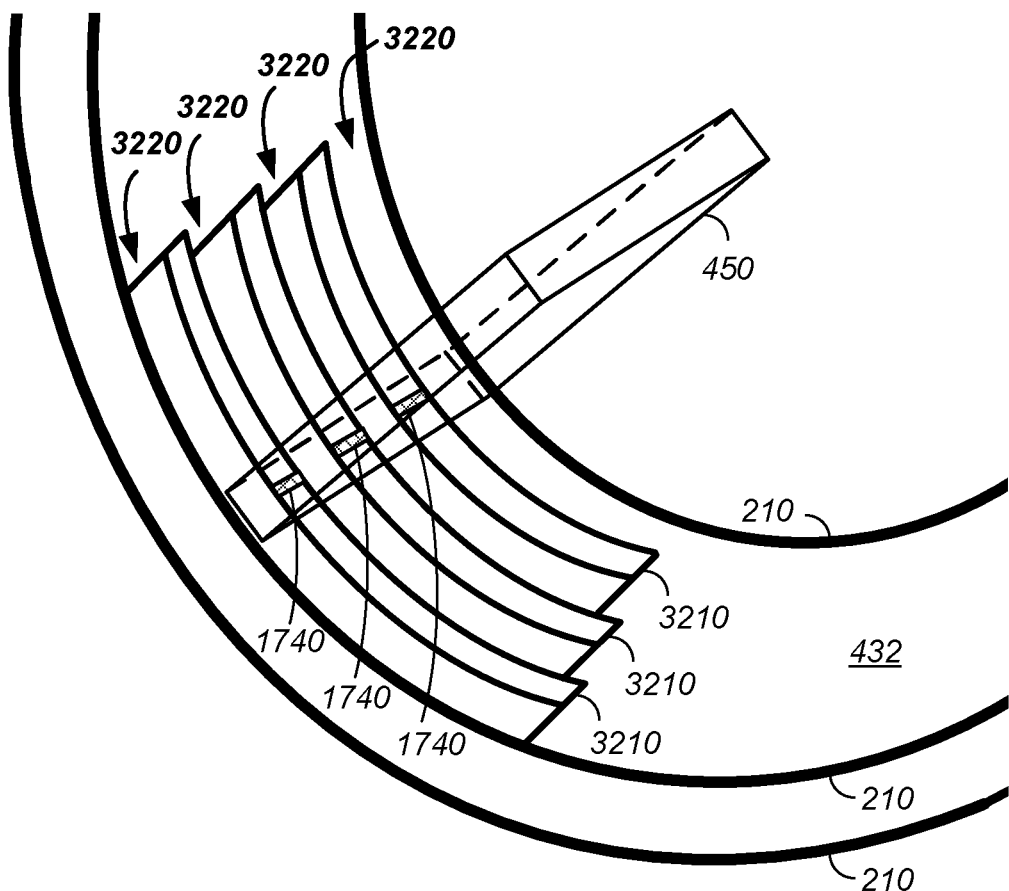
FIG. 32A and FIG. 32B illustrates a perspective view and an end view, respectively, of exhaust cuts and exhaust ridges.
Figure 32B:
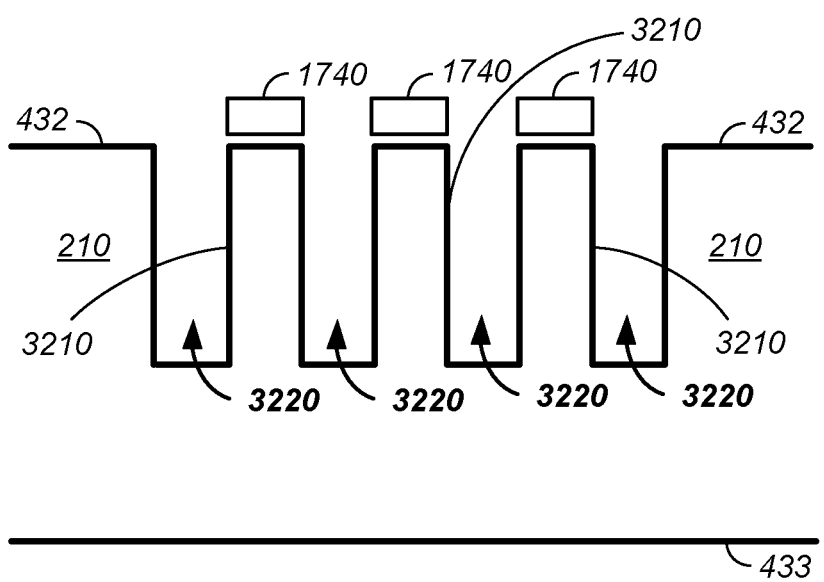

Referring now to FIG. 32A and FIG. 32B, an example of multiple housing exhaust ribs or housing exhaust ridges 3210 and multiple housing exhaust port channels or housing exhaust cuts 3220 is provided. Referring now to FIG. 32A and FIG. 32B, the housing exhaust cuts 3220 are gaps or channels in the inner housing wall 432 into the housing 210. Ridges formed between the housing exhaust cuts 3220 are the housing exhaust ridges 3210. The multiple housing exhaust cuts 3220 are examples of the exhaust cut 3110 and are used to vent exhaust as described, supra, for the exhaust cut 3110. Particularly, though not illustrated in FIG. 32A for clarity, the housing exhaust cuts 3110 vent through the outer wall 433 of the housing 210 or into the exhaust booster 3130 as described, supra.

Still referring to FIG. 32A and FIG. 32B, the exhaust ridges are optionally and preferably positioned to support the load of the roller bearing 1740 of vane 450. As illustrated, the three roller bearings 1740 on the vane-tip 1614 of vane 450 align with three exhaust ridges 3210. The number of exhaust ridges is optionally 0, 1, 2, 3, 4, 5 or more in the rotary engine 110 and optionally preferably correlates to the number of roller bearings 1740 per vane 450.

Referring again to FIG. 31, optional housing temperature control lines 3140 are illustrated. The housing temperature control lines are optionally embedded into the housing 210, wrap the housing 210, and/or carry a temperature controlled fluid used to maintain the housing 210 at about a set temperature. Optionally, the temperature control lines are used as a component of a vapor generator.

Figure 33:
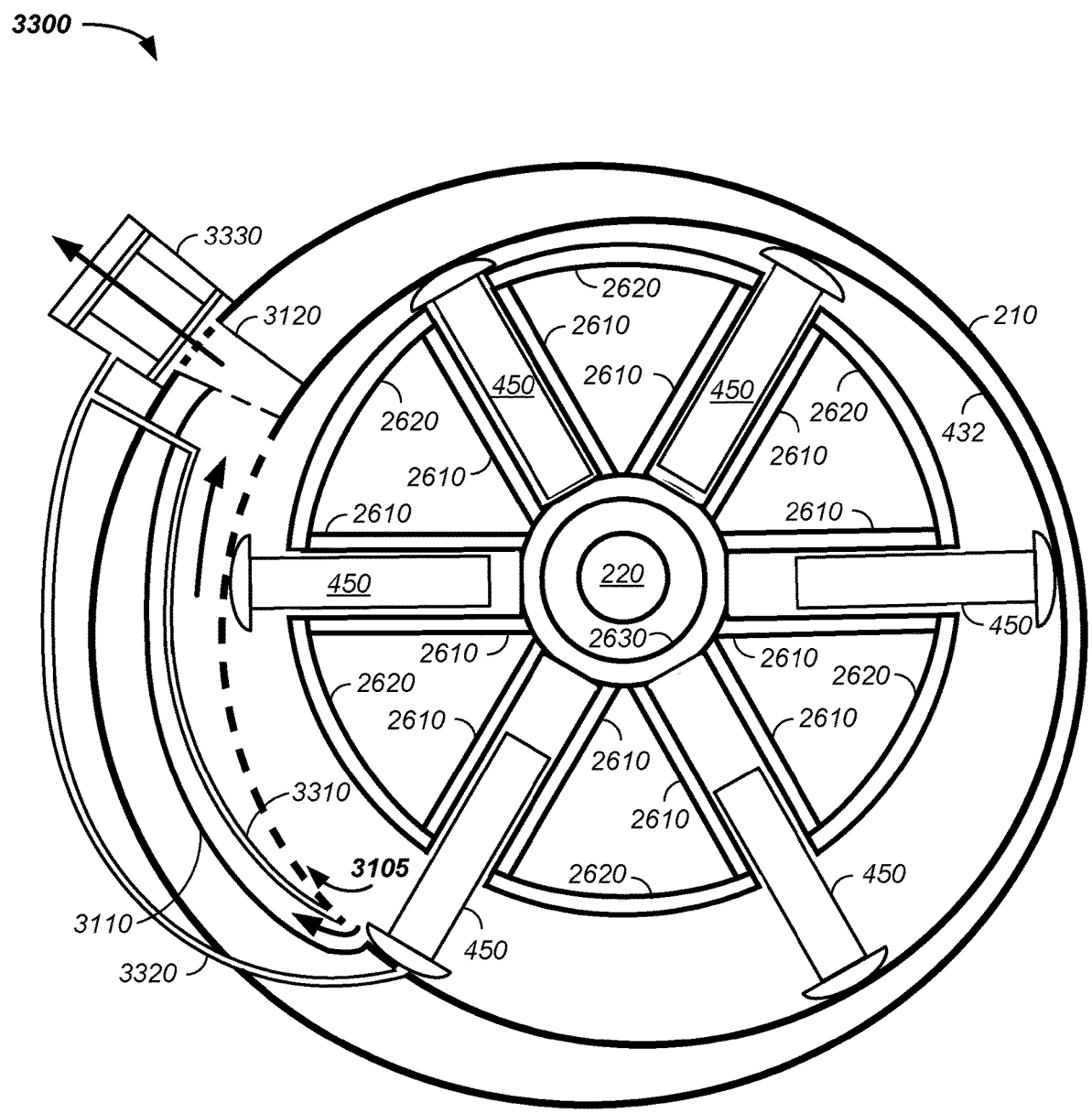
FIG. 33 illustrates an exhaust cut and an exhaust booster combination.

Referring now to FIG. 33, optional exhaust booster lines 3310, 3320 are illustrated. A first exhaust booster line 3310 runs substantially in the exhaust cut 3110 and originates proximate the exhaust aperture 3105. A second exhaust booster line 3320 runs substantially outside of housing 210 and preferably originates in a clock position prior to the exhaust aperture 3105. One or both of the first exhaust booster line 3310 and second exhaust booster line 3320 terminate at exhaust booster 3330 and function in the same manner as the booster line 1024, described supra. Preferably, only the second exhaust booster line 3320 is used. Running the second exhaust booster line outside of the temperature controlled housing allows the spent fuel discharging via the second exhaust booster line to cool relative to the spent fuel discharging through the exhaust cuts 3110 or the housing exhaust cuts 3220. The cooler spent fuel functions to accelerate or boost exhaust flowing through the exhaust cut 3110 in the booster 3130. Further, the second housing exhaust booster line 3220 is preferably positioned in the clock cycle prior to the exhaust aperture 3105, which allows a burst or period of high pressure exhaust vapor to flow from the reference expansion chamber 333 through the second housing exhausts booster line 3220 into the exhaust booster 3330 prior to any fuel being vented through the exhaust aperture 3105. the burst of exhaust to form a partial vacuum outside of the exhaust booster 3330 to help pull exhaust out of the first compression chamber via the exhaust cut 3110.

Referring now to FIG. 31 and FIG. 33, the positioning of the exhaust cut 3110 is further described. In FIG. 31, the rotor 440 is positioned such that there exists a vane 450 at about the 6 o'clock position. The power cycle is substantially over at about the 6 o'clock position, so the exhaust aperture 3105 optionally is positioned anywhere after about the 6 o'clock position. Referring now to FIG. 33, the rotor 440 is positioned such that there exists a vane 450 just before the 7 o'clock position of the exhaust aperture 3105. In FIG. 33, it is clear that if the exhaust aperture were to be positioned just after the 6 o'clock position, then the reference chamber spanning about the 5 o'clock to about the 7 o'clock position would be both in the power phase and the exhaust phase at the same moment, which results in a loss of power as the reference chamber 333 begins to exhaust through the exhaust aperture 3105 before completion of the power phase of the trailing vane 450 reaching the about 6 o'clock position. Hence, it is preferable to move the exhaust aperture clockwise. For a six vane 450 rotary engine 110, the exhaust aperture is moved about one-sixth divided by two of a clock rotation past the 6 o'clock position. When the vane 450 passes the exhaust aperture 3105, the vane 450 changes function from that of a seal to a function of an open valve, exhausting the reference chamber 333 by opening the exhaust aperture 3105.

Similarly, for a rotary engine having n vanes, the exhaust aperture is preferably rotated about ½n of a clock rotation past about the 6 o'clock position and preferably a 1 to 15 extra degrees, depending on the thickness of the vane 450.

In FIG. 31, the exhaust aperture 3105 is illustrated as a distinct opening. Preferably, the exhaust aperture begins at the beginning of a channel, such as the housing exhaust channels 3220 illustrated in FIG. 32A and FIG. 32B. Preferably, each exhaust channels continues with an opening through the inner housing 432 to the reference chamber 333 from the point of the exhaust aperture 3105 until the exhaust port 3120, which is figuratively illustrated as a dashed line in the inner wall 432 of the housing 210 in FIG. 33.

Endplate Exhaust Cut

As described supra, the exhaust cuts 3110 are made into the housing 210. Optionally, the exhaust cuts 3110 are made into the first endplate 212 and second endplate 214 to directly or indirectly vent fuel from the reference expansion chamber 333. Particularly, the exhaust cut 3110 optionally runs through the first and/or second endplate 212, 214 from an inner wall of the endplate directly to an outer wall of the endplate, to an exhaust port, or to a fuel input of a secondary or tertiary rotary engine. In the case of use of an exhaust port, the exhaust flows sequentially from and endplate exhaust aperture, through an endplate exhaust cut, into an endplate exhaust port, and then either out through the outer wall of the endplate or into an endplate exhaust booster. The exhaust is then vented to atmosphere, to the condenser 120 as part of the circulation system 180, or to another engine as an input.

Optionally and preferably, the exhaust cuts 3110 exist on multiple planes about the reference expansion chamber, such as cut into two or more of the housing 210, first endplate 212, and second endplate 214.

Exhaust Port

Preferably, the exhaust port 3120 is positioned at a point in the clock face that allows two vanes 450 to seal to the housing 210 before the initiation of a new power phase at about the 12 o'clock position. Referring now to FIG. 31, the exhaust port 3120 is positioned at about the 10 o'clock position, and is optionally positioned before the 10 o'clock position, to allow two vanes 450 to seal to the inner wall 432 after the exhaust port 3120 and prior to the initiation of a new power phase at about the 12 o'clock position. As with the exhaust aperture 3105, the position of the exhaust port depends on the number of vanes 450 in the rotary engine 110. For a six vane 450 rotary engine 110, the exhaust port 3120 is moved about one-sixth divided by two of a clock rotation past the 6 o'clock position. Similarly, for a rotary engine 110 having n vanes, the exhaust port 3120 is preferably rotated about ½n of a clock rotation past about the 6 o'clock position and preferably a 1 to 15 fewer degrees, depending on the thickness of the vane 450.

Twin Rotor/Multiple Rotor System

In yet another embodiment, the exhaust port 3120 vents into an inlet port of a second rotary engine. This process is optionally repeated to form a cascading rotary engine system.

Vane Insert

Historically, rotary engines using sliding vanes: (1) did not seal properly at start-up, such as at zero revolutions per minute, due to insufficient outward force applied by the vane to the stator and (2) had excessive outward centrifugal force at higher operational speeds. Herein, a stressed band system is described to overcome the historical problems. While, for clarity of presentation, the stressed band system is described in terms of sealing the vane 450 to the housing 210, the stressed band system is optionally used to provide any seal, such as a seal to the rotor 440, a seal to the first endplate 212, and/or a seal to the second endplate 214.

Generally, the stressed band system uses a stressed band wound around counterbalanced rollers in a controlled space, such as in two dynamically opposing C-shaped wraps and/or about an on force-axis S-shaped wrap of the stressed band wound around two rollers in a laterally fixed housing between two endplates or connection points. Still more generally, the stressed band is optionally of any elongated shape and three or more rollers are optionally used. The confined stressed/rotated bands provide a sealing force suitable at low rotary engine revolutions per minute and provide a controllable force reducing pressure at high rotary engine revolutions per minute. The stressed band is optionally a sheet of material, as opposed to a coil-like spring. The sheet of material is optionally a substantially rectangular sheet, such as a sheet of metal, bent or wound into a shape having a spring-like or potential energy. Generally, the sheet has an elongated length, a smaller width, and a still smaller thickness, where the length is greater than 50, 100, or 200 times the thickness and the width is greater than 10, 20, 30, 40, or 50 times the thickness. The stressed band system is further described, infra.

Figure 34:
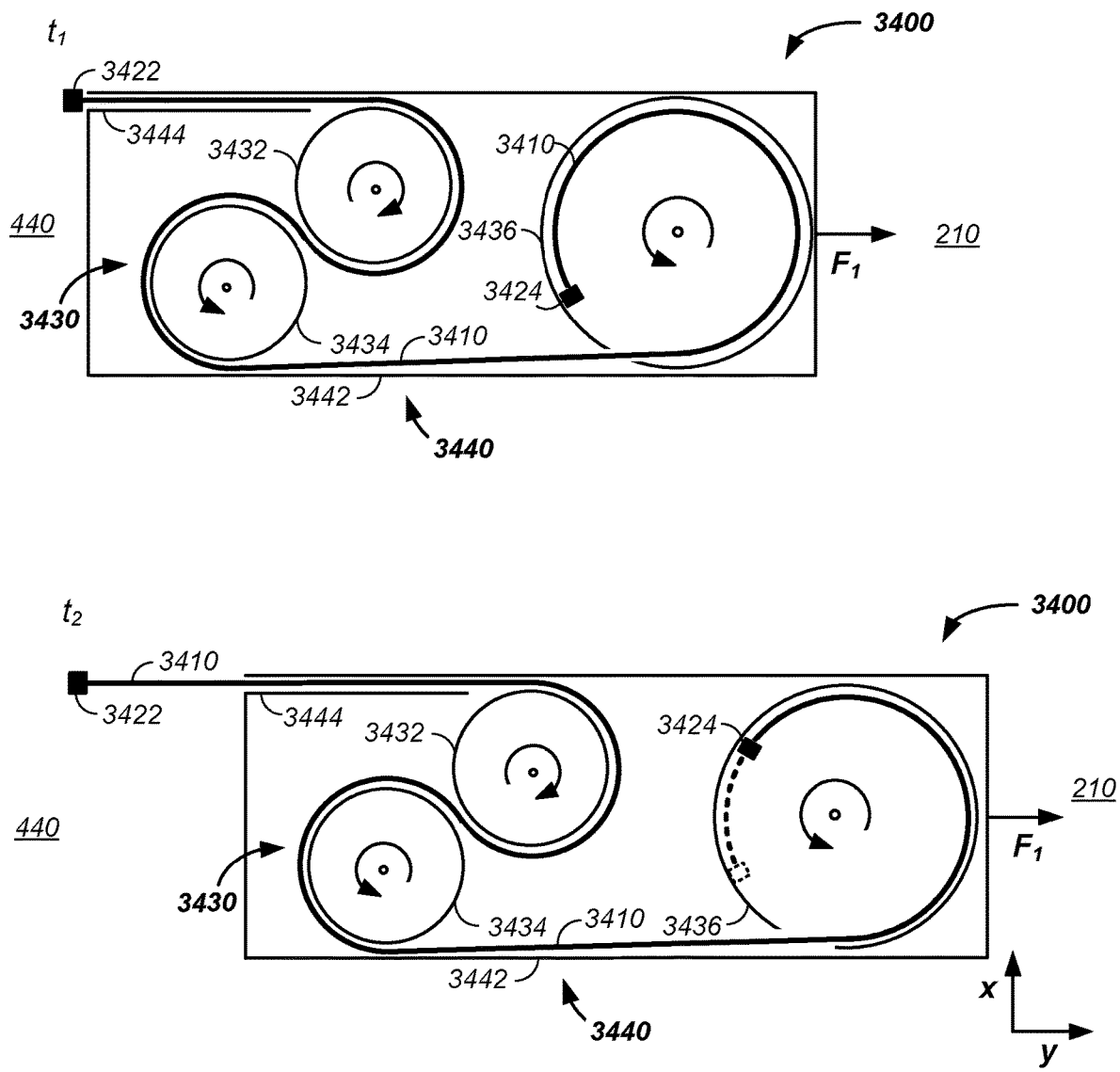
FIG. 34 illustrates a low friction rolling bearing at two time points.

Referring now to FIG. 34, a vane insert 3400 used to provide a sealing force and/or used in control of a sealing force is described. Generally, the vane insert 3400 is integrated into, positioned, and/or inserted into the vane 450 between the rotor 440 and the housing 210. The vane insert 3400 optionally includes a stressed band 3410. Generally, the stressed band 3410 is in a compressed and/or higher potential energy state in a wound configuration and is in a relaxed and/or lower potential energy state in an extended configuration. As illustrated, the stressed band 3410 is in a wound configuration, where the stressed band 3410 applies at least a first force, $F_1$, along a vector from the rotor 440 to the housing 210. The stressed band 3410 is further described infra.

Still referring to FIG. 34, the stressed band 3410 in the vane insert 3400 is illustrated in a wound configuration between anchor points, such as a first anchor point 3422 and a second anchor point 3424. The stressed band 3410 is additionally wrapped about and/or wound through a set of guide rollers 3430, where the set of guide rollers 3430 comprises n guide rollers, where n is a positive integer. As illustrated, the stressed band 3410 is part-circumferentially wound around a first guide roller 3432, about a second guide roller 3434, and about a spooler 3436, which is also referred to herein as a spooling roller. In this example, the first guide roller 3432 and second guide roller 3434 turn in opposite directions over a given time period. Further, in this example, the second guide roller 3434 and spooler 3436 rotate in the same direction over the given time period. The guide roller is optionally aligned along an axis ninety degrees off of the axis of the first guide roller 3432 and second guide roller 3434. Generally, the stressed band is a low friction bearing that uses a stressed metal band and counter rotating rollers within an enclosure, such as in Rolamite technology. The metal band is optionally a metal band, a stressed plastic band, a laminated band in a high energy state attempting to straighten, a temperature sensitive band, and/or a material that deforms upon application of an electrical charge and/or current.

Still referring to FIG. 34, as illustrated, the stressed band 3410 in the vane insert 3400 releases potential energy by extending an outer band surface, such as toward the housing 210, to yield the first force, $F_1$, along the y-axis. In addition, the outer band surface naturally releases potential energy at other positions in the winding. Hence, any number of optional band guiding elements 3440 are used. As illustrated, a first band guiding element 3442 is a rotationally leading vane insert wall 3442, which resists the potential energy release of the outer side of the stressed band along the x-axis toward the rotationally leading chamber. Further, as illustrated, a second band guiding element 3444 resists potential energy release of the stressed band 3410 away from the rotationally trailing chamber.

Herein, for clarity of presentation, a single stressed band is illustrated in the figures and examples. However, optionally and preferably more than one stressed band is used in place of the single illustrated stressed band. For example, 2, 3, or more stressed bands are optionally used in each vane 450.

Still referring to FIG. 34 and referring again to FIG. 6, motion of the vane insert 3400 is further described. In FIG. 34, the vane insert 3400 is illustrated in a retracted position at a first point in time $t_1$, and in an extended position at a second point in time $t_2$. The first anchor point 3422 is optionally attached to the rotor 440, such as in a fixed position, whereas the second anchor point 3424 is attached to the spooler 3436, which optionally freely rotates. Hence, referring now to FIG. 6, as illustrated, the inner wall 432 of the housing 210 forces the vane 450 inward toward the shaft at the 12 o'clock position, which causes the stressed band 3410 to spool on the spooler 3436, as illustrated at the first time, $t_1$, in FIG. 34. As the rotor 440 rotates, such as to the 6 o'clock position in FIG. 6, the distance between the rotor vane base 448 and the inner wall 432 of the housing 210 increases and the potential energy of the stressed band 3410 is released with the first force, $F_1$, in the vane insert 3400 pushing the vane 450 outward, which provides a sealing force between the vane 450 and the housing 210. Thus, as the rotor 440 rotates within the housing 210, the stressed band 3410 dynamically unwinds and winds on the spooler 3436 providing a continuous, optionally varying, outer force on the vane 450 toward the housing 210 resisted by the first anchor point 3422. It is observed that: (1) during the power stroke potential energy of the stressed band 3410 is released as the spooler 3436 unwinds and (2) during the exhaust phase the stressed band 3410 provides a continuous outer force on the vane 450 toward the housing 210 even with the sudden loss of pressure in the expansion chamber. The inventor notes that without the outer force during the exhaust phase, the vane 450 would chatter or rattle between inner and outer extension positions causing uncontrolled exhausting between expansion chambers and/or excessive wear on the vane element and the repeatedly struck inner wall 432 of the housing 210.

Still referring to FIG. 34, the inventor notes that as illustrated the vane insert 3400 provides an outward sealing force or first force, $F_1$, on the vane 450 toward the housing 210 even when the rotary engine 110 is not rotating. Thus, upon starting the rotary engine 110, the rotary engine 110 does not need a starter to load the chambers, which eliminates an entire engine starting mechanism. Further, the seal at zero revolutions per minute allows energy to be provided by the engine immediately, such as during the first few revolutions of the rotary engine 110.

Still referring to FIG. 34, the inventor further notes that as illustrated the vane insert 3400 provides the outward sealing force or first force, $F_1$, on the vane 450 toward the housing 210 even when the rotary engine is operating a very low revolutions per minute, such as at less than 360, 180, 120, 60, 30, 20, 10, 5, or 2 revolutions per minute. Thus, the vane insert 3400 allows the rotary engine 110 to convert power from an energy source, such as a windmill or residual heat source, even when the energy source is minimal, such as at low wind speeds or when the residual heat is minimal, initially present, or fading.

Stressed Band

The stressed band 3410 is optionally a spring steel belt, contains an S-shape bend, comprises a tension band, and/or contains at least one laminated surface/material. Herein, spring steel is a low-alloy steel, a medium-carbon steel, and/or high-carbon steel with a very high yield strength that allows an object made from the spring steel to return to its original shape despite significant bending or twisting. Optionally and preferably, the stressed band 3410 operates in combination with counter rotating rollers in an enclosure to create a bearing device that loses very little energy to friction. The stressed band 3410 forms a C-shape around one roller and an S-shape around two rollers. The bearing device is optionally linear or non-linear, as further described infra.

In another embodiment, the stressed band 3410 comprises a shape memory alloy, which herein also refers to a memory metal, smart metal, and/or smart alloy. Generally, the shape memory alloy is formed in an extended shape, such as a shape that would push the vane 450 outward toward the housing 210. The stressed band 3410, containing the shape memory alloy, is then configured into a non-heated shape, such as wound about the band guiding elements 3440 between the first anchor point 3422 and second anchor point 3424 and/or guided by the band guiding elements 3440. When heated, the shape memory alloy will attempt to revert to its original state, herein the original extended shape. Thus, when the engine runs and heats up, the stressed band 3410 will try to deform to the extended shape applying the first force, $F_1$, on the vane 450 toward the housing 210. An example of a shape memory metal is: tungsten coated with aluminum and/or a metal alloy of nickel and titanium, such as Nitinol, Nitinol 55, and/or Nitinol 60. Nitinol alloys exhibit two closely related properties: shape memory and super elasticity, which is also referred to as pseudo-elasticity. Shape memory is the ability of the shape metal to deform at one temperature, then recover its original, un-deformed shape upon heating above its transformation temperature. Optionally, a crystalline boron silicate mineral compounded with elements such as aluminum, iron, magnesium, sodium, lithium, or potassium, for example tourmaline, is added to, embedded into, and/or is affixed to the memory metal as a means for adding current, heat, and/or pressure to the memory metal. For example, a current/voltage is provided to the tourmaline to introduce heat to the memory metal inducing a shape change. Similarly, the memory metal, a coated memory metal, and/or tourmaline inserts are optionally positioned in vane vapor vortex generating side inlet ports, providing both piezoelectric and thermo-electric generation. In one case tourmaline in conjunction with the vane is used as part of an electromagneto-hydrodynamic device.

In yet another embodiment, an induced temperature change is applied to a memory shape alloy to move an element of the rotary engine 110. For example, the main controller 110 injects into the rotary engine 110, such as via a fuel inlet, a heated or cooled fuel, such as a liquefied nitrogen. The liquefied nitrogen expands in the expansion chamber functioning as an expansion fuel and changes the temperature of the memory shape alloy to perform a task, such as opening or closing a valve and/or extending or retracting the element of the rotary engine 110.

Vane Insert

Figure 35A:
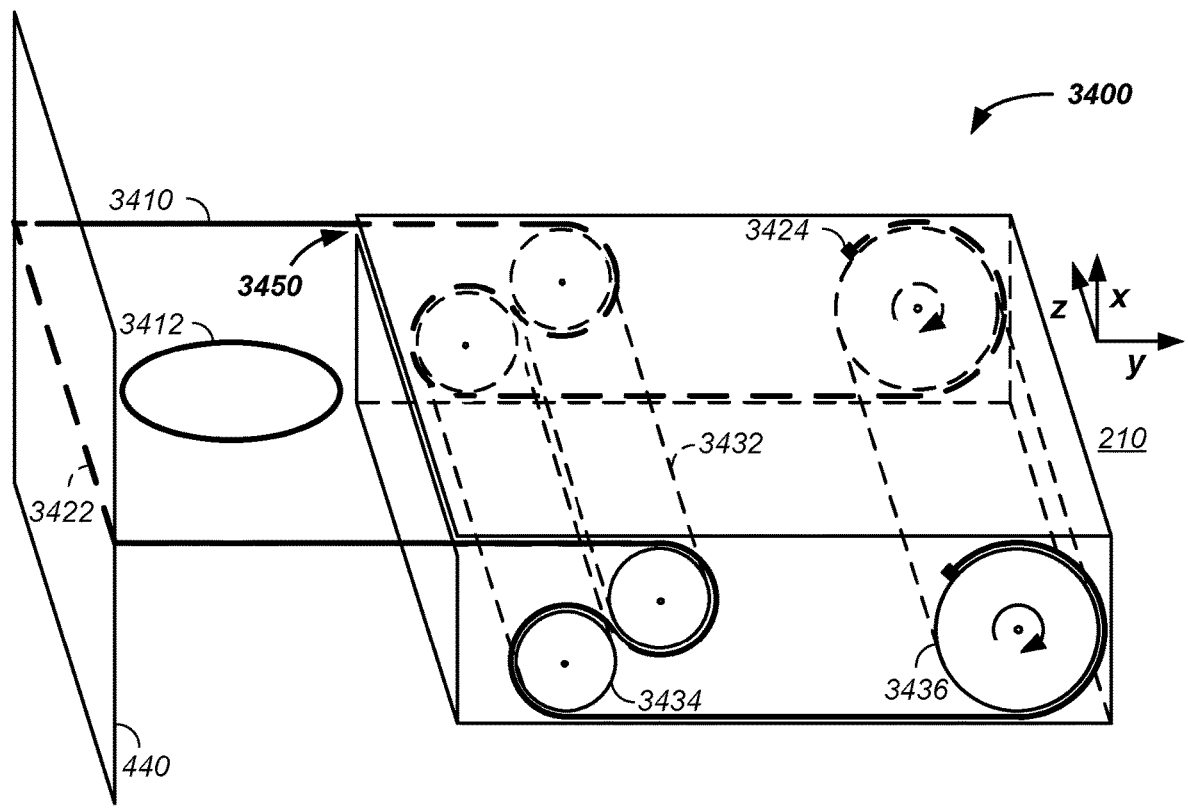
FIG. 35A and FIG. 35B provide an illustrated perspective view of a rotor vane insert and a spooling sheet thereof, respectively.
Figure 35B:
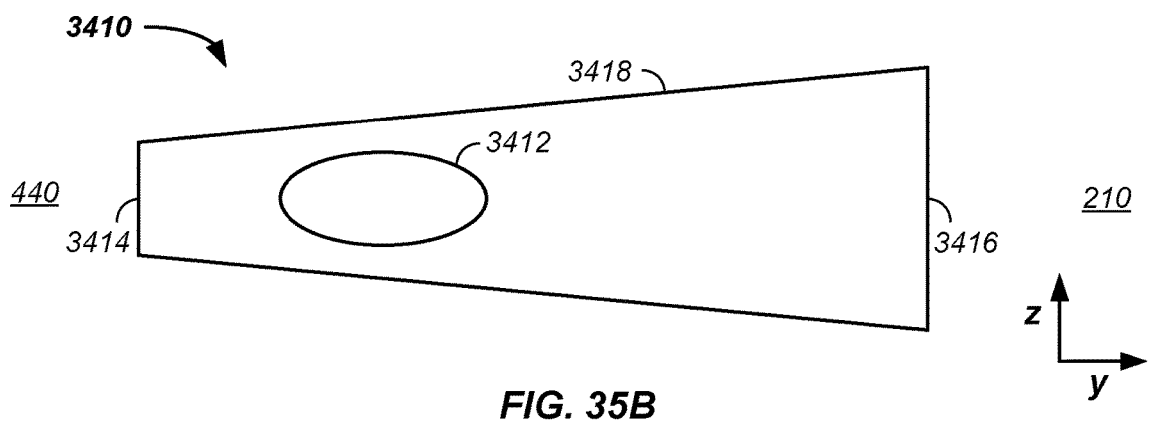
Figure 36A:
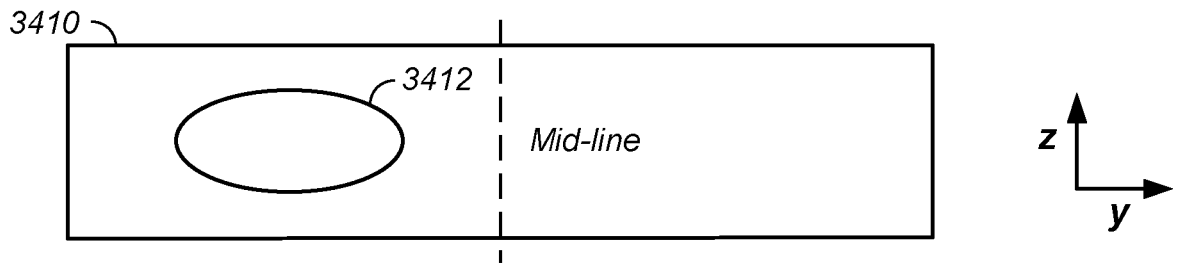
FIG. 36 A-D illustrate a spooling spring with a left of center cut-out, FIG. 36A; a right of center cut-out, FIG. 36B; a Fibonacci cut-out, FIG. 36C, and a non-rectangular perimeter, FIG. 36D.
Figure 36B:
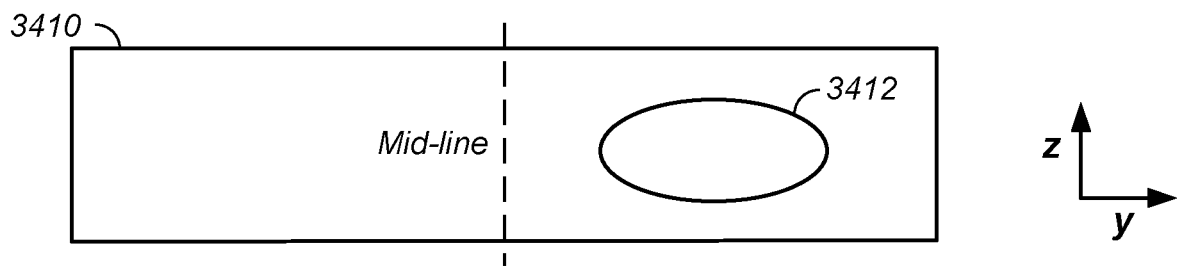
Figure 36C:
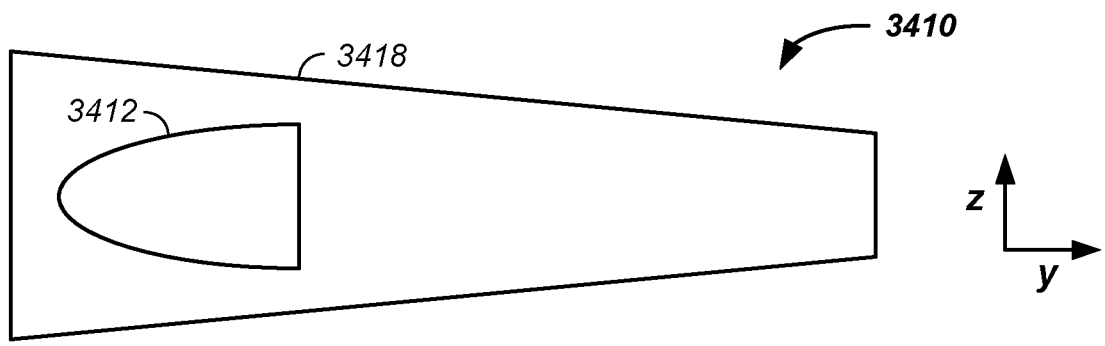
Figure 36D:
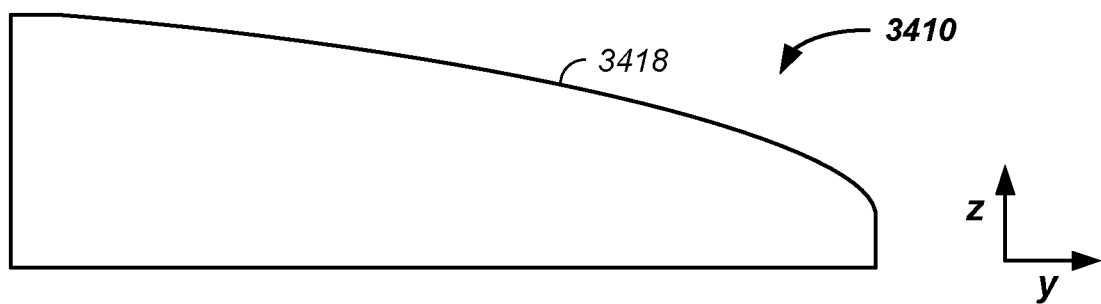

Referring now to FIG. 35A and FIG. 35B, the vane insert 3400, which inserts into a vane 450, is further described. Referring now to FIG. 35A, the stressed band 3410 is illustrated in a perspective view, as an optional embodiment attached directly to the rotor 440 and with a band cutout 3412. The band cutout 3412 is optionally of any geometric shape.

Referring now to FIG. 35B, further optional elements of the stressed band 3410 are described. First, as illustrated, the band cutout 3412 is closer to the rotor 440 than any of the band guiding elements 3440 or rollers. Since the memory of the stressed band 3410 is dependent upon the cross-sectional area along the y/z-plane, the illustrated band cutout 3412 will weaken the partial force of the band where the band cutout 3412 is present, in this case making the rotor side of the stressed band 3412 weaker than the housing side of the stressed band. Second, as illustrated, an outer perimeter of the stressed band 3414 is optionally non-rectangular in the y/z-plane. As illustrated, the stressed band 3410 widens from a first band width 3414 at the rotor 440 to a second band width 3416, proximate the vane cap 2210, vane-tip 1614, rotor side of the vane head 1611, and/or inner portion of the vane body 1610 on the housing side of the stressed band 3410. As illustrated, the band outer edge 3418, rotationally trailing edge, and/or rotationally leading edge, defines the z-axis width of the stressed band 3410 as a function of y-axis position. The cut-out and perimeter shape of the stressed band 3410 alter the net force applied by the stressed band 3410 along the longitudinal axis of the stressed band 3410. Through shape of the band outer edge 3418 and/or shape of the band cutout 3412, the force, such as the first force $F_1$, along the y-axis pushing the vane toward the housing 210 is optionally set to be proportional to the Fibonacci ration plus or minus ten percent as a function of rotation of the rotor in the power stroke.

Referring now to FIG. 36(A-D), additional shapes/features of the stressed band 3410 in a pre-installation flat orientation are described, to further clarify the invention. Referring now to FIG. 36A and FIG. 36B, the stressed band 3410 is illustrated with a rectangular perimeter and a band cutout 3412 to a rotor side of a mid-line and to a housing side of the mid-line, respectively. Generally, moving a position of the band cutout 3412 changes the net force pushing in one direction or another. Here, in FIG. 36A the band cutout 3412 to the rotor side of the midline results in less stressed band potential energy to the rotor side of the mid-line and a net shift in applied force of the stressed band 3412 toward the rotor 440. Similarly, in FIG. 36B the band cutout 3412 to the housing side of the midline results in less stressed band potential energy to the housing side of the mid-line and a net shift in applied force of the stressed band 3412 toward the housing 210. Referring now to FIG. 36C, the stressed band 3410 is illustrated with a sloping band outer edge 3418, resultant in more force toward the housing 210 and additionally with an increasing x/z-plane band cutout 3412 with a sharp cutoff, resulting in a net peak force, such as through a power stroke of the rotary engine 110, and a sharp drop-off in peak force, such as during an exhaust phase of the rotary engine 110. Referring now to FIG. 36D, the band outer edge 3418 is illustrated with a decreasing z-axis cross-sectional length as a function of y-axis position, where the decrease is non-linear. Optionally, the non-linear change in x/z-plane cross-sectional area changes at a calculated amount, such as at about the Fibonacci ratio and/or at about a multiple of the cross-sectional area of the expansion chamber 333 as a function of rotation of the rotor 440 through the power stroke, such as from a one o'clock rotational position to a six o'clock rotational position.

Dynamic Vane Force Actuation

Rotary engines traditionally have the problems of: (1) sealing the vane to the housing at low revolutions per minute, due to lack of centrifugal force, and (2) preventing excessive centrifugal force from applying undue resistance/binding pressure between the vane and the housing at high revolutions per minute. As described, supra, the stressed band 3410 allows for an appropriate contact force between the vane 450 and the housing 210 of the rotary engine 110: (1) at zero revolutions per minute and (2) at higher revolutions per minute due to the balanced roller forces and/or changing y/z-plane cross-sectional area of the stressed band 3410 as a function of y-axis position in the vane 450.

Figure 37:
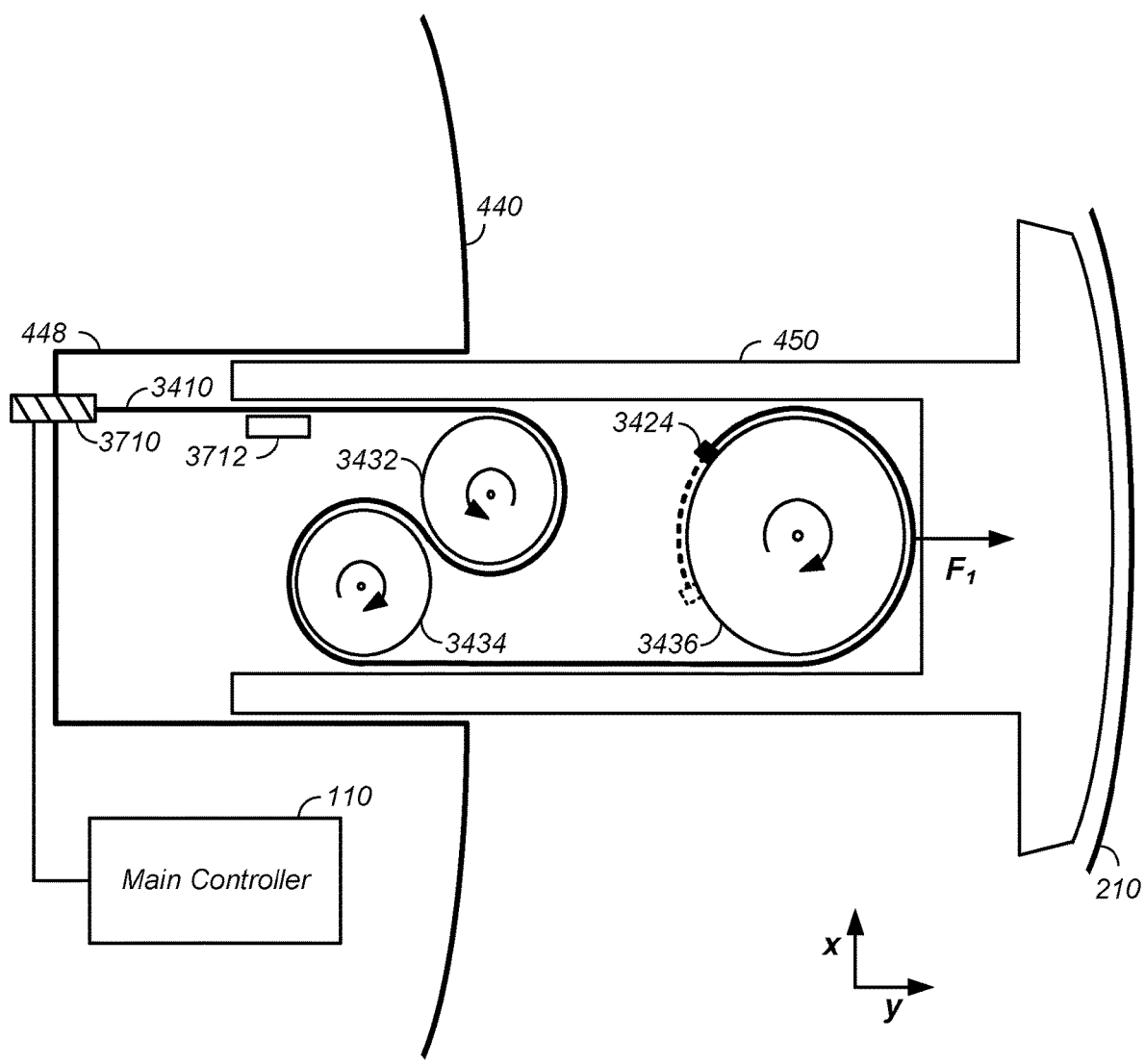
FIG. 37 illustrates an extending vane insert.

Referring now to FIG. 37, another vane force actuation embodiment is described. Generally, one end of the stressed band 3410, such as the first anchor point 3422, is optionally moved with time, need, fuel supply, engine performance, and/or rotation position. Several examples are provided to further illustrate the embodiment.

Example I

Figure 38:
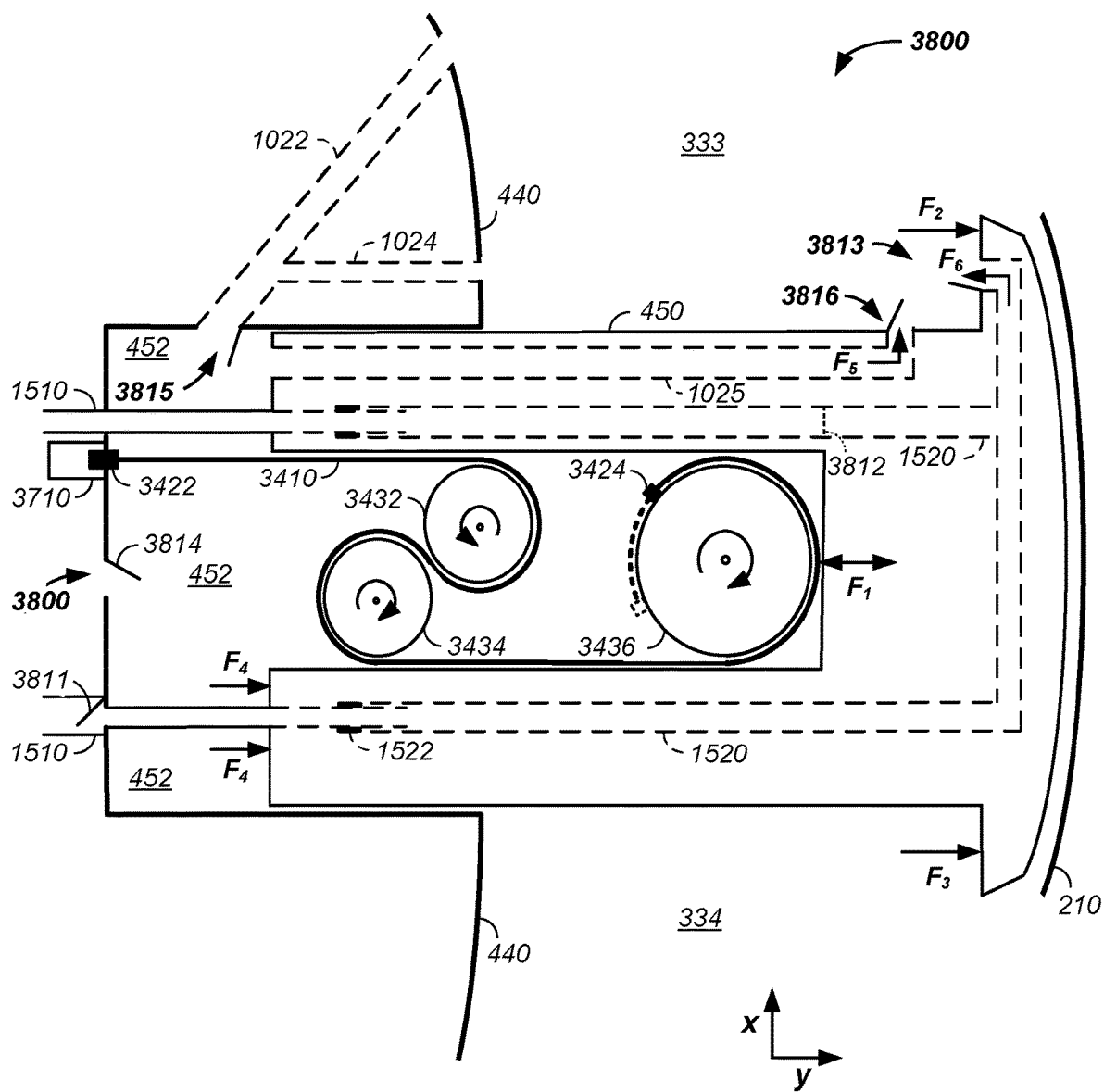
FIG. 38 illustrates vane channels relative to a vane insert.

Referring still to FIG. 37 and now referring to FIG. 38, in a first example, the first anchor point 3422 comprises use of a worm drive 3710. The worm drive 3710 is used to alternately extend and retract a first end of the stressed band 3410, where the stressed band 3410 is used to provide an outward force to the vane 450 toward the housing 210. At a first point in time, such as when the rotary engine 110 is starting and/or operating at low revolutions per minute, the centrifugal force of the vane 450, resultant from rotation of the vane 450, toward the housing 210 is insufficient to form a seal. At the first point in time, the worm drive 3710 is optionally used to extend the stressed band 3410 into the vane 450, which yields a larger first force, $F_1$, from the stressed band 3410 on the vane 450 toward the housing 210. At a second point in time, such as when the rotary engine 110 is operating at high revolutions per minute, the centrifugal force of the vane 450 toward the housing, due to high rotational speeds of the vane 450, is greater. At the second point in time, the worm drive 3710 is optionally used to retract the stressed band 3410 away from the vane 450, which yields a typically but optionally lower, zero, or negative first force, $F_1$, from the stressed band 3410 on the vane 450 toward the housing 210. Thus, (1) at low rotary engine 110 speeds, the stressed band 3410 is used to add the first force, $F_1$, to the centrifugal force of the rotating vane and (2) at high speeds of the rotary engine 110, the stressed band 3410 is optionally used to reduce the first force, $F_1$, relative to a force applied when the stressed band 3410 is extended. The lower or negative first force, $F_1$, thus reduces total force applied by the vane 450 to the housing 210 at the second point in time.

Example II

Referring still to FIG. 37, the worm drive 3422, is optionally any mechanical/electromechanical element used to change the effective length of the stressed band 3410, where the effective length is a distance from the first anchor point 3422 to the second anchor point 3424, which moves on the spooler 3436. For instance, a clamping mechanism 3712, such as a clamp under control of the main controller 170, optionally pins a section of the stressed band 3410 against an element, such as the vane 450, thereby changing the effective length of the stressed band 3410. Optional electromechanical elements used to control, extend, and/or retract a portion of the stress band include, but are not limited to, a gear, a lever, a sensor, a circuit, a controller, a switch, a solenoid, a relay, a valve, a clamp, a piston, and/or a computer, which is optionally linked to a look-up table containing pre-calculated values, such as a worm drive position to yield a radially outward force of a given amount, and/or computer code for controlling the stressed band.

Example III

Referring still to FIG. 37, movement of the first anchor point 3422 to alternately add and subtract from the first force, $F_1$, is optionally controlled by the main controller 170 and/or a sub-control unit thereof. The main controller 170 optionally uses a sensor input, from the at least one sensor 190, in the control of the first anchor point 3422. In one case, the sensor input senses the outward force of the vane 450 against the housing 210. In another case, the sensor 190 senses the revolutions per minute of the rotor 440 of the rotary engine 110, which is related to centrifugal force of the vane 450 on the housing 210.

Example IV

Referring still to FIG. 37, in place of the worm drive 3710, optionally any electromagnetic element is used to: (1) dynamically move the first anchor point 3422 and/or (2) all or part of the vane insert 3400 relative to the housing along the y-axis. For example, a motor is used in place of the worm drive to retract the stressed band 3410 at high engine speeds and to extend the stressed band 3410 at low engine speeds.

Example V

In another example, a rotary engine having a housing, a rotor, and a set of vanes is used where the set of vanes divides a volume between the rotor and the housing into a set of chambers. A stressed sheet, such as the stressed band 3410, in a first vane of the set of vanes, is used to apply a radially outward force on a section of the first vane toward said housing. Further, electromechanical means for controlling extension of the first vane toward said housing and/or away from the housing are used. Preferable, the electromechanical means: (1) extend the stressed sheet toward the housing when an operational speed, or rotation rate, of the engine decreases and/or (2) retract the stressed sheet away from the housing when the operational speed of the engine increases. Optionally, the stressed sheet yields: (1) a first force on the first vane toward the rotor at a first engine speed and (2) a second force on the first vane toward the rotor housing at a second engine speed, where the second engine speed is at least 2, 3, 5, 10, 25, 50, or 100 times said first engine speed and/or where the first force at least 1, 2, 5, 10, 20, or 50 percent greater than the second force.

Example VI

In another example, the stressed sheet, described supra, rolls into the spooler 3436. For example, the spooler optionally contains two outer ends and a curved connecting surface, such as a spool of thread. The spooler optionally contains a slit, through which the stressed sheet passes and an interior surface about which the stress sheet spools. The outer curved connecting surface thus comprises a barrier against which the stressed sheet pushes, where the force is transferred by mechanical means to the vane, such as with the follower.

Vane Cam

In another embodiment, one or more sealing forces applied to the vane 450 toward the housing 210 are non-linear with rotation of the rotary engine 110. An example of a non-linear force is provided, infra.

Figure 39:
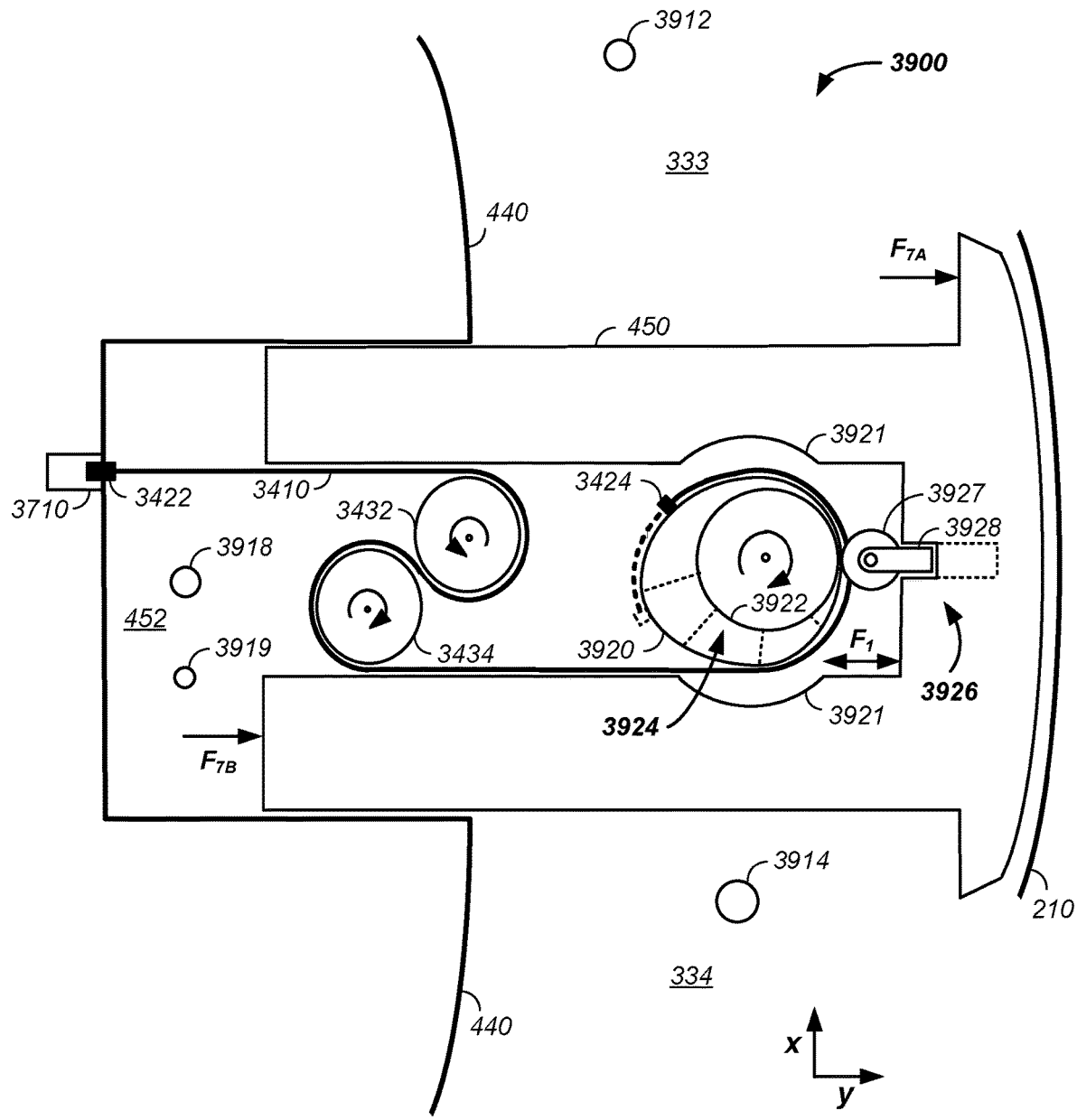
FIG. 39 illustrates a non-linear spring vane insert.

Referring now to FIG. 39, a non-linear cam roller 3920 used in actuation of the vane 450 is described. Generally, rotational motion of the cam roller 3920, which is an example of the spooler 3436, is transferred to linear motion of a cam follower 3926, which in turns applies an outward force to an inside structure of the vane 450 toward the housing 210. The cam roller 3920 is an example of the first guide roller 3432, the second guide roller 3434, or the spooler 3436.

Example I

A non-limiting example is used to further describe a cam system 3900. Referring again to FIG. 3 and referring now to FIG. 39, this example describes vane actuation during the power stroke of the rotary engine 110 from about the one o'clock to five o'clock position plus or minus 2, 5, 10, 15, or 20 degrees. As the vane 450 rotates with the rotor 440 in the housing through the power stroke, the stressed band 3410 partially unwinds from the cam roller 3920. Motion of the cam roller 3920 is transferred to the cam follower 3926. For instance, a cam follower wheel 3927 rotates with the cam roller 3920 and the cam follower wheel 3927 forces a cam rod 3928 into a radially inward side of an element of the vane 450, such as a cam guide slot, which pushes the vane 450 toward the housing 210. Generally, the stressed band 450 extends releasing potential energy in the stressed band 3410, which is transferred to an outward force on the vane 450. In a first case, the stressed band 3410 exerts a linear force with motion, such as in the case of a rectangular stressed band and a circular spooling roller. In a second case, as the stressed band 450 extends, a non-linear force is applied as a function of time and/or a function of extension of the vane 450, such as in the instances of: (1) a non-rectangular stressed band and/or (2) where the stressed band 3410 has an aperture therethrough. In a third case, the cam roller 3920 in the cam system 3900 is non-circular, such as oval or egg-shaped. In the third case, extension of the stressed band 3410 and translation of the cam follower 3926 yields a non-linear extension of the cam rod 3928 pushing the vane 450 in a non-linear fashion, such as that matching the distance between the rotor 450 and the housing 210 at the current rotational position of the vane 450 in the rotary engine 110. For example, the non-linear force of the stressed band and/or the non-linear extension resultant from a curved outer shape of the cam roller 3920 tracks the expansion rate of the trailing expansion chambers as a function of rotational position. Stated again, for clarity, the cam shape optionally matches, within ten percent, a distance from the rotor face to the housing in the power stroke, which is non-linear with rotation positions, as illustrated in FIG. 9. Hence, the non-linear increase in cross-sectional distance with rotation position is optionally approximately correlated by the distance from the cam center to the cam edge as a function of rotation.

Example II

A second non-limiting example is used to still further describe the cam system 3900. As the cam roller 3920 rotates about a rotation axis, a radial cam distance 3924 between a circle 3922 about the rotation axis and an outer perimeter of the cam roller 3920 lengthens at the rate of expansion of the expansion chamber, such as within less than 1, 2, 4, 6, 8, 10, 15, or 20 percent of the Fibonacci ratio as a function of rotation of the rotor 450 through at least a portion of the power stroke. Hence, the cam shape as a function of rotation of the cam optionally matches the power stroke as a function of rotation of the rotor. Similarly, the opposite side of the cam has a shape that as a function of rotation matches the chamber between the rotor 440 and the housing 210 in the compression phase of the rotary engine 110. Optionally, the vane 450 contains a cam cutout 3921 to accommodate steric cam rotation constraints.

Forces/Injection Ports

Referring now to FIG. 2, FIG. 3, FIG. 38, and FIG. 39, the rotary engine 110 optionally includes a set of injection ports 3910. The set of injection ports 3910 includes: a first injection port 3912 in the first expansion chamber 335; a second injection port 3914 in the expansion chamber after a first rotation of the rotor 440, such as in the second expansion chamber 345; a third injection port 3916 into the expansion chamber after a second rotation of the rotor 440, such as the third expansion chamber 355; via a fuel path through the shaft 220 of the rotary engine 110; through the fourth injection port 3918 into a rotor-vane chamber 452 or rotor-vane slot between the rotor 440 and the vane 450; a fifth injection port, such as through flow tube 1510 and shaft valve 3811; and/or through the telescoping second rotor conduit insert 1512 and via the vane wing valve 3813. Optionally, one or more of the injection ports 3910 are controlled through mechanical valving and/or through use of the main controller 170. Optionally, the first, second, and/or third injection ports 3912, 3914, 3916 are through the first endplate 212 of the rotary engine 110 separating the rotor from a circumferential housing or housing 210, through a second endplate 214 parallel to the first endplate 212, through a centerplate between two conjoined rotary engines; and/or through the circumferential housing or housing 210. The injection ports and radially outward sealing forces are further described, infra.

Referring now to FIG. 38, controllable forces acting radially outward from the vane 450 toward the housing 210 are further described. Generally, as the rotor 440 of the rotary engine 110 rotates, the vane 450 exhibits a centrifugal force on the housing 210. Additional forces are optionally: (1) added to and/or (2) subtracted from the centrifugal force. The additional forces are optionally controlled through: (1) purely mechanical operation of valves, such as via the lower trailing vane seal 1026 valving the first rotor conduit 1022 described supra and/or (2) via electromechanically opening/closing valves under control of the main controller 170. The inherent controlled forces are further described, infra.

Still referring to FIG. 38, the first force, $F_1$, resultant from the stressed band 3410/roller combination in a constrained space in the vane insert 3400 is described supra.

Still referring to FIG. 38, a second force, $F_2$, and third force, $F_3$, are resultant from expansion of the fuel in the trailing expansion chamber or reference 333 and leading expansion chamber 334, respectively, exerting a force on the wing-tip bottom 1634. The second force, $F_2$, and third force, $F_3$, are controllable by using the main controller 170 to control rate of fuel flow into the first inlet port 162. Optionally, the main controller 170 uses input from a sensor 190, such as a power load sensor and/or a fuel supply sensor in determination of a dynamically targeted fuel flow.

Still referring to FIG. 38, a fourth force, $F_4$, and fifth force, $F_5$, are resultant from expansion of the fuel in the rotor-vane chamber 452, such as via the first rotor conduit 1022. The fourth force, $F_4$, acts on a rotor side of the base of the vane 450 from expansion of fuel in the rotor-vane chamber 452. Similarly, the fifth force, $F_5$, acts on a rotor side of a vane element, such as after passing through the vane conduit 1025. Herein, the fifth force, $F_5$, having a y-axis vector is illustrated as exiting the vane 450 on a trailing vane side into the trailing expansion chamber or reference chamber 333. However, the fifth force, $F_5$, is optionally routed through the wing-tip bottom 1634, as illustrated for the sixth force, $F_6$, described infra.

Still referring to FIG. 38, the sixth force, $F_6$, optionally originates from fuel passing through the shaft 220. More particularly, fuel sequentially flows through the shaft 220, as described supra; through the flow tube 1510 passing through the rotor-vane chamber 452; into a shaft-vane conduit 1520; and out to the trailing expansion chamber 333 through the wing-tip bottom 1634, where the expansion of the fuel and/or use of the vane flow booster 1340 provides a radial thrust or the sixth force, $F_6$, toward the housing 210.

Referring now to FIG. 39, a seventh force, $F_7$, is resultant from expansion of a fuel through a port of the set of inlet ports 3910, which are further described herein. The set of inlet ports 3910 are optionally fuel inlets through the housing 210, first endplate 212, second endplate 214, and/or shaft 220. Fuel is optionally simultaneously and/or nearly simultaneously injected into several compartments of the rotary engine 110.

Several examples are used to illustrate the multi-injection port system.

Example I

Referring again to FIG. 2 and FIG. 3 and still referring to FIG. 39, in a first example, fuel is injected via multiple injection ports of the set of inlet ports 3910, such as via: (1) a first injection port 3912 into the first expansion chamber 335; (2) a second injection port 3914 into the second expansion chamber 345; and/or (3) a third injection port into the third expansion chamber 355. The injected fuel is optionally a cryogenic fuel, such as a liquid nitrogen fuel, that rapidly expands in the warmer expansion chambers resulting in expansion forces. In addition to rotating the rotor 440 and vane 450, the expansion forces provide an additional sealing force, $F_{7A}$. Optionally, the first injection port 3912, the second injection port 3914, and third injection port are of different diameters and/or deliver different amounts of fuel. For instance, the second injection port optionally delivers more fuel, such as through a larger diameter port or more compressed fuel source, into the second expansion chamber 345, which is larger than the first expansion chamber 335 at the time of fuel injection. The larger fuel amount is optionally greater than 10, 20, 30, 40, 50 percent more fuel. In another case, rate of delivery of fuel through the first injection port 3912 is greater than via the second injection port 3914 to allow more time for fuel expansion in the power stroke of the rotary engine, such as from about the one o'clock to six o'clock position. In still another instance, fuel is initially injected via the first injection port 3912 into the first expansion chamber 335; subsequently injected into the second expansion chamber 345 upon rotation of the first expansion chamber 335 into the position of the second expansion chamber 345; and/or still later injected via the third injection port into the first expansion chamber 335 when rotated into the third expansion chamber 355 position, where subsequent fuel injections into the same rotating chamber boosts to the expansion force of the fuel by adding new non-expanded fuel to the rotating chamber.

Example II

Referring still to FIG. 2, FIG. 3, and FIG. 39, in a second example, the first injection port 3912 is of a larger diameter, high fuel rate, and/or long open valve time delivers more fuel than the second injection port 3914, which has a medium sized diameter, medium flow rate, and/or medium open valve time. Similarly, the second injection port 3914 of medium sized diameter, flow rate, or open valve time delivers more fuel than that delivered by the third injection port 3916 of small diameter, small flow rate, and/or short open valve time. In this example, the second injection port 3914 delivers a first boost of fuel and/or expander fuel to the expansion chamber passing the second injection port 3914 and the third injection port 3916 delivers a second boost of fuel and/or expander fuel to the expansion chamber passing the third injection port 3916, yielding a stronger and optionally longer power stroke of the rotary engine 110.

Example III

Referring now to FIG. 2 and FIG. 39, in a third example the first injection port 3912 is the smallest, the second injection port 3914 is larger, and the third injection port 3916 is the largest of the three injection ports, which allow more fuel to be pumped into the increasing larger expansion chamber.

Example IV

Referring still to FIG. 2, FIG. 3, and FIG. 39, in a fourth example fuel is injected into a fourth expansion or injection port 3918 of the set of inlet ports 3910, where the fourth expansion port is into the rotor vane slot 452, providing a sealing force, $F_{7b}$, to the base of the vane 450 toward the housing 210.

Fuel Path/Timing Control

Referring again to FIG. 38, the main controller 170 optionally controls timing and/or direction of fuel flow based on sensor readings and/or operator provided input. Generally, the main controller 170 controls one or more of:
one or more fuel valves, valves, gates, such as;
    a shaft valve 3811, positioned in a fuel flow path prior to entering the vane through the flow tube 1510 from the shaft 220;
    a vane path valve 3812, positioned within the vane 450;
    a vane wing valve 3813, positioned within and/or on the perimeter of the wing of the vane 450, such as the leading vane wing 1620 and/or the trailing vane wing 1630;
    a rotor base valve 3814, positioned at the base of the rotor-vane chamber 452;
    a rotor conduit valve 3815, positioned within and/or at an end of the first rotor conduit 1022; and/or
    a trailing vane edge valve 3816, positioned at a port on the trailing vane edge of the vane 450; and/or
a fuel supply, such as;
    fuel flow through the first inlet port 162, such a through the housing 210;
    fuel flow through the second inlet port 1014, such as through the shaft 220; and
    fuel flow through any element of the set of the inlet ports 3910, such as through the inner wall of the first endplate 212 and/or an inner wall of the second endplate 214.

Referring again to FIG. 26 and FIG. 38 and still referring to FIG. 39, optionally an exit port 3919 leads from any of the rotor-vane chambers 452 out of the rotary engine. The exit port is optionally: (1) an exhaust port, such as a valved exhaust port or (2) part of a pump, where a liquid is pumped into the rotor-vane chamber, such as via the fourth injection port 3918 and/or via a sixth injection port 3800, which is optionally gated with a gate 3814. In the pump, the sixth injection port passes a liquid through the shaft 220 and/or through the rotor 440 to the rotor-vane chamber 452 during the power stroke and the liquid is pumped out of the rotor-vane chamber 452 during the exhaust phase of the rotary engine 110.

In yet still another embodiment, three rotary engines are linked via two centerplates, where the a first rotary engine is rotated one hundred twenty degrees counterclockwise and a second rotary engine is rotated one hundred twenty degrees clockwise from a rotational orientation of a third rotary engine, such as a centrally position rotary engine, which yields a continual power curve between the three rotary engines and a mechanically/dynamically balanced engine overcomes imbalance due to offset rotors.

In still yet another embodiment, the rotary engine is used as an element of a micro cooling, heating, and/or power system.

Still yet another embodiment includes any combination and/or permutation of any of the rotary engine elements described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive manner, and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
    an engine, comprising:
        a housing;
        a rotor configured to rotate within said housing;
        a set of vanes configured to rotate with said rotor, said set of vanes configured to divide a volume between said rotor and said housing into a set of chambers, said set of vanes comprising a first vane, said first vane comprising:
            a stressed sheet, said stressed sheet configured to apply a radially outward force on a section of said first vane toward said housing;
            electromechanical means for controlling extension of said first vane toward said housing;
            at least three turning elements, said stressed sheet at least partially circumferentially wound about each of said at least three turning elements; and
            at least one wall configured to guide said stressed sheet.

2. The apparatus of claim 1, said stressed sheet comprising at least one of:
    a sheet of metal;
    a bimetallic strip;
    a metallic bilayer strip; and
    a sheet of plastic.

3. The apparatus of claim 1, wherein at least one of said three turning elements comprises a cam-shaped perimeter.

4. The apparatus of claim 1, said stressed sheet further comprising:
    at least one aperture therethrough.

5. The apparatus of claim 1, said stressed sheet further comprising:
    a non-rectangular perimeter when laid flat.

6. The apparatus of claim 1, said engine further comprising:
    at least three fuel inlet ports.

7. The apparatus of claim 6, further comprising:
    a shaft, said rotor configured to rotate about said shaft; and
    a passageway between said shaft and said first vane, said passageway comprising a section of a first inlet port of said three fuel inlet ports.

* * * * *